(12) United States Patent
Sakaguchi

(10) Patent No.: US 6,310,627 B1
(45) Date of Patent: Oct. 30, 2001

(54) METHOD AND SYSTEM FOR GENERATING A STEREOSCOPIC IMAGE OF A GARMENT

(75) Inventor: Yoshiyuki Sakaguchi, Ohtsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 09/231,188

(22) Filed: Jan. 14, 1999

(30) Foreign Application Priority Data

| Jan. 20, 1998 | (JP) | 10-009013 |
| Jan. 20, 1998 | (JP) | 10-009014 |
| Mar. 4, 1998 | (JP) | 10-052138 |
| Apr. 1, 1998 | (JP) | 10-088994 |

(51) Int. Cl.$^7$ .................................................. G06F 15/00
(52) U.S. Cl. .............................................................. 345/630
(58) Field of Search ..................... 345/435, 419, 345/420, 423, 428, 473

(56) References Cited

U.S. PATENT DOCUMENTS 6,088,040 * 7/2000 Oda et al. ............................ 345/435

* cited by examiner

Primary Examiner—Phu K. Nguyen
(74) Attorney, Agent, or Firm—Kenyon & Kenyon

(57) ABSTRACT

A 3D image of an object model and images of patterns of a garment are generated. The images of the respective patterns are three-dimensionally deformed by arranging them in corresponding portions of the 3D image of the object model in an image space, and calculating collision deformations caused when the respective patterns are pressed against the corresponding portions based on an externally inputted information on the garment. A stereoscopic image of the garment is generated by connecting the deformed 3D images of the respective patterns based on the information on the garment. Since the pattern images of the garment are so deformed as to be put on the object model in a virtual space of the computer graphics and the stereoscopic image of the garment is generated by connecting the deformed pattern images of the garment, there can be generated a stereoscopic image of the garment realistically representing a state of the garment when the garment is actually put on the object.

47 Claims, 34 Drawing Sheets

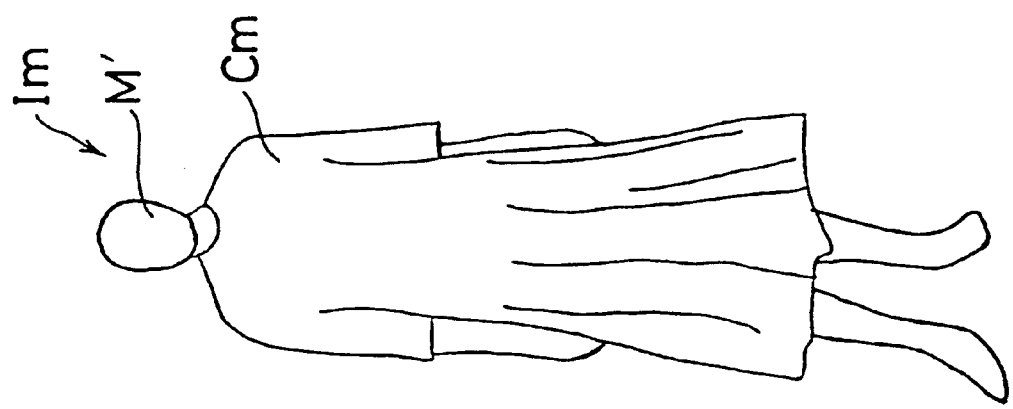
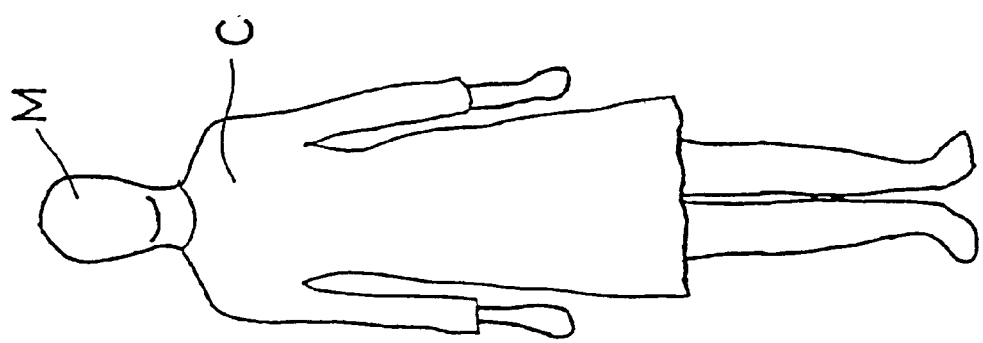
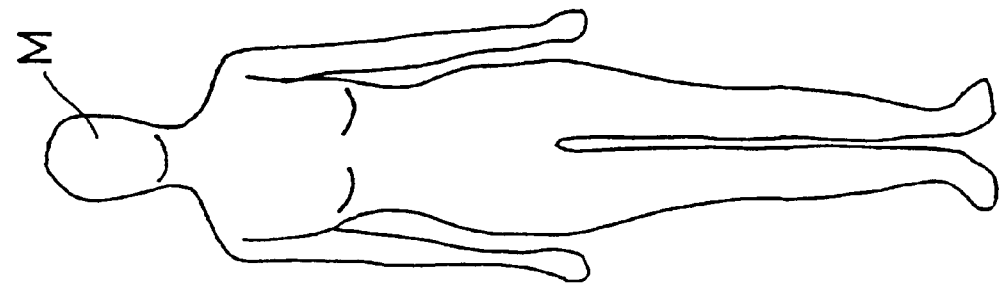

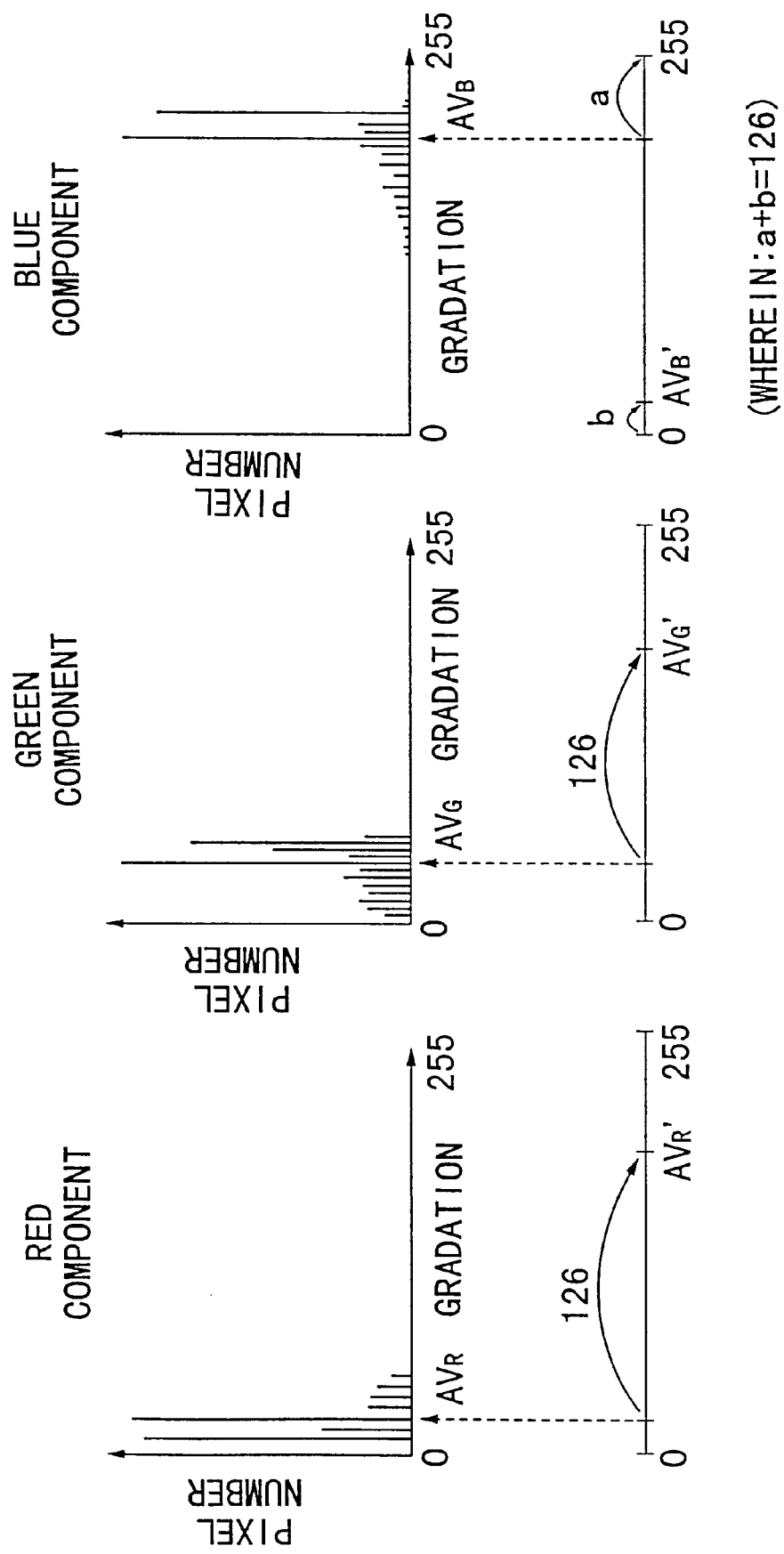

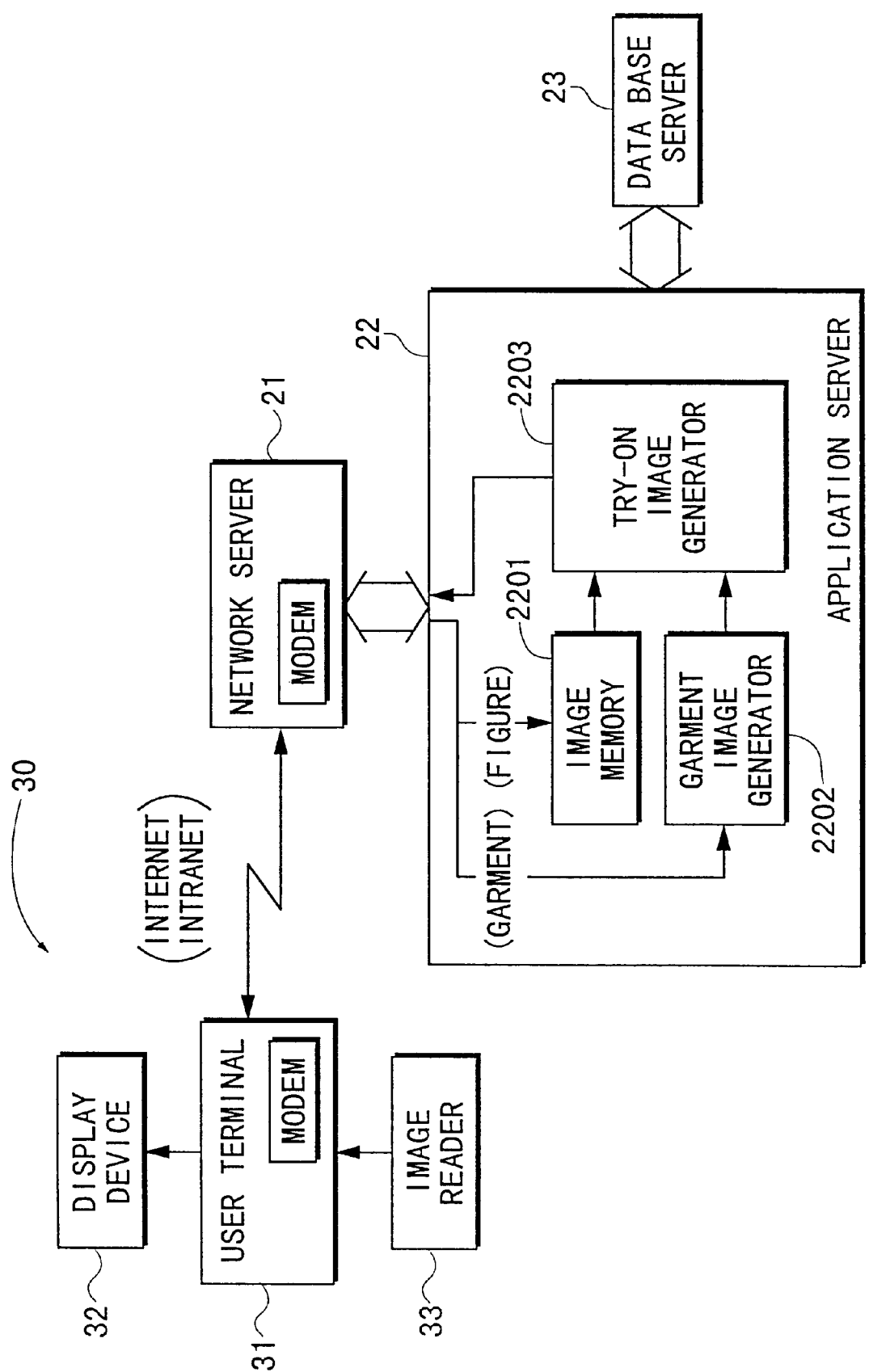

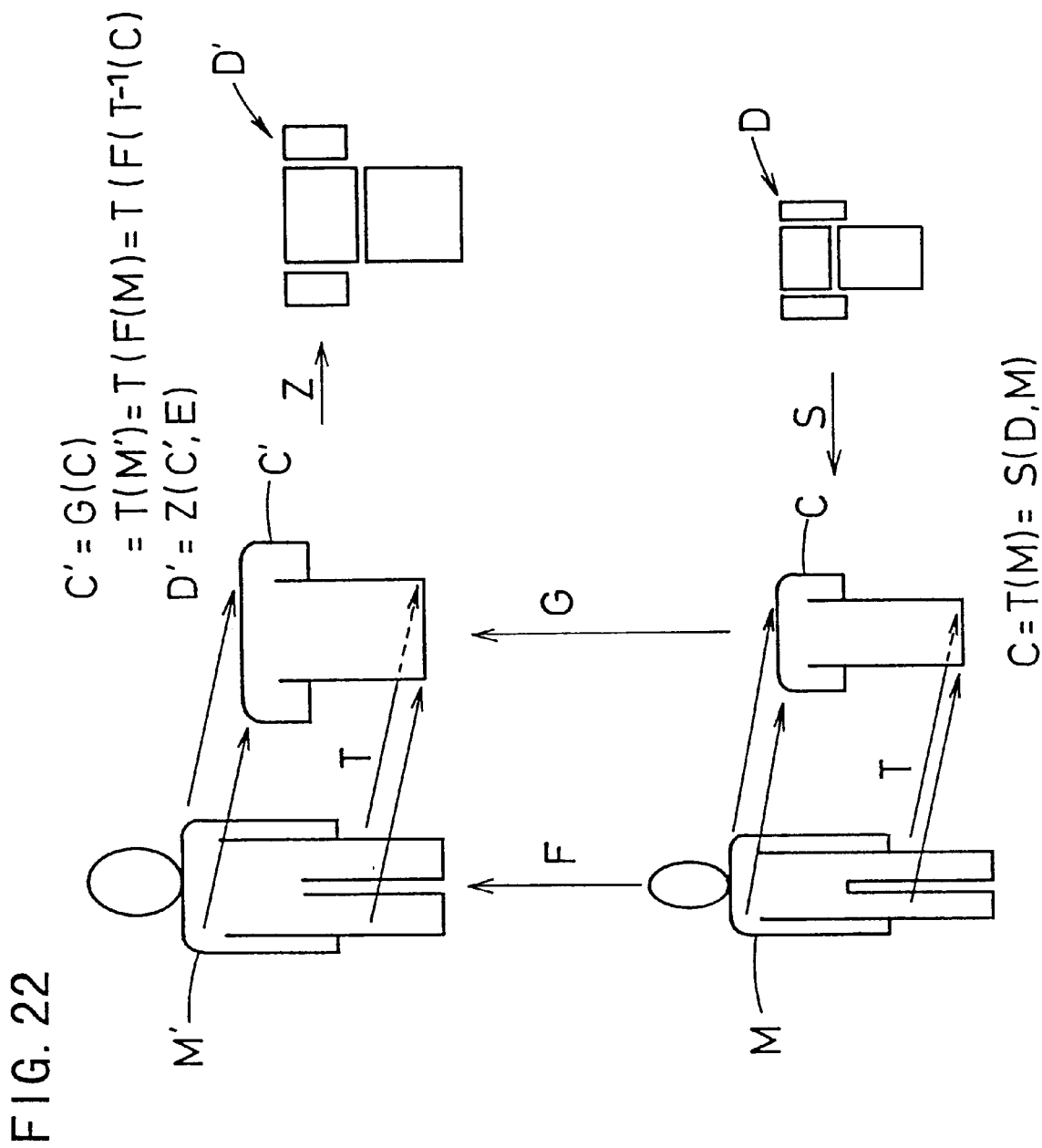

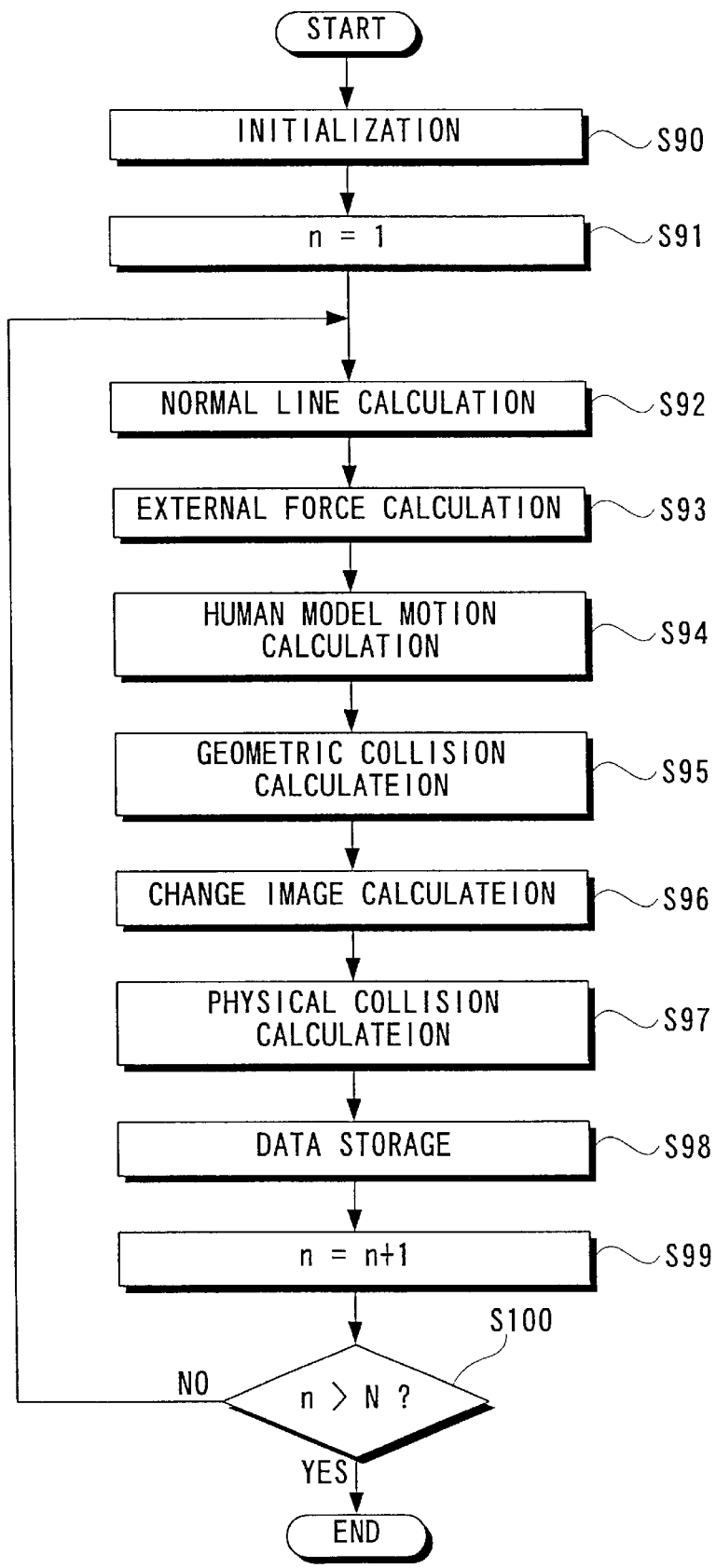

METHOD AND SYSTEM FOR GENERATING A STEREOSCOPIC IMAGE OF A GARMENT

BACKGROUND OF THE INVENTION

This invention relates to a method for generating a stereoscopic image of a garment when the garment is put on an object such as a person or an animal by the computer graphics and also to a system for generating a stereoscopic image of a garment using such a method.

Conventionally, in the fashion business, there has been proposed a system for generating a simulated image in which a client tries a garment on by combining an image of the client and an image of the garment and allowing the monitoring of a virtual try-on state.

This virtual try-on system employs, for example, a method according to which a plurality of garments to be tried on are actually prepared and photographed to prepare images of the garments, and a try-on image is generated by combining a photographed image of a client and an image of the garment selected by the client by chroma key.

However, with this virtual try-on system, it is necessary to actually prepare garments to be tried on and to photograph the prepared garments to generate the images of the garments to be combined to generate the try-on images. Accordingly, a huge amount of time, labor and cost are required to prepare the images of a great variety of garments, making it difficult to sufficiently meet the market's demand. Further, since the garment images are stationary fixed images, if they are combined with the photographed images of the clients, the combined images strongly look like images obtained by pasting different images together and lack realities such as the state of deformation of the garment when being actually tried on and draping ability. Thus, this system is qualitatively insufficient to provide the monitoring of the virtual try-on state.

If a state where a garment is put on an object can be simulated in a virtual space of the computer graphics to thereby generate a stereoscopic image (three-dimensional image) of the garment, it is quite convenient in, for example, the fashion business, because a variety of try-on states can be monitored in a real manner. These try-on states may include those in which the client hold many poses, the one in which the client's figure has changed, and the one in which the garment is mended. By animating the image of the object having the garment on and simulating the change of the stereoscopic image of the garment according to the movement of the object, the try-on state can be expressed in an animated manner and fashion shows can be held in the virtual space. Further, patterns can be directly prepared using the stereoscopic image of the garment. If this garment stereoscopic image generating system is applied to, for example, the apparel or clothing industry, a system capable of performing a continuous operation from the selection of garment to the preparation of patterns and up to the preparation of garment parts can be built. Such a system is considered to have various applications having high convenience even only in the fashion business.

In recent years, images generated by the computer graphics are frequently used in the animation industry, movie industry and advertisement industry, providing creative images having high reality. In such industries, images simulating the state where the object is actually a garment in the virtual space of the computer graphics is quite useful.

However, as a technique for generating a stereoscopic image of a garment using the computer graphics, only an elemental technique is disclosed in, e.g., Japanese Unexamined Patent Publication No. 8-44785 for generating a stereoscopic image of a garment. An image generating method for generating an image representing a stereoscopic shape of a garment put on an object such as a person or an animal in a realistic manner and a system for generating the stereoscopic image of the garment using such an image generating method have not yet been proposed.

SUMMARY OF THE INVENTION

It is an object of the present invention to provide a garment stereoscopic image generation method and system which have overcome the problems residing in the prior art.

According to an aspect of the present invention, a method for generating a three-dimensional image (hereinafter, "3D image") representing a stereoscopic shape of a garment when the garment is put on an object, comprises:

(a) a first step of generating a 3D image of an object model corresponding to the object;

(b) a second step of generating images of patterns for the garment;

(c) a third step of inputting information on the garment; and (d) a fourth step of arranging the images of the respective patterns of the garment in corresponding portions of the 3D image of the object model, three-dimensionally deforming the images of the respective patterns by calculating collisional deformations when the respective patterns are pressed against the corresponding portions based on the information on the garment, and generating a stereoscopic image of the garment by connecting the deformed 3D images of the respective patterns based on the information on the garment.

According to another aspect of the present invention, a garment stereoscopic image generating system for generating a 3D image representing a stereoscopic shape of a garment when the garment is put on an object, comprises:

(A) a model image generating means for generating a 3D image of an object model corresponding to the object;

(B) a pattern image generating means for generating images of patterns of the garment;

(C) a garment information input means for inputting information on the garment; and (D) a garment image generating means for arranging the images of the respective patterns of the garment in corresponding portions of the 3D image of the object model, three-dimensionally deforming the images of the respective patterns by calculating collisional deformations when the respective patterns are pressed against the corresponding portions based on the information on the garment, and generating a stereoscopic image of the garment by connecting the deformed 3D images of the respective patterns based on the information on the garment.

According to still another aspect of the present invention, a try-on image generating system for generating a try-on image representing a state where a client tries a garment on, comprises:

(X) a data terminal unit for permitting a client to input information on the garment, information on the figure of the client and an image of the client;

(Y) a server for generating a try-on image representing a state where the client tries the garment on based on the information on the garment, the information on the figure of the client and the image of the client, and providing the client with the generated try-on image; and (Z) a communication network for connecting the server and the data terminal unit so as to enable a communication therebetween.

According to yet still another aspect of the present invention, a pattern preparing system for generating a try-on image representing a state where a client tries a garment on, correcting the garment using the try-on image, and preparing patterns of the garment based on an image of the corrected garment, comprises:

(X) a data terminal unit for permitting a client to input information on the garment and information on the figure of the client;

(Y) a server for generating a try-on image representing a state where the client tries the garment on based on the information on the garment, the information on the figure of the client and the image of the client, correcting the garment using the generated try-on image, generating information on the patterns of the garment based on an image of the corrected garment and providing the client with the generated try-on image, and providing the client with the information on the patterns; and (Z) a communication network for connecting the server and the data terminal unit so as to enable a communication therebetween.

The pattern images of the garment are so deformed as to be put on the object model in the virtual space of the computer graphics, and the stereoscopic image of the garment is generated by connecting the deformed pattern images of the garment. Therefore, the stereoscopic image of the garment realistically representing the state of the garment when the garment is actually put on the object can be generated.

These and other objects, features and advantages of the present invention will become more apparent upon a reading of the following detailed description and accompanying drawings.

BRIEF DESCRIPTION OF THE DRAWINGS

FIGS. 8A to 8C are diagrams showing a procedure of generating the stereoscopic images of a garment suitable for a human model corresponding to the figure and posture of a person on whom the garment is tried on;

FIG. 12 is a diagram showing a method for determining a background color used in the chroma key combination;

FIG. 13 is a block diagram of one embodiment of a try-on image generating system of the network type;

FIG. 22 is a diagram showing a pattern preparing method by a mathematical modeling;

FIG. 35 is a flowchart showing a procedure of generating the 3D animation image of the human model and the garment.

DETAILED DESCRIPTION OF THE PREFERRED EMBODIMENTS OF THE INVENTION

Figure 1:
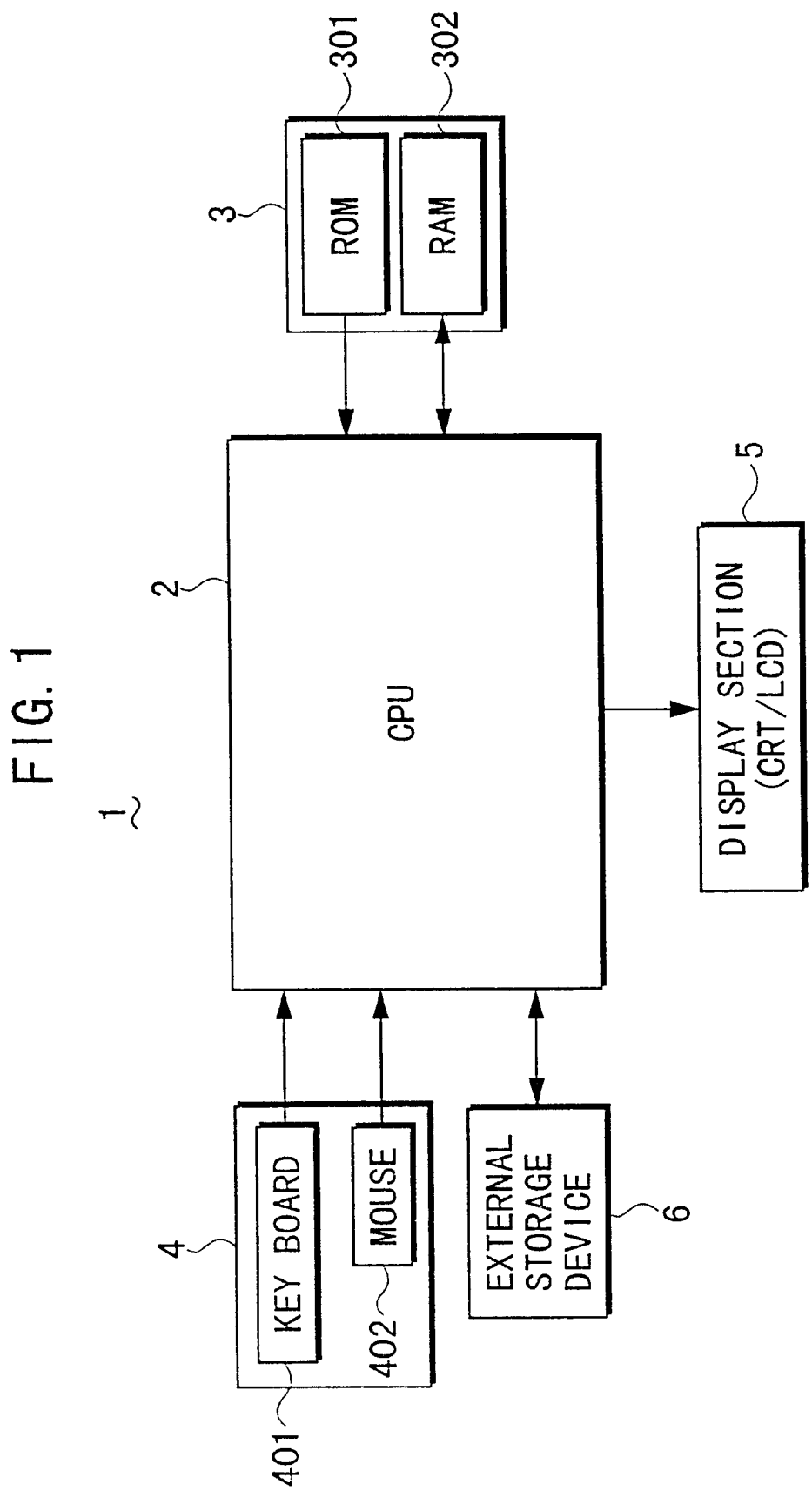
FIG. 1 is a block construction diagram of a system for generating a stereoscopic image of a garment, embodying the invention.

FIG. 1 is a block construction diagram of one embodiment of a system for generating a stereoscopic image of a garment, embodying the invention.

The stereoscopic image generating system shown in FIG. 1 is a system for generating a stereoscopic image of a garment put on a person by the computer graphics and is constructed by a stand-alone computer system. Specifically, this system works as follows. A 3D image (upright image) of a model having a human figure (hereinafter, human model) and 3D images of cloths (garment parts) cut in accordance with patterns are caused to appear in a virtual space of the computer graphics. After being so deformed as to conform to the figure of the human model in view of dynamic properties of the cloth and collision conditions of the cloth with the human model, the images of the garment parts are connected based on sewing conditions to generate a stereoscopic image of the garment put on the human model.

The 3D image here corresponds to an image obtained by, e.g., photographing a human model at a suitable angle and under lighting by a camera. The postures of the human model wearing the garment can be stereoscopically viewed from various angles.

Since the stereoscopic image generating system of FIG. 1 can cause the human image wearing the garment to stereoscopically appear in the virtual space, the selection of garment by a client by trying them on and the correction of the garment tried and selected, or the preparation of patterns of the garment tried and selected, and the like can be done in the virtual space of the computer graphics by applying this image generating system as described later. Accordingly, the stereoscopic image generating system proposed here can be effectively applied as a support tool in the fashion business, apparel industry, department stores, fashion retailers such as boutiques. This system can also be applied in the commercial business, animation business and the like that uses computer graphics images.

In FIG. 1, the image generating system 1 is provided with a central processing unit 2, a main storage 3, an input device 4, a display section 5 and an external storage device 6.

The central processing unit 2 (hereinafter, "CPU 2") implements a processing of generating a stereoscopic image of a garment in accordance with a processing program set in advance. The CPU 2 includes a microcomputer.

The main storage 3 is adapted to store the processing program, data necessary to implement the processing program, a variety of data (including image data) necessary for the CPU 2 to generate the stereoscopic image of the garment in accordance with the processing program and data calculated by operations. The main storage 3 includes a ROM (read only memory) 301 and a RAM (random access memory) 302. The processing program and the data necessary to implement the processing program are stored in the ROM 301, and a variety of data necessary to generate the stereoscopic image of the garment and data calculated by operations are stored in the ROM 302.

The input device 4 is operated to input necessary commands and information to the CPU 2 in generating the stereoscopic image of the garment. The input device 4 mainly includes a keyboard 401 and a mouse 402. The display section 5 is adapted to display an operation menu in the generation processing of the stereoscopic image of the garment, an image generating process and the processing result (stereoscopic image of the garment). The display section 5 is comprised of an electronic display device such as a CRT (cathode-ray tube), a liquid crystal display device or a plasma display panel.

The external storage device 6 is an auxiliary storage device for the CPU 2 and is adapted to store the image data of the human model and the garment and information on the garment which are necessary for the generation of the stereoscopic image of the garment and also to store a variety of data (e.g., the stereoscopic image of the garment and the information on the garment) obtained by the generation processing of the stereoscopic image of the garment. The former image data and information are a database in the generation processing of the stereoscopic image of the garment and are stored in, e.g., a CD-ROM or the like. As a storage medium of the external storage device 6, for example, a magnetic storage medium such as a floppy disk, a magnetic disk or a photomagnetic disk or an optical storage medium such as an optical disk can be used.

The image data of the human model stored in advance as a database in the external storage device 6 is a surface model formed by triangular patches so that a standard human figure can precisely be represented by a small number of data. The shape of this surface model is generated using three-dimensional distance data obtained by measuring a real person or a mannequin by, e.g., a three-dimensional surface shape measuring apparatus. The image data of the human model is generated while being divided into a plurality of body parts such as a head, neck, chest, arms, hands, trunk, waist, legs so that a variety of postures and movements can be expressed, and the image data of these body parts are stored in the external storage device 6, respectively.

Figure 2:
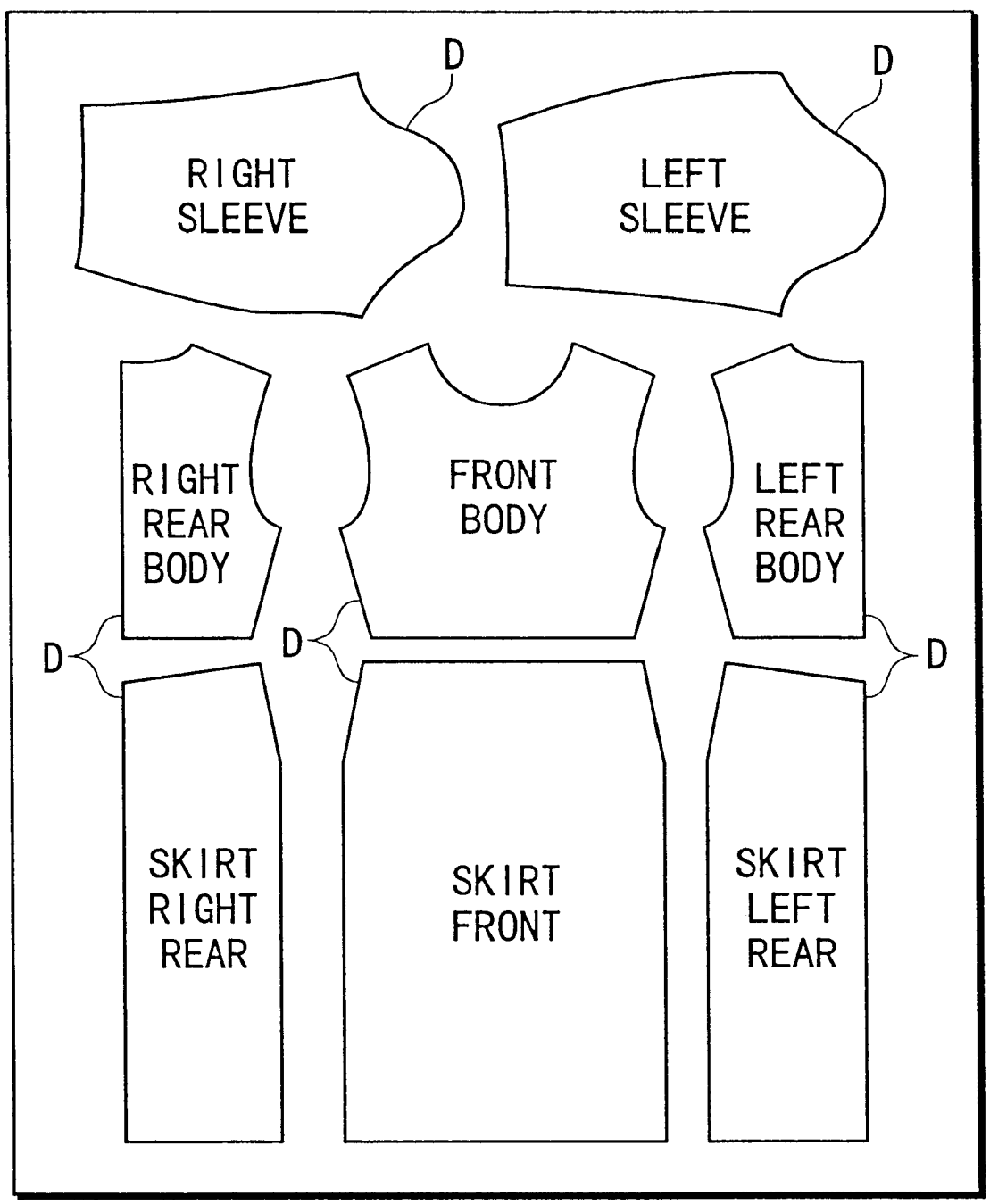
FIG. 2 is a diagram of exemplary pattern images of a dress.

On the other hand, the image data of the garment stored in advance as a database in the external storage device 6 include the image data of patterns used to generate the garment of each specified shape (dress, suits, etc.). For example, in the case of a dress, the image data thereof is comprised of the image data of 8 patterns D as shown in FIG. 2. The image data of each pattern D is constituted by data of lattice points when the pattern surface is smoothly and uniformly divided by regular lattices (orderly arranged rectangular lattices). The pattern surfaces are defined by rectangular lattices in view of the fact that it approximates to the cloth construction (construction defined by warps and yawns) of a material of the garment and a sewing processing for the patterns in the virtual space is easy.

The information on the garment includes information on the shape of the garment, attributes such as color/pattern, materials such as silk, cotton and synthetic fibers, dynamic properties (tensile property, bend restoring property, shearing property, etc.) of the respective materials, sewing methods.

Next, the generation processing of the stereoscopic image of the garment by the image generating system 1 is briefly described.

The stereoscopic image of the garment is generated using, for example, the method disclosed in Japanese Unexamined Patent Publication No. 8-44785 (method for generating a stereoscopic shape of a garment) or in Japanese Unexamined Patent Publication NO. 9-223247 (method for simulating a movement of a garment). Since the respective methods are disclosed in detail in the above publications, the method for generating the stereoscopic image of the garment is summarily described here.

Figure 3:
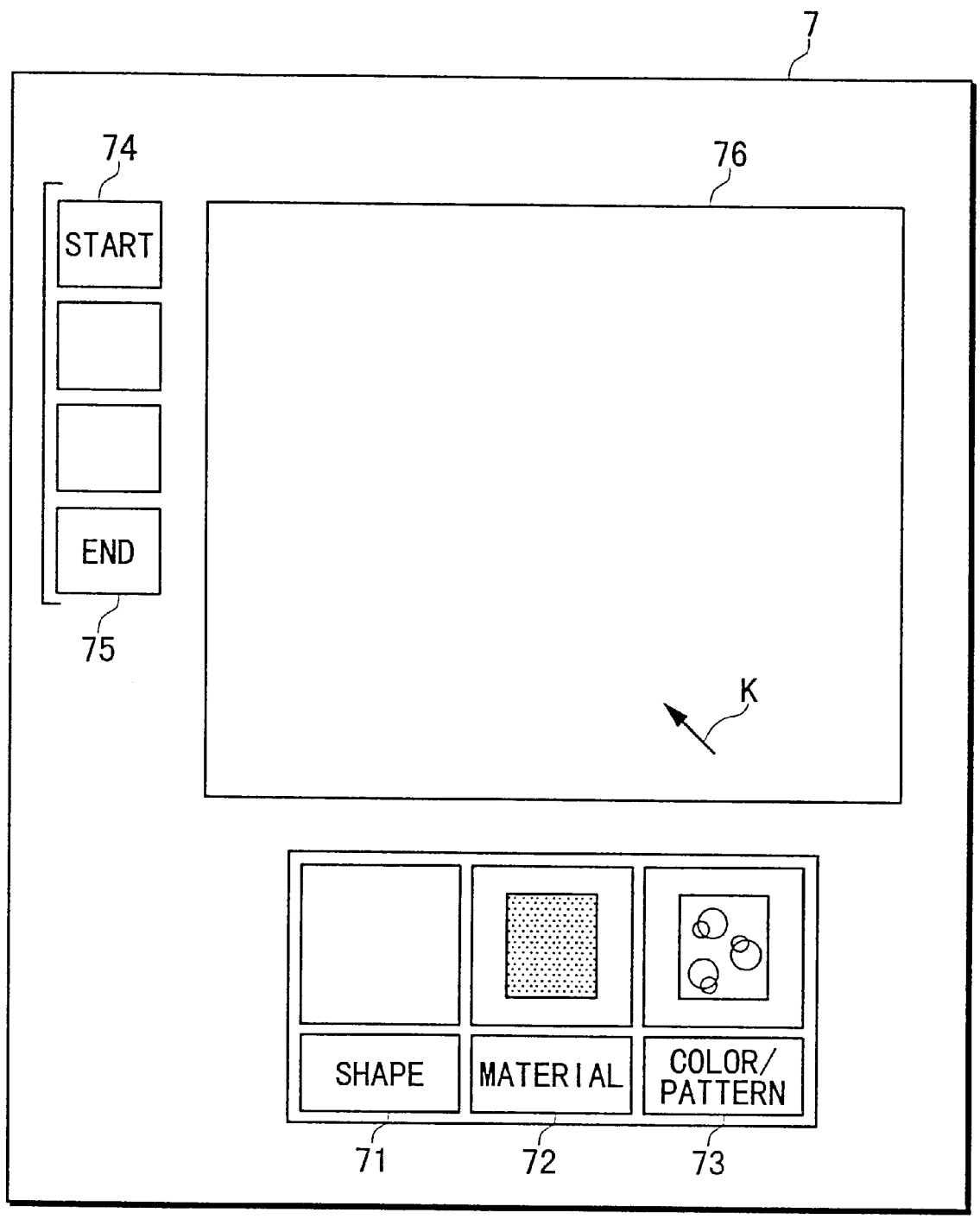
FIG. 3 is a diagram of an exemplary basic screen displayed in a display section.

When the image generating system 1 is activated, a specified processing program is transferred from the ROM 301 to the RAM 302 and a basic screen 7 shown in FIG. 3 is displayed in the display section 5. In a lower part of the basic screen 7 are displayed three input windows 71 to 73 used to input the information on the garment. The input windows 71 to 73 are used for the selection of the shape, material, color/pattern, and the like of the garment, respectively. In an upper part of the basic screen 7 is provided a display window 76 for displaying a generation process of the stereoscopic image of the garment. On the left side of the display window 76 are displayed input windows 74, 75 used to instruct the start and end of the generation processing of the stereoscopic image of the garment, respectively.

An operator can input the information on the garment by selecting the input windows 71 to 73. For example, if the operator clicks the mouse 402 after moving a cursor K to the input window 71 of "Shape", an unillustrated pop-up screen appears on the basic screen, and an index image for a plurality of shapes of garment registered in the external storage device 6 is displayed in this pop-up screen. The information on the shape of the garment can be inputted by selecting a desired one among the registered shapes in a similar method. Likewise, when the input windows 72, 73 for the "material" and "color/pattern" are selected, an index image for a plurality of registered materials and an index image for a plurality of registered colors/patterns are displayed in the pop-up screen, respectively, and the information on the material and the color/pattern of the garment can be inputted substantially in the same method as in the case of the shape of the garment.

After the information on the garment is inputted, the cursor K is moved to the input window 74 for the "start". When the generation of the stereoscopic image of the garment is instructed by clicking the mouse 402, the image data (3D image data) of the human model and the image data of patterns corresponding to the inputted shape of the garment are transferred from the external storage device 6 to the RAM 302. Further, the dynamic properties (tensile property, bend restoring property, etc.) corresponding to the inputted material are transferred to the RAM 302.

Figure 4:
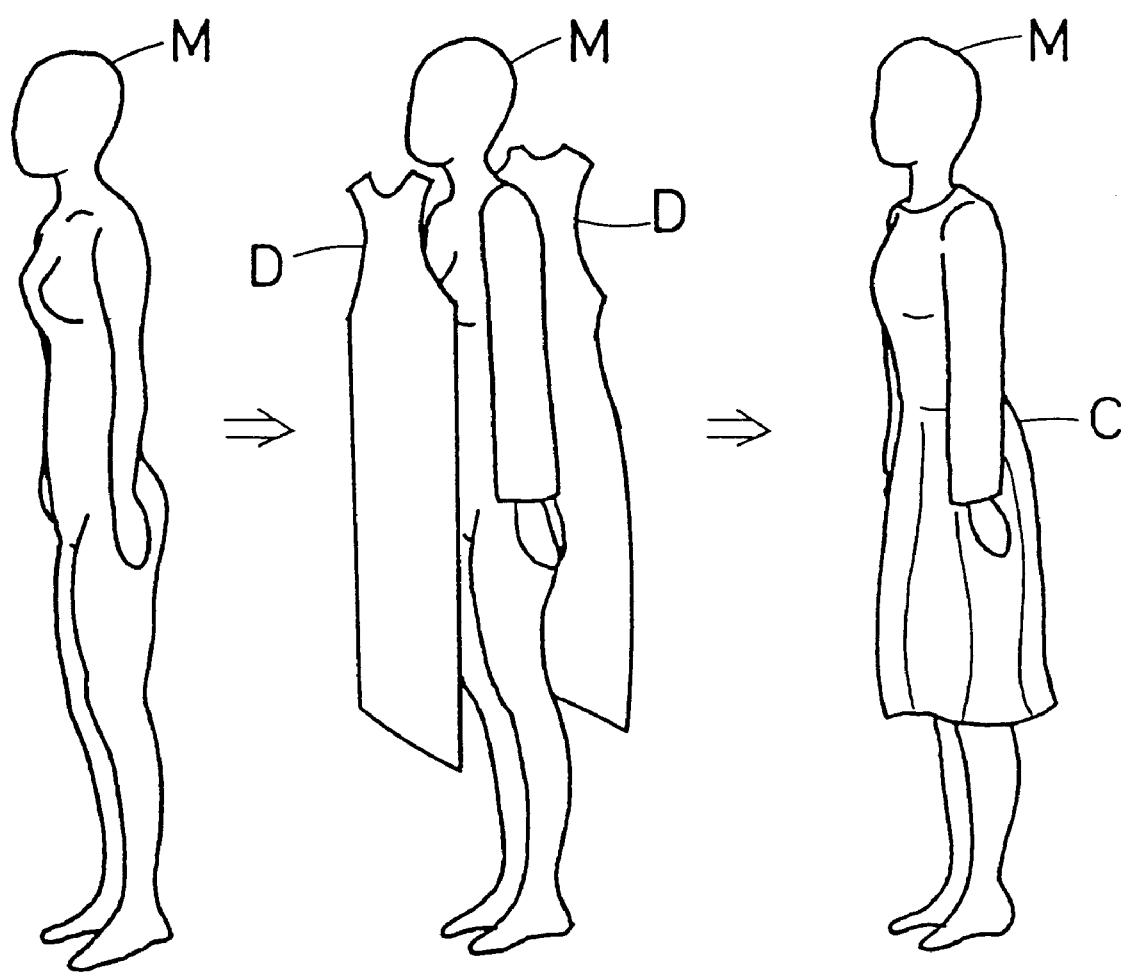
FIG. 4 is a diagram showing a method for generating a stereoscopic image of a garment.

Subsequently, the images of the respective patterns D are so deformed as to be put on a human model M as shown in FIG. 4. This deformation processing of the patterns D are performed by arranging the patterns D in specified positions around the human model M and calculating, based on the dynamic properties of the material, the collisions of the patterns D with the human model M and the collisions of the patterns D with each other when the patterns D are drawn closer to each other by spring forces until the spring forces fall below a predetermined threshold value.

The calculation of the collisions of the patterns D with the human model M and of the collisions of the patterns D with each other is comprised of a collision detection for detecting positions of collision, and a collision processing for calculating how a cloth will rebound in the detected positions of collision. The collision detection is performed by determining a possibility of each lattice point constituting the patterns D to intersect and calculating intersections. The collision processing is performed by a collision model in which both a physically based modeling and a geometric modeling of the collision are used in stages.

The calculation of the movement of the garment by the physically based modeling of the collision of the garment and the human body are performed by repeating:

(1) A collision of the human body with the garment occurs as the human body moves, (2) A force acts to keep the shape of the garment changed by the collision with the human body acts, and (3) A collision of the garment with the human body as the garment moves.

On the other hand, the calculation of the movement of the garment by the geometric modeling of the collision of the garment and the human body is performed by repeating:

(1) A part of the human body in motion and a part of the garment belonging to the same motor system are corresponded, and (2) The part of the garment corresponding to the part of the human body in motion is caused to move in the same manner.

The calculation of the movement of the garment by the physically based modeling has a problem that the collision detection is difficult when a relative speed of the human body and the garment becomes large. On the other hand, the calculation of the movement of the garment by the geometric modeling has a problem of reduced reality because the garment changes in the same manner as the human body unless the correspondence between the human body and the garment changes. Thus, by using the both types of modeling in stages, the drawbacks of the two types modeling are compensated for.

The collision calculation by the collision modeling in which both the physically based modeling and the geometric modeling are used in stages are performed by (1) changing the garment by assuming that there are correspondences between the garment parts close to the human body and the corresponding body parts and changing the garment by the geometric modeling, considering that these garment parts and body parts instantaneously belong to the same motor systems, and (2) then calculating the collision of the garment with the human body by the physically based modeling, assuming that the human body is stationary.

In the geometric modeling of the above calculation method, (1) correspondences between the human model M and the patterns D are calculated, and (2) the movements of the coordinates of the respective lattice points caused by the movement of the human model M are calculated. Specifically, a range defined by a maximum moving distance of the human model M per unit time with a margin is searched in an inward direction of each pattern D from the respective lattice points of the pattern D. Then, the triangular patches of the human model M corresponding to the respective lattice points are detected. Consequently, the coordinates of the respective lattice points of the patterns D are moved according to the moving distances of the corresponding triangular patches of the human model M during the unit time.

In the physically based modeling, the collision of the human model M and the patterns D and the collision of the patterns D with each other are calculated. The calculation by the physically based modeling reflects the movement of the human model M on the movements of the patterns D, and relative speeds between the human model M and the patterns D are thought to be decreased. Accordingly, the collision calculation in the physically based modeling is performed assuming that the human model M is stationary.

Since this collision calculating method is described in detail in the aforementioned Japanese Unexamined Patent Publication NO. 9-223247 (method for simulating the movement of a garment), no detailed description is given here.

A stereoscopic image of a garment C put on the human model M is generated by connecting the images of the patterns D with each other under the sewing conditions of the garment after deforming the images of the respective patterns D. This image generation process is displayed in the display window 76. Upon completion of the processing, the 3D image of the generated garment C is displayed in the display window 76 as shown in FIG. 3.

As described above, in this image generating system 1, the 3D image of the human model M having an actual human figure appears in the virtual space of the computer graphics. The deformation of the 3D images of the patterns D caused by the collision of the patterns D and the human model M and the collision of the patterns D with each other when the patterns D of the garment are pressed against or put on the human model M is numerically calculated. The deformed 3D images of the respective patterns D are connected based on the sewing conditions. In this way, the stereoscopic image of the garment is generated. Therefore, the stereoscopic image of the garment can be expressed in a realistic manner.

Since the stereoscopic image of the garment is generated by simulating a state where a garment is put on a person in the virtual space of the computer graphics in a pseudo manner in the foregoing embodiment, the 3D image of the human model having an actual human figure is prepared as a database in advance. However, if the aforementioned image generating method is applied to, e.g., animation images generated by the computer graphics or commercial images, 3D images of characters other than humans may be prepared as a database in advance since there is a possibility that garments are put on a variety of character images other than human images. Instead of preparing the image data of characters in advance, 3D images of characters generated in the CPU 2, or data of the 3D images of characters generated in an other image generating system and transferred therefrom may be used to generate the stereoscopic image of the garment.

Next, the application of the aforementioned technique for generating the stereoscopic image of the garment is described.

First, a first exemplary application is described. The first exemplary application is a virtual try-on system which allows a person to confirm how a garment suits him by means of a computer generated image without actually putting it on.

In the conventional virtual try-on systems, a garment is actually prepared and photographed to obtain an image thereof, and this image and a human image of a preset model (try-on object: object who tries the garment on) are combined by a chroma key combination method to virtually generate a combined image showing how the garment looks on the model. However, this virtual try-on system requires the preparation of the images of as many garments as the person wants to try on and inevitably requires the actual preparation of garments suited to the model. Further, in the case that the try-on object is not limited to a specific model, i.e., different persons try the garment on, it is necessary not only to prepare the images of these persons, but also to prepare the garments suited to them. In other words, it is necessary to prepare the images of all persons who are going to try, to prepare as many garments as a product of the number of the persons and the number of types of garments, and to prepare the images of these garments. Accordingly, the conventional virtual try-on systems require a huge amount of time and cost if the try-on objects and the types of the garments to be tried on are increased and are, therefore, impractical and have only a limited range of application.

Further, according to the conventional virtual try-on method, the human image and the garment image are combined by the chroma key combination method to generate a combined image (try-on image). Specifically, a garment is photographed with a blue screen as a background, and the obtained garment image is uniformly combined with the human image by the chroma key combination method using a background color (blue) as a keycolor. Thus, if the color components constituting the color/pattern of the garment include the same or similar color component as the blue screen, such portions of the combined image having this color component become transparent. If there are relatively small portions of this color component, this does not cause any substantial problem in most cases. However, in the case that the same or similar color component as blue takes up a large part of the color components constituting the color/pattern of the garment, a large transparent portion appears in the garment image, thereby presenting a crucial problem that a realistically combined image cannot be obtained. This makes it difficult to virtually generate the image representing the try-on state of the garment with the color/pattern having blue as a main color component. Therefore, the virtual try-on system can be applied in a limited range.

The virtual try-on system according to the first exemplary application generates a realistic image in the following manner. A stereoscopic image of a garment to be tried on is generated by the aforementioned image generating method and combined with a full-length image of a person who tries this garment on (trying person) by the chroma key combination method, thereby generating a realistic image (hereinafter, "try-on image") which looks as if this person were wearing the garment. This system has a wide range of application.

Figure 5:
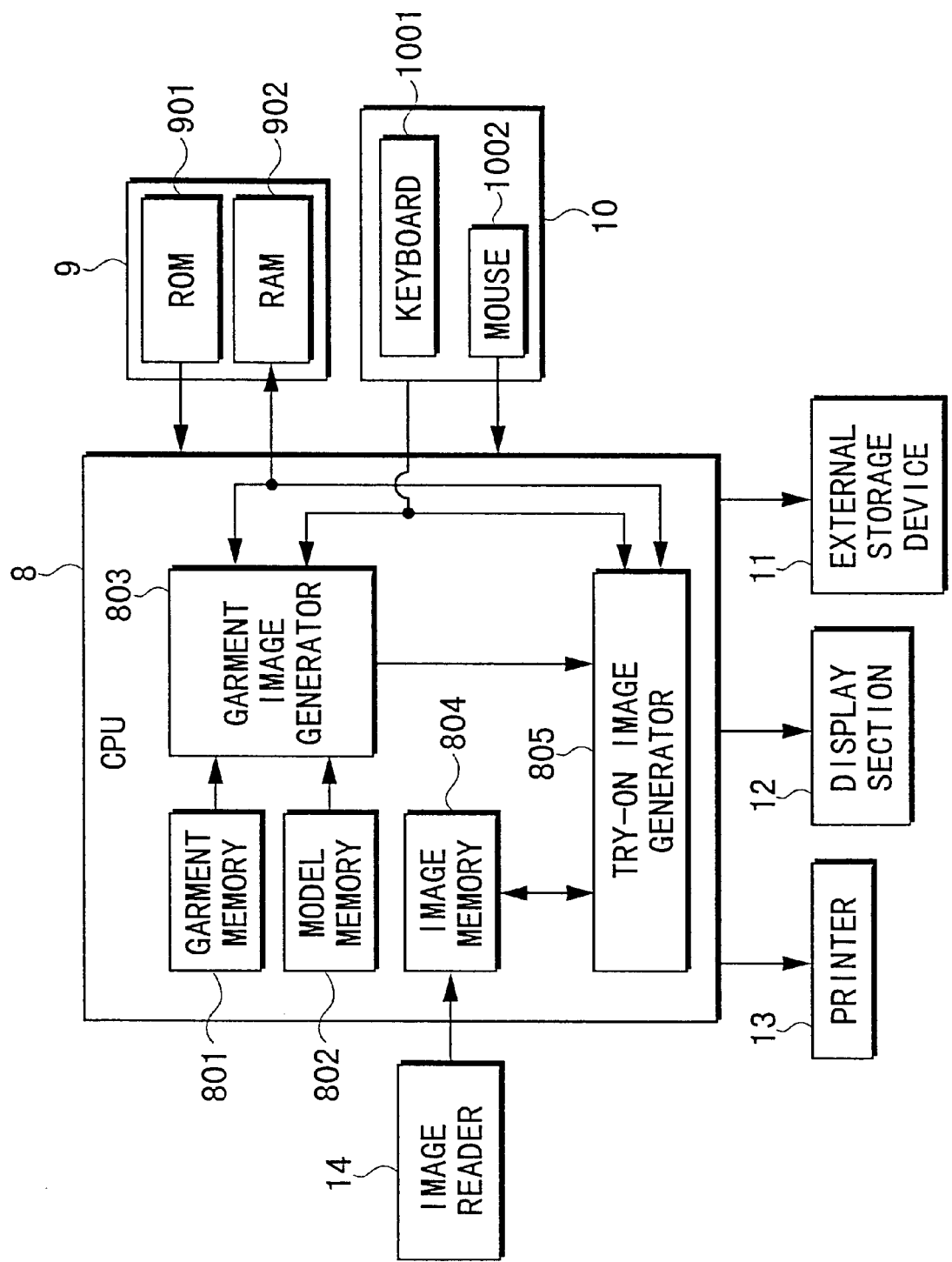
FIG. 5 is a block diagram of a try-on image generating system of the stand along type, embodying the invention.

FIG. 5 is a block construction diagram of one embodiment of the virtual try-on system which allows the trying person to confirm the try-on state of the garment by means of the image generated by the computer graphics (hereinafter, "CG image") without actually putting it on.

The virtual try-on system shown in FIG. 5 is of the stand-alone type and is comprised of a CPU 8, a main storage device 9, an input device 10, an external storage device 11, a display section 12, a printer 13 and an image reader 14.

The CPU 8 implements a procedure of generating a try-on image of a garment in accordance with a preset processing program. The main storage device 9 corresponds to the main storage device 3 of FIG. 1 and includes a ROM 901 and a RAM 902. In the ROM 901 are stored the processing program and data necessary to implement this processing program. In the RAM 902 are stored a variety of data (including image data) necessary for the CPU 8 to generate the try-on image in accordance with the above processing program and data calculated by operations.

The input device 10 corresponds to the input device 4 of FIG. 1 and includes a keyboard 1001 and a mouse 1002. The external storage device 11 corresponds to the external storage device 6 of FIG. 1 and is adapted to store the image data of a human model and the garment necessary to generate the try-on image, information on the garment, and a variety of data (e.g., stereoscopic images of garments and the information on the garments, etc.) obtained by the try-on image generation processing. In the external storage device 11 are also stored 3D images of human models (hereinafter, standard figure models) made of surface models having standard figures for each of a plurality of sizes (e.g., S, M, L, LL, etc.) classifying the human figures.

The display section 12 corresponds to the display section 5 and is adapted to display an operation menu in the try-on image generation processing, a try-on image generation process and a processing result (a try-on image in which a client is wearing a garment).

The printer 13 is adapted to print a variety of data (including image data) of the generated try-on image and the like on a recording sheet. The image reader 14 is adapted to scan an image of the trying person (e.g., a full-length image of the client: hereinafter, "human image"). The image reader 14 is constructed by an electronic camera for directly picking up an image of the client or a scanner or the like for reading a picture containing the client as an image data.

The CPU 8 includes memories 801, 802, a garment image generator 803, an image memory 804 and a try-on image generator 805 in order to perform a try-on image generation processing as described later. In the memory 801 is temporarily stored the image data of the garment selected as the one to be tried on which is read from the external storage device 11. In the memory 802 is temporarily stored a 3D image of a standard figure model corresponding to the figure of the trying person which is read from the external storage device 11. The garment image generator 803 generates a stereoscopic image of a garment put on the standard figure model using the 3D image of the standard figure model and the pattern images of the garment stored in the memories 801, 802. The image memory 804 temporarily stores the image of the person (human image) read from the image reader 14. The try-on image generator 805 combines the stereoscopic image of the garment generated by the garment image generator 803 and the human image stored in the image memory 804 by the chroma key combination method to generate a try-on image in which the client is wearing the selected garment.

Although the chroma key combination method is used as a try-on image generating method adopted by the try-on image generator 805 in this embodiment, any desired method can be used to combine the human image and the garment image.

Next, a virtual try-on procedure using the virtual try-on system constructed as above is described with reference to FIG. 6.

There are various virtual try-on modes. Here, in order to simplify the description, a case where a client experiences a simulated try-on state when he/she purchases a garment is described. In such a case, it is assumed that a picture having an image of the client is scanned by the scanner (image reader) 14 to pick up a human image to be combined to obtain a try-on image. When the client selects an image of a garment he wants to try from various garment images already stored in the external storage device 11, a stereoscopic image of the selected garment is generated and so deformed as to agree with the pose and silhouette of the client in the human image. The description is limitedly given on the procedure of generating a combined image (try-on image) virtually showing the try-on state when the client tries the garment on, using the deformed stereoscopic image of the garment and the human image.

Figure 6:
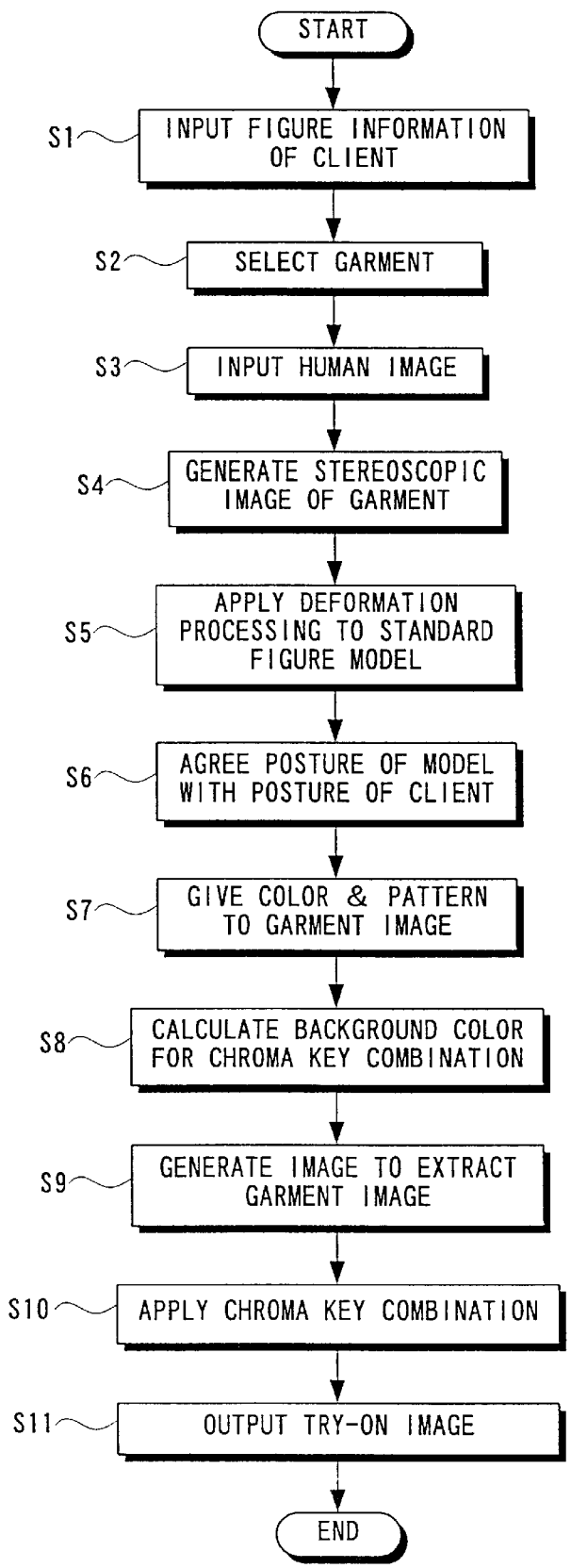
FIG. 6 is a flowchart showing a procedure of generating a try-on image in the system of FIG. 5.

FIG. 6 is a flowchart showing a virtual try-on procedure in the virtual try-on system of FIG. 5. In this system, a screen used to input information on the figure of a client (height, chest size, waist size, etc.: hereafter, "figure information") is displayed in the display section 12. The figure information of the client is inputted by operating the keyboard 1001 or mouse 1002 of the input device 10 in accordance with the display content (Step S1). The figure information is temporarily stored in the RAM 902.

Figure 7:
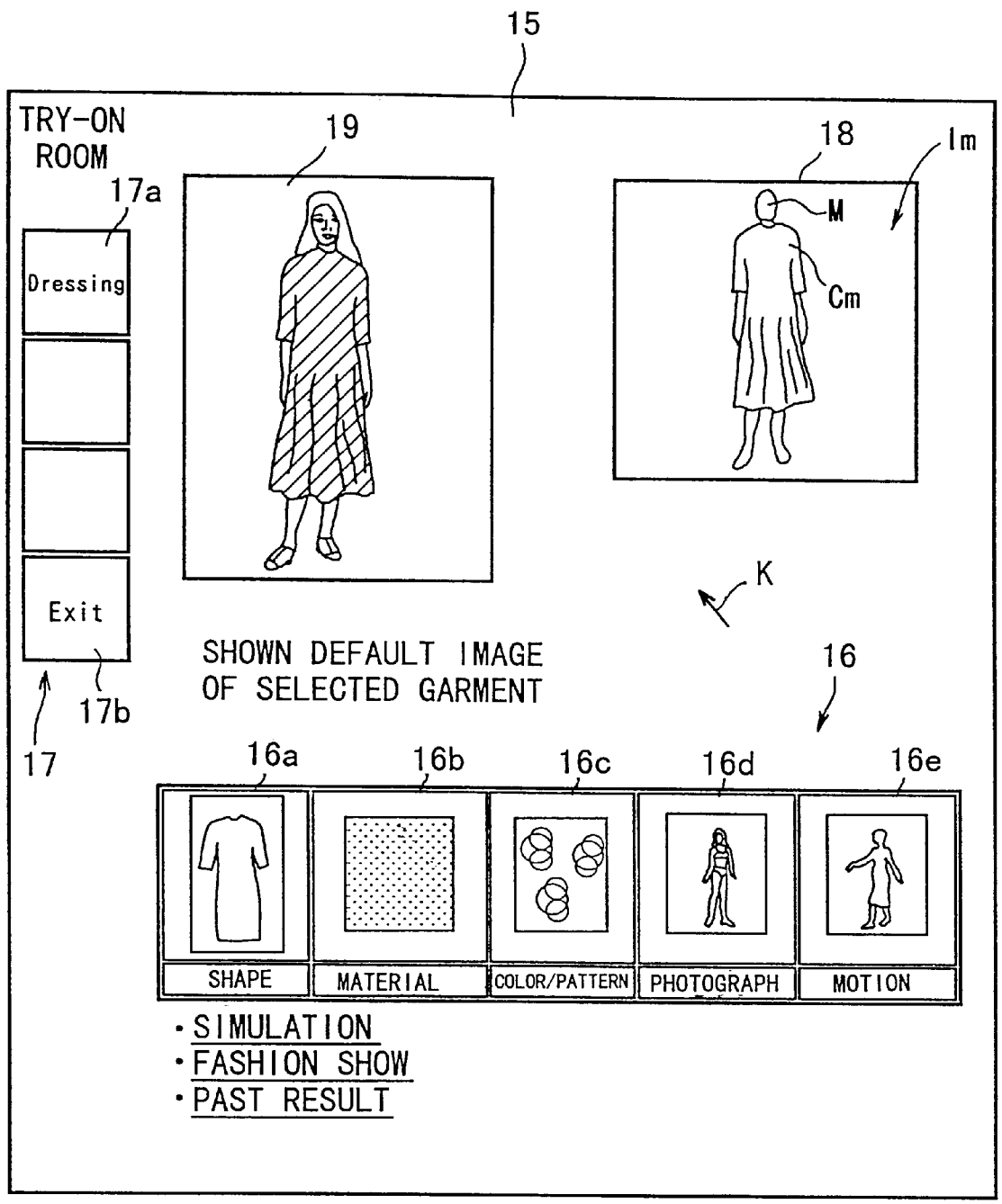
FIG. 7 is a diagram showing an exemplary basic screen displayed in a display section of the try-on image generating system.

Upon the completion of the input of the figure information, a basic screen shown in FIG. 7 is displayed in the display section 12 and the client selects a garment to be tried (Step S2). In a bottom-part of the basic screen 15 is displayed a box-shaped input window assembly 16 used to input a variety of pieces of information. The input window assembly 16 includes input windows 16a to 16c used to input information on the garment, an input window 16d used to select the image of the client and an input window 16e used to animate the standard figure model. At an upper left end of the basic screen 15 is displayed an input window assembly 17 used to input an instruction concerning the try-on image generation processing. Further, an intermediate window 18 for displaying a generation process of the stereoscopic image of the garment and a try-on window 19 for displaying the try-on image are provided in an upper right end position and an upper middle position of the basic screen 15. The input window assembly 17 includes an input window 17a used to instruct the start of the try-on image generation and an input window 17b used to instruct the end thereof.

The shape of the garment to be tried is selected by clicking the mouse 1002 after bringing the cursor K to the input window 16a for the "shape". When an input of the "shape" is selected by the cursor K, an unillustrated pop-up screen appears on the basic screen 15 and an index image (an image in which a plurality of garment images having different shapes are arranged in a matrix) concerning the shape of the garment which is stored in the external storage device 11 is displayed. If the mouse 1002 is clicked after bringing the cursor K to a desired shape in the index image, the selection of the shape is inputted and an image of the garment having the selected shape is displayed in the input window 16a. If the shape of the garment other than the one being presently displayed in the input window 16a for the "shape" is selected from the index image, the display content of the input window 16a is changed.

The "material" and "color/pattern" of the garment to be tried are also selected by substantially the same manner as in the case of the "shape", and the selected material and color/pattern are displayed in the input windows 16b, 16c. As described above, the information on the garment can be easily inputted and changed using the mouse 1002 in this embodiment.

Upon the input of the information on the garment, the human image to be combined into the try-on image is inputted (Step S3). The human image is inputted by scanning a full-length portrait picture of the client, which he brought, by the scanner 14. The human image obtained by the scanner 14 is newly stored in the external storage device 11. When the input of a "picture" is selected by the cursor K, an unillustrated pop-up screen appears on the basic screen 15, and the human image newly stored in the external storage device 11 is displayed with an index. The image of the client is inputted by selecting this human image by means of the mouse 1002 in substantially the same operation as the selection of the "shape".

In the case that the human image is picked up by actually photographing the client by the digital camera 14 as well, the photographed image is newly stored in the external storage device 11 as in the case that the human image is obtained by scanning the picture of the client by the scanner 14, and the picked image is displayed with an index in the pop-up screen and is selected and inputted by means of the mouse 1002. In the case that images of a plurality of clients are already stored in the external storage device 11, an index image of these clients is displayed in the pop-up screen, and the image of the client concerned can be selected and inputted by means of the mouse 1002 in substantially the same operation as in the case of the "shape" of the garment.

The human image is preferably an image of the client in, e.g., swimming costume so that his/her figure can be clearly seen. However, it is not limited to that. For example, it is preferable that the client be wearing a shirt and/or a tie in the case of a virtual try-on of a jacket, coat or the like. The essential thing is to prepare a human image suitable in connection with the garment to be tried on.

Subsequently, if the mouse 1002 is clicked after bringing the cursor K to the input window 17a for the "start" of the try-on image generation processing, the generation processing of the try-on image is started. First, a stereoscopic image of the garment is generated using the standard figure model having a standard figure to which the figure of the client belongs (Step S4). Specifically, the image data (image data of patterns) of the garment selected to be tried and the 3D image data of the standard figure mode corresponding to the figure of the client are transferred from the external storage device 11 to the memories 801, 802. Further, the human image to be combined for the try-on image is transferred from the external storage device 11 to the image memory 804. The pieces of information on the material and color/pattern of the garment to be tried which are selectively inputted by means of the input window 16b for the "material" and by the input window 16c for the "color/pattern" are temporarily stored in the RAM 902. Using the image data of the patterns and the 3D image of the standard figure model stored in the memories 801, 802, a stereoscopic image C of the garment is generated by the garment image generator 803 as shown in FIGS. 8A and 8B according to a method similar to the aforementioned method for generating a stereoscopic image of a garment. Since the stereoscopic image C is so generated as to suit on the standard figure mode M having the figure of the client, it is a garment image of a size corresponding to the standard figure to which the figure of the client belongs. For example, if the figure of the client is a small (S) size, a stereoscopic image of the S size garment to be tried is generated. The generation process of the stereoscopic image of the garment to be tried is displayed in the intermediate window 18 of the basic screen 15.

Figure 9:
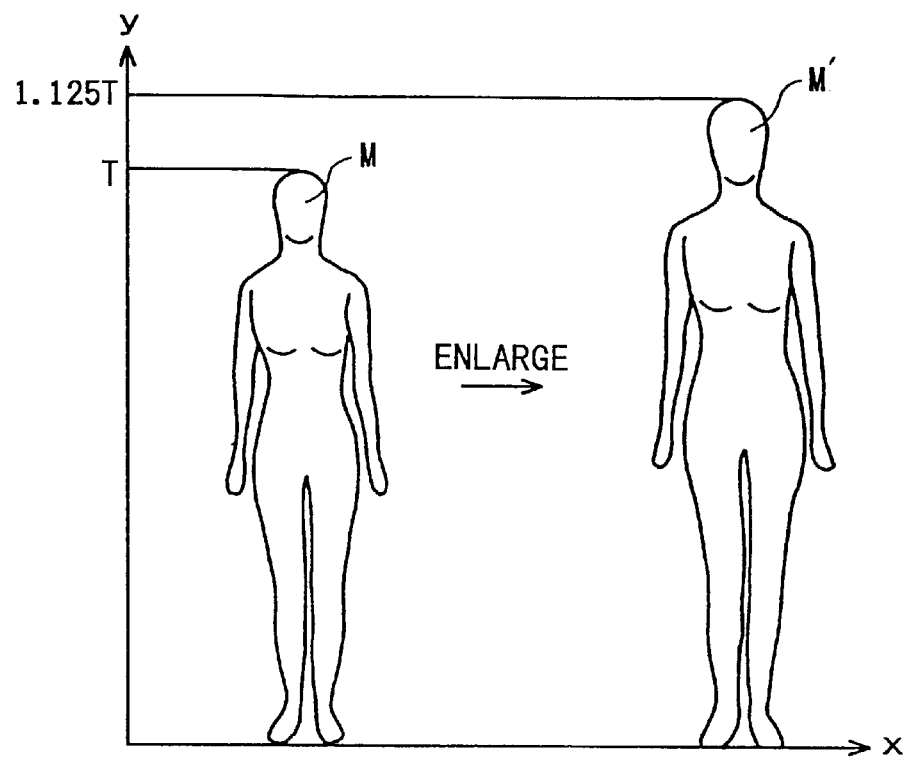
FIG. 9 is a diagram showing a method for generating an image of a desired individual figure model by enlarging an image of a standard figure mode as a whole.
Figure 10:
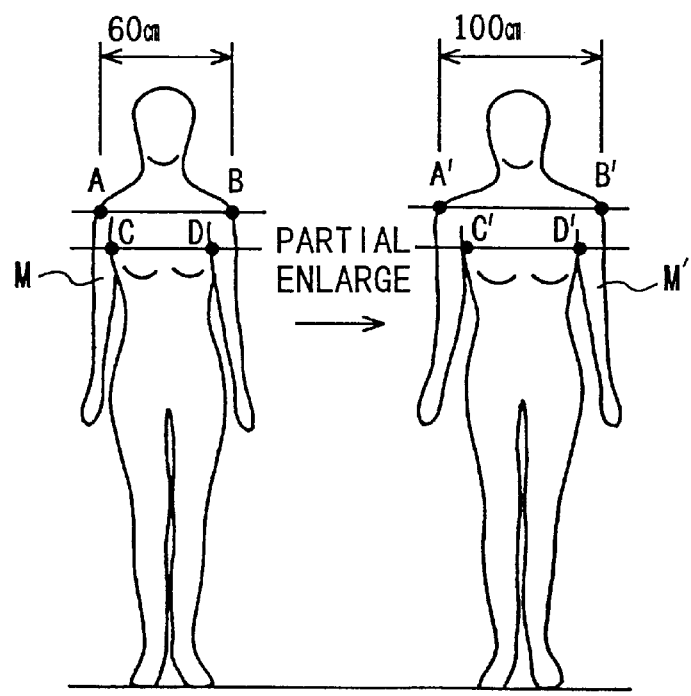
FIG. 10 is a diagram showing a method for generating an image of a desired individual figure model by partly enlarging an image of a standard figure mode.

Subsequently, a necessary deformation processing (e.g., full-size enlargement/reduction and partial enlargement/reduction) is applied to the standard figure model M based on the figure information of the client inputted via the input device 10, and a 3D image of a human model M' having an actual figure of the client (hereinafter, "individual figure model) is generated (Step S5). The 3D image of the individual figure model M' is generated by enlarging (or reducing) the whole standard figure model M at a specified ratio as shown in FIG. 9 in the case of full-size enlargement (or reduction). On the other hand, in the case of partial enlargement (or reduction), the 3D image of the individual figure mode M' is generated by enlarging (or reducing) a corresponding portion of the 3D image of the standard figure model M and enlarging (or reducing) related portions to a desired size by a FFD (free form deformation) method as shown in FIG. 10.

FIG. 9 shows an example in which the individual figure model M' is generated by changing the height of the standard figure model from 160 cm to 180 cm. A y-axis dimension T of the standard figure model M is elongated by 1.125 (=180/160) and the dimensions of the respective body parts of arms, legs, chest, waist, hips are enlarged by 1.125. FIG. 10 shows an example in which the individual figure model M' is generated by broadening the shoulder width of the standard figure model M from 60 cm to 100 cm. Control points A, B (distance between points A and B corresponds to 60 cm) are changed to control points A', B' (distance between points A' and B' corresponds to 100 cm), and control points C, D in the chest are changed to control points C', D' calculated by the FFD method.

Subsequently, the respective parts of the 3D image of the individual figure model M' are gradually moved so that the posture of the individual figure model M' substantially agrees with that of the client in the human image as shown in FIG. 8C (Step S6). The stereoscopic image C of the garment is also deformed as the individual figure model M' is deformed. The stereoscopic image C of the garment is deformed by performing substantially the same calculation as the aforementioned collision calculation of the human model and the patterns.

By this deformation processing is generated an image Im (see FIG. 8C) viewed from front in which the individual figure model M' having substantially the same figure as the client is wearing the garment C the client selected and is taking substantially the same pose as the client in the human image. This front image Im is displayed in the intermediate window 18 of the basic screen 15. An image Cm (two-dimensional image of the stereoscopic image of the garment when viewed substantially from front) of the garment in the front image Im is to be used for the combination of the try-on image.

In the calculation models used in Steps S5, S6 are used all known techniques. These techniques are the FFD method and the one described in detail in "Method for estimating a posture of an articulated body from a silhouette image" by Norishige Kameda, Michihiko Minou, Katsuo Ikeda, Paper on the Electronic Information/Communications Society, J79-D-II, 1, pp. 26–35 (1996). Accordingly, no description is given here.

Figure 11A:
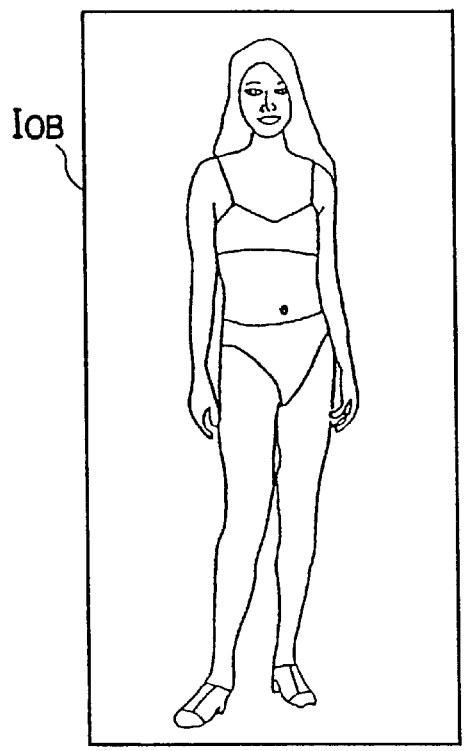
FIGS. 11A to 11C are diagrams showing a procedure of generating a try-on image by chroma key combination.
Figure 11B:
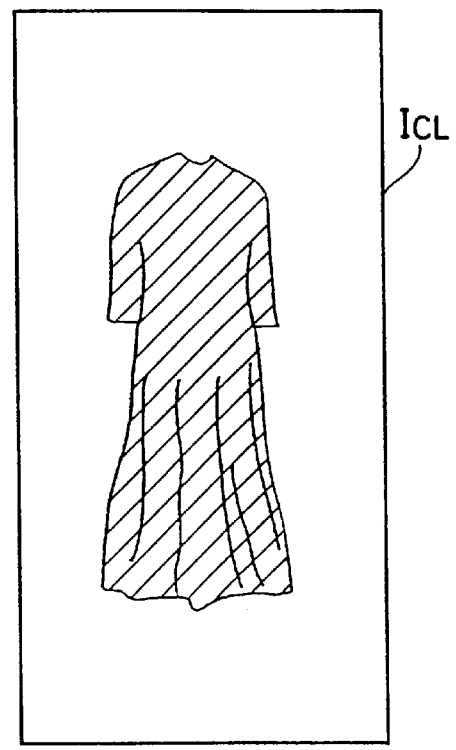
Figure 11C:
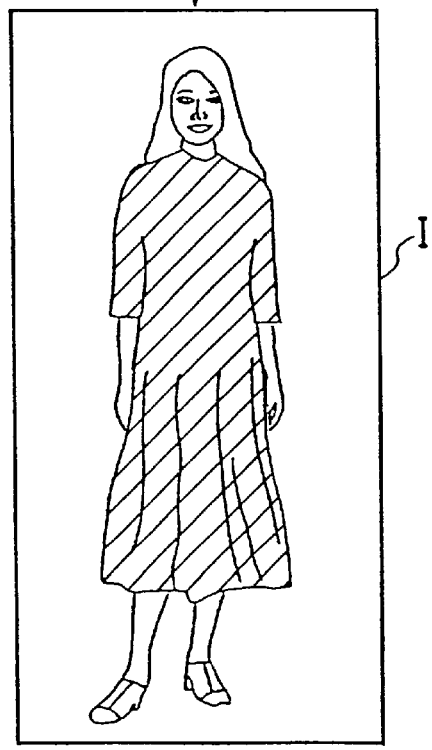

When the garment image Cm used for the combination of the try-on image is obtained as described above, the information on the color and pattern selectively inputted via the "color/pattern" window 16c is read from the RAM 902, and the color and pattern are given to the garment image Cm based on the read information (Step S7: see FIG. 11B). Then in Step S8, a background color is calculated for the chroma key combination. In this embodiment, after the intensities of red (R), green (G) and blue (B) components are calculated in, e.g., 256 gradation values for each of the pixels constituting the colored and patterned garment image Cm, a histogram of the pixel number showing the respective gradation values (0 to 255) is obtained for each color component as shown in FIG. 12. Further, average values AVR, AVG, AVB are calculated to calculate a color component, which is a main component of the color components of the color and pattern. Then, how distant a color (main color component) made of R, G, B components having the gradation values represented by the average values AVR, AVG, AVB is from blue (gradation values of the R, G components=0, gradation value of the B components=255) is quantitatively calculated. Blue is chosen as a background color if the distance is larger than a predetermined value, and a color having a complementary relation to the color specified by the gradation values AVR, AVG, AVB if it is equal to or smaller than the predetermined value. In this embodiment, the average values AVR, AVG, AVB are shifted by 126 (=256/2) as shown at the bottom of FIG. 12, and a color specified by gradation values AVR', AVG', AVB' after the shift is set as a complementary color. A method for calculating the complementary color is not limited to the above.

Upon the determination of the background color, an image $I_{CL}$ used to extract a garment image is generated by setting the background of the front image Im of FIG. 8C and the individual figure model M' in the background color (Step S9: see FIG. 11B). A human image $I_{OB}$ (FIG. 11A) of the client is read from the image memory 804, and the chroma key combination is applied to this human image $I_{OB}$ and the extracted garment image $I_{CL}$ to generate a try-on image I (Step S10). Thereafter, the try-on image I is outputted to the try-on image window 19 of the basic screen 15 to be displayed, and is printed according to a print command (Step S11).

As described above, according to the virtual try-on system of this embodiment, only by providing the human image of the client, the figure information on the figure of the client and the garment information on the garment to be tried, the garment image can be actually generated and the try-on state can be virtually imaged without actually putting the garment on the client. Further, since such a virtual try-on processing is performed by calculation, a variety of try-on states can be easily and quickly confirmed by suitably combining the human image, the figure information and the garment information on the garment to be tried.

Although various calculations are performed by the single CPU 1 in this embodiment, a plurality of CPUs may be provided for parallel processing, thereby further speeding up the virtual try-on processing.

Further, it is also possible to generate a try-on image based on a human image of a person desiring to try a garment on (client) . With this possibility, unlike existing usual catalogues made up of images in which models different from the client are wearing desired garments, a state where the desired garments are put on the client's body can be observed. This is a great help in selecting the garment.

Furthermore, the worn state is changed in a three-dimensional and animated manner by gradually changing the standard figure model M to the figure and posture of the client while considering the material information of the garment. The garment image Cm in the worn state at the time when the change in the figure and posture is completed is obtained as the garment image for the chroma key combination. Accordingly, a realistic try-on image approximate to the try-on state where the client is actually wearing the garment can be obtained.

In this embodiment, the chroma key combination method is used as an image combining method. Prior to the chroma key combination, the main color component of the color and pattern of the garment is calculated, the color having a complementary relation to this main color component is calculated, and the complementary color is set as a key color if the main color component of the color and pattern of the garment is blue or a color similar to blue. Accordingly, an occurrence of a conventional problem which occurs when the chroma key combination is applied while uniformly setting blue as a key color, regardless of the color and pattern of the garment (i.e., a problem that blue portions become transparent if the color and pattern of the garment contain in a great deal) can be prevented. As a result, a realistic try-on image can be constantly generated.

FIG. 13 is a block construction diagram showing another embodiment of the virtual try-on system. This system is of the network type and enables a server 20 and a client unit 30 to conduct a bilateral communication via a network such as Internet or Intranet.

In this embodiment, the server 20 is comprised of a network server 21, an application server 22 and a database server 23. The network server 21 controls a bilateral communication with the client unit 30, and the database server 23 is adapted to store the information on the patterns of the garment and the figures of the standard figure models. The application server 22 transmits, in response to the access of the client unit 30, the information to be displayed on the basic screen 15 (see FIG. 7) similar to the foregoing embodiment to the client unit 30 via the network server 21, receives a variety of pieces of information sent from the client unit 30 in accordance with the basic screen 15, and generates a try-on image based on the received information and various pieces of information read from the database server 23. Specifically, the application server 22 is provided with an image memory 2201 for temporarily storing the human image sent from the client unit 30 for the virtual try-on, and a garment image generator 2202, and reads the garment information including material information and sewing information from the database server 23 based on the garment, material, color/pattern selected by the client unit 30 to generate the garment image $I_{CL}$ representing the garment suited to the figure of the client. The garment image $I_{CL}$ generated by the garment image generator 2202 and the human image $I_{OB}$ of the client are given to the try-on image generator 2203, where the chroma key combination is applied thereto to generate the try-on image I.

On the other hand, the client unit 30 is provided with a user terminal 31 connected with the network, a display device 32 electrically connected with the user terminal 31 and an image reader 33. Upon accessing the server 20 via the network as described above, the client unit 30 receives the information concerning the basic screen 15 sent from the server 20, displays the basic screen 15 in the display device 32, and transmits pieces of information selected and inputted by operating a keyboard and/or mouse (not shown) in accordance with the basic screen 15 and the human image of the client obtained by the image reader 33 to the server 20 via the network.

Next, a procedure of the try-on image generation using the virtual try-on system constructed as above is described with reference to FIGS. 14 and 15. There are a variety of virtual try-on modes. Here, for the sake of convenience, description is limited to the following procedure. An operator (trying person) at the side of the client unit 30 generates a human image of the trying person by scanning a full-body portrait picture of the trying person using the scanner (image reader) 33, and selects a garment he wants to try from a variety of pieces of garment information already stored in the database server 23. Thereafter, a try-on image virtually showing a try-on state where the trying person is wearing this garment is generated and displayed in the display device 32 of the client unit 30.

First, when the operator accesses the web page of the server 20 by operating the keyboard (not shown) of the client unit 30 (Step S21), the server 20 transmits, in turn, the information concerning the screen (figure input screen) used to input the information on the figure of the trying person to the client unit 30 (Step S31).

At the side of the client unit 30, the figure input screen is displayed in the display device 32 based on the information on the figure input screen, and the operator inputs the figure information of the trying person in accordance with the display content by means of the keyboard or mouse (Step S22). The thus inputted figure information is transmitted to the server 20 via the network. Then, at the side of the server 20, the figure information is temporarily stored in a RAM (not shown) of the application server 22 and the information concerning the same basic screen 15 as the one of FIG. 7 is transmitted to the client unit 30 (Step S32).

At the side of the client unit 30, the basic screen 15 (see FIG. 7) is displayed in the display device 32 based on the received information concerning the basic screen 15. Then, the garment information on the garment to be tried, its material and its color/pattern, etc. is selected and inputted in the same manner as in the foregoing embodiment (stand-alone type) (Step S23), and the human image of the trying person is obtained by the scanner (image reader) 33. Thereafter, the implementation of the virtual try-on is instructed by clicking the input display 17a (FIG. 7) for the "start" by the mouse (Step S25), and a variety of pieces of information selected and inputted as above are transmitted to the server 20 (Step S26). Then, in Step S33, the server 20 receives the pieces of information from the client unit 30, and performs the processing (Steps S34 to S40) corresponding to the one in Step S4 to S10 of the foregoing embodiment to generate the try-on image I. In other words, Steps S34 to S36 are implemented to obtain the individual figure model M' corresponding to the figure of the client and the stereoscopic image Cm of the garment suited to the individual figure model M'. Further, Step S37 to S40 are implemented to generate a combined image (try-on image) showing a try-on state. The basic screen 15 is so renewed that the combined image thus generated is displayed in the try-on display 19 thereof, and information on the renewed screen is transmitted to the client unit 30 via the network (Step S41).

At the side of the client unit 30, the information on the renewed screen from the server 20 is received (Step S27), and the basic screen 15 having a renewed content is displayed. Then, the try-on image appears on the try-on image window 19 of the basic screen 15 displayed in the display device 32, enabling the operator to confirm a state where he is wearing the garment he selected without actually wearing it.

As described above, according to this embodiment, realistic try-on states can be virtually viewed without actually putting the garment on the trying person and a variety of try-on states can be easily and quickly confirmed as in the foregoing embodiment. In addition, by utilizing the network, the virtual try-on can be realized in terminals (corresponding to the "client unit" in this embodiment) installed in various places such as a personal computer at home.

The virtual try-on system according to the invention is not limited to the foregoing embodiments, but also embraces the following embodiments.

(1) Although description is given on the cases where the garments are put on one trying person in the foregoing embodiments, the number of trying persons is arbitrary. If the virtual try-on is performed based on human images of a plurality of trying persons, which fashion suits which client can be confirmed. Particularly, such a system is effective in coordinating the fashion for a couple or uniforms of a team or group.

(2) Although the object on which the garment is tried is limited to a person in the foregoing embodiments, it may be an animal such as a dog, a cat or a horse or an animation character. Particularly in the case of putting a garment on an animation character, the production of garment animation images has been conventionally left to an other company and it takes several days to produce even simple garment images. Contrary to this, garment can be put on the character within a short period of time by using the virtual try-on method according to the invention. Therefore, more realistic animation can be produced at a reduced cost by using the inventive virtual try-on method.

(3) The virtual try-on systems according to the foregoing embodiments can be applied in many areas including the selection of garment, the search of desired garment, and the narrowing down of garment in the apparel industry which designs garment, the textile industry which designs textiles, the texture industry, department stores, boutiques, mail-order selling. By changing a part of the system construction, it can be applied to fields of amusements and events. For example, an electronic camera may be installed as the image reader 14 of the virtual try-on system of FIG. 5. An image of a user is picked up by this electronic camera, a desired garment is selected on the screen of the display device 12 by the user, and then a combined image representing the try-on state where the user is wearing the selected garment is generated. The generated image may be further printed on a seal or the like. Further, by applying the try-on image generating method to fighting games, the state of a garment may be changed (e.g., a part of the garment is wrinkled) as a character moves or the garment may be torn by an opponent's attack. This enables the generation of a realistic image which gives a player to give the feeling of actually fighting, thereby making the game more interesting and enjoyable.

(4) An image for adolescents such as a pornographic picture is harmful to minors. The try-on image generating method may be used to completely conceal obscenities by clothing a person in the image.

In the foregoing embodiments, description is given on the cases where the virtual try-on system is installed in a clothing retailer, and the client virtually tries a garment on by using the virtual try-on system upon purchasing the garment. However, the application of this virtual try-on system enables the easy and inexpensive production of a catalogue by collecting a plurality of try-on images, and also enables the production of a private catalogue in which the client poses as a model.

Next, a private catalogue production system capable of producing an individual fashion catalogue of a trying person is described as a second exemplary application.

For conventional fashion catalogues, trying persons such as models actually wear garments and are photographed in a photo-studio or on a location while taking a suitable pose. The fashion catalogues are printed after editing is performed. Accordingly, a fairly large scale of equipment and facilities are required for the photographing and a special staff needs to be gathered. Therefore, a huge amount of cost is required for the production of the catalogues. Further, for the photographing, all garments to be listed in the catalogue need to be prepared. This presents a problem of a huge cost for the preparation of the garments and also a problem of a relatively long period therefor. Thus, it takes a long time until the catalogues are completed after the catalogues are drafted.

Further, foreign models having largely different figures as general consumers are frequently used in the fashion catalogues provided by fashion companies and fashion retailers. General consumers cannot easily see whether garments suit them or not just by looking at the catalogue. As the consumer's trend of the recent years shows, consumers are eager to have a creative fashion which enables them to show their individuality, but not a fashion provided by fashion companies or magazines. There is a demand to produce fashion catalogues using general consumers as models. At present, there is no system that sufficiently meets this demand.

The private catalogue production system according to the second example of application solves the existing problems and enables an individual fashion catalogue of a client to be produced at a low cost and within a short period of time.

The private catalogue production system basically has the same construction as the virtual try-on system shown in FIG. 5 or 13 since it produces a catalogue by generating try-on images in which a client is wearing a plurality of garment and collecting these try-on images. The individual try-on images are generated in accordance with a flowchart of FIG. 16 obtained by partly amending the flowchart of FIG. 6 or in accordance with a flowchart of FIG. 17 obtained by partly amending the flowchart of FIGS. 14 and 15.

Figure 15:
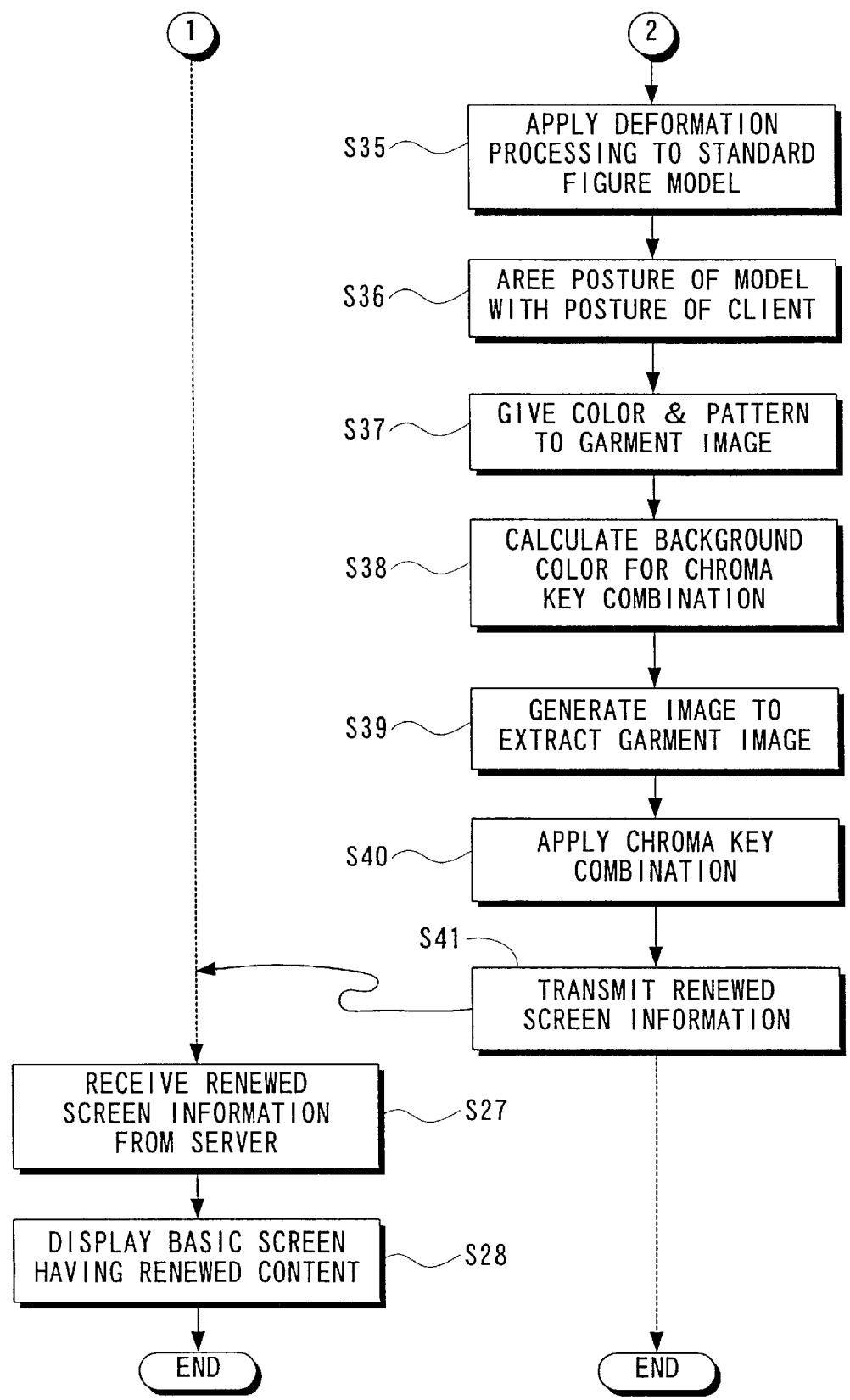
Figure 16:
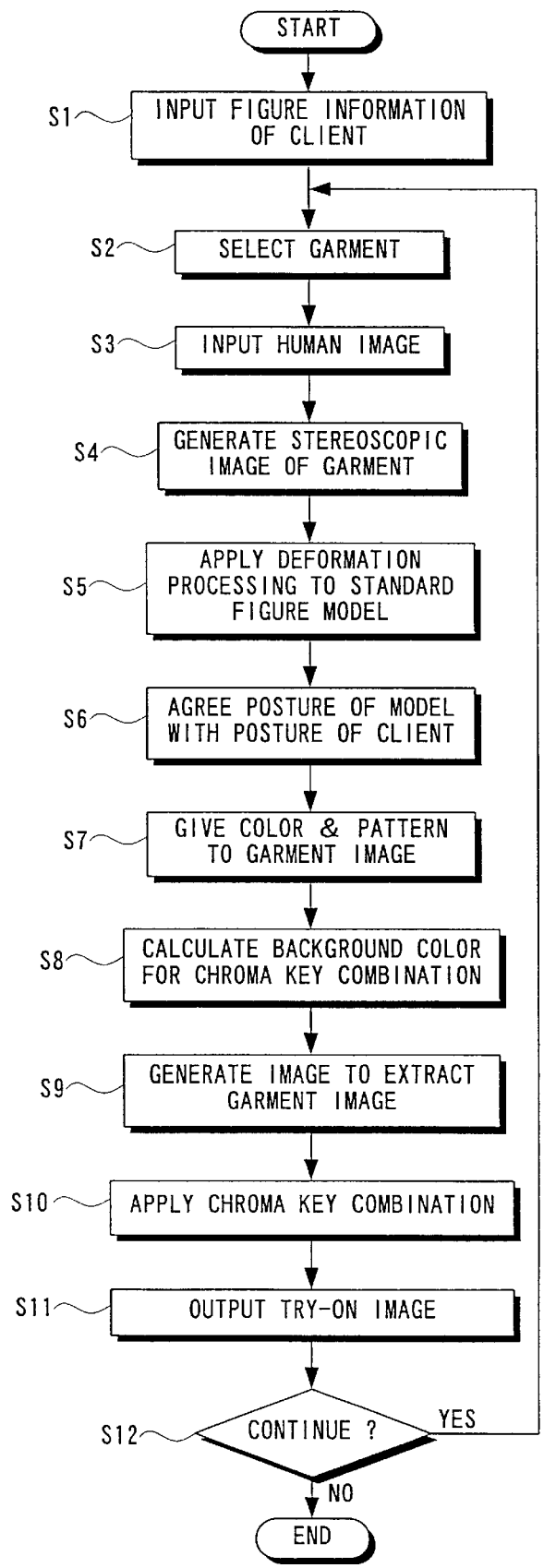
FIG. 16 is a flowchart showing a procedure of accumulating the try-on images in a private catalogue generating system of the stand-alone type.

The flowchart of FIG. 16 differs from that of FIG. 6 in that a discrimination (Step S12) as to whether the generation of a try-on image is to be continued is added after Step S11. The flowchart of FIG. 17 differs from that of FIG. 15 in that before transmitting information on the renewed screen for continuing the generation of a try-on image to the client unit, the combined image is stored in the database server 23 in Step S40-1.

Accordingly, a case where, after a plurality of try-on images are generated by repeating the try-on image generation processing in accordance with the flowchart of FIG. 16, a catalogue is produced by collecting these try-on images is briefly described here.

In the flowchart of FIG. 16, after a series of operations of Steps S2 to Step S12 are performed, the try-on image generated by these operations is stored in the external storage device 11. If the operator gives a command of issuing a catalogue at a suitable timing by operating the keyboard 1001 or mouse 1002 after a plurality of try-on images are stored in the external storage device 11, the catalogue is issued in accordance with a flowchart of FIG. 18.

Upon the command of issuing the catalogue, a mode of the catalogue is selected in Step S50. In this embodiment, three modes: "print" for actually printing the try-on images on catalogue paper, "CD-ROM Edition" for storing the try-on images in a CD-ROM, which is then distributed, and "Internet Edition" for providing the try-on images via a network, are prepared as catalogue modes. Following operations are performed in accordance with the selected catalogue mode.

If the "print" mode is selected in Step S50, the try-on images are read from the external storage device 11 (Step S51) and printed by a printer 13 (Step S52). The operations of Steps S52, S53 are repeated until it is judged that all try-on images have been printed. The catalogue is produced by binding printed pieces of paper.

If the "CD-ROM Edition" mode is selected in Step S50, the image data of the try-on images stored in the external storage device 11 are copied on a compact disk (storage medium) to produce a catalogue of the CD-ROM edition (Step S54).

If the "Internet Edition" mode is selected in Step S50, a link information with the try-on images is set in a web page (Step S55). By setting the link information in this way, the try-on images can be viewed via network even in a place remote from the private catalogue production system by accessing the web page.

Figure 14:
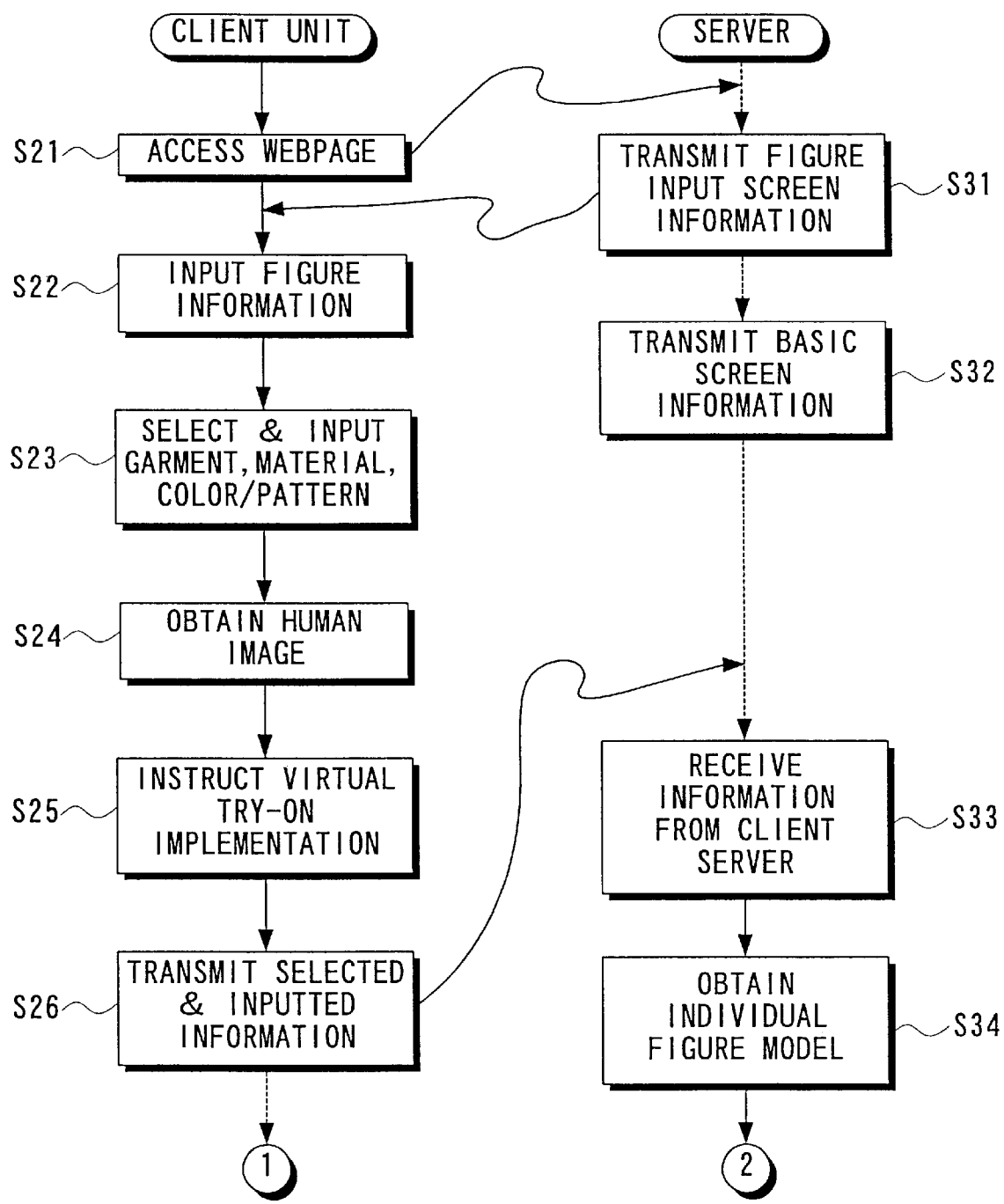
FIGS. 14 and 15 are a flowchart showing a procedure of generating a try-on image in the system of FIG. 13.
Figure 17:
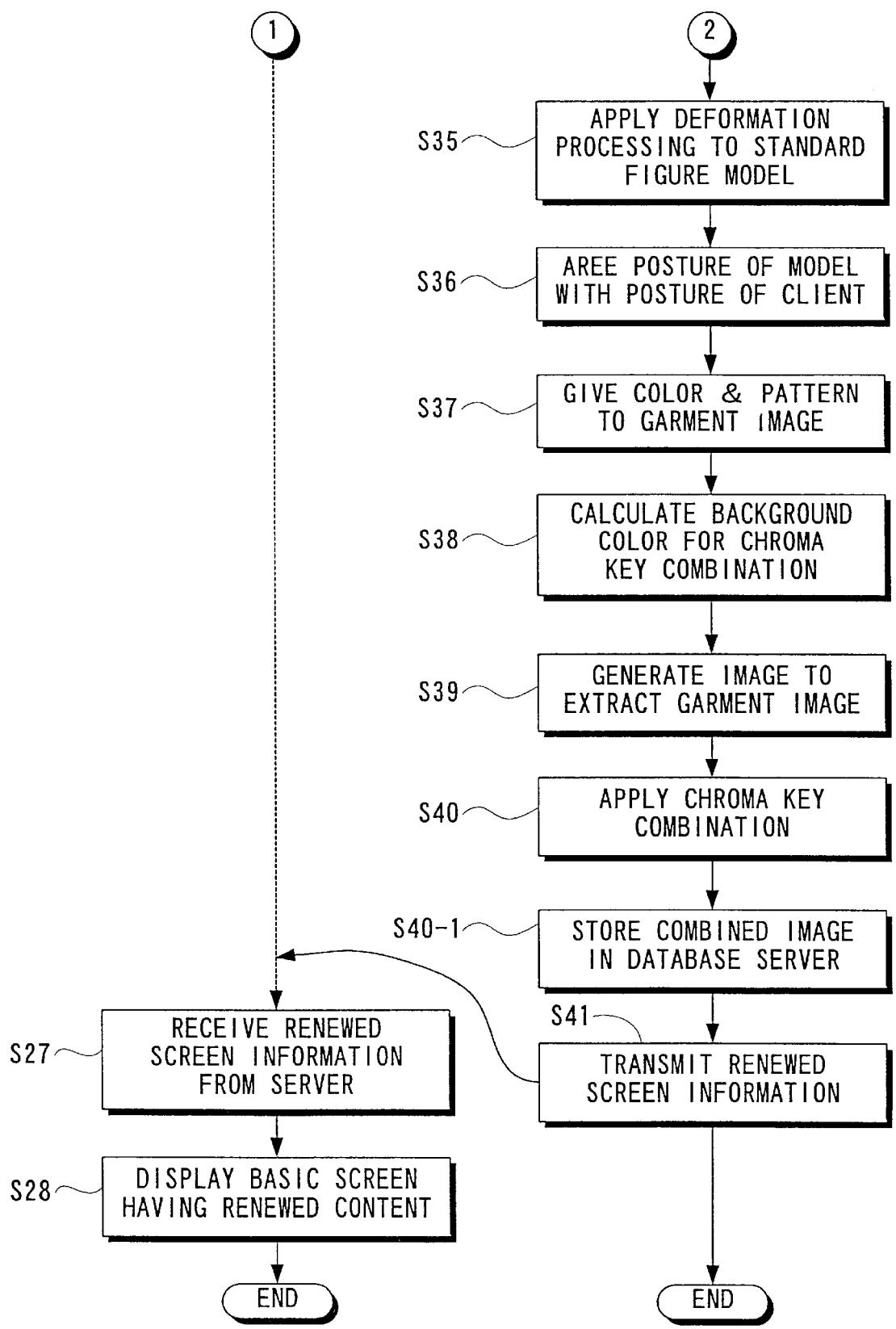
FIG. 17 is a flowchart showing a procedure of accumulating the try-on images in a private catalogue generating system of the network type.
Figure 18:
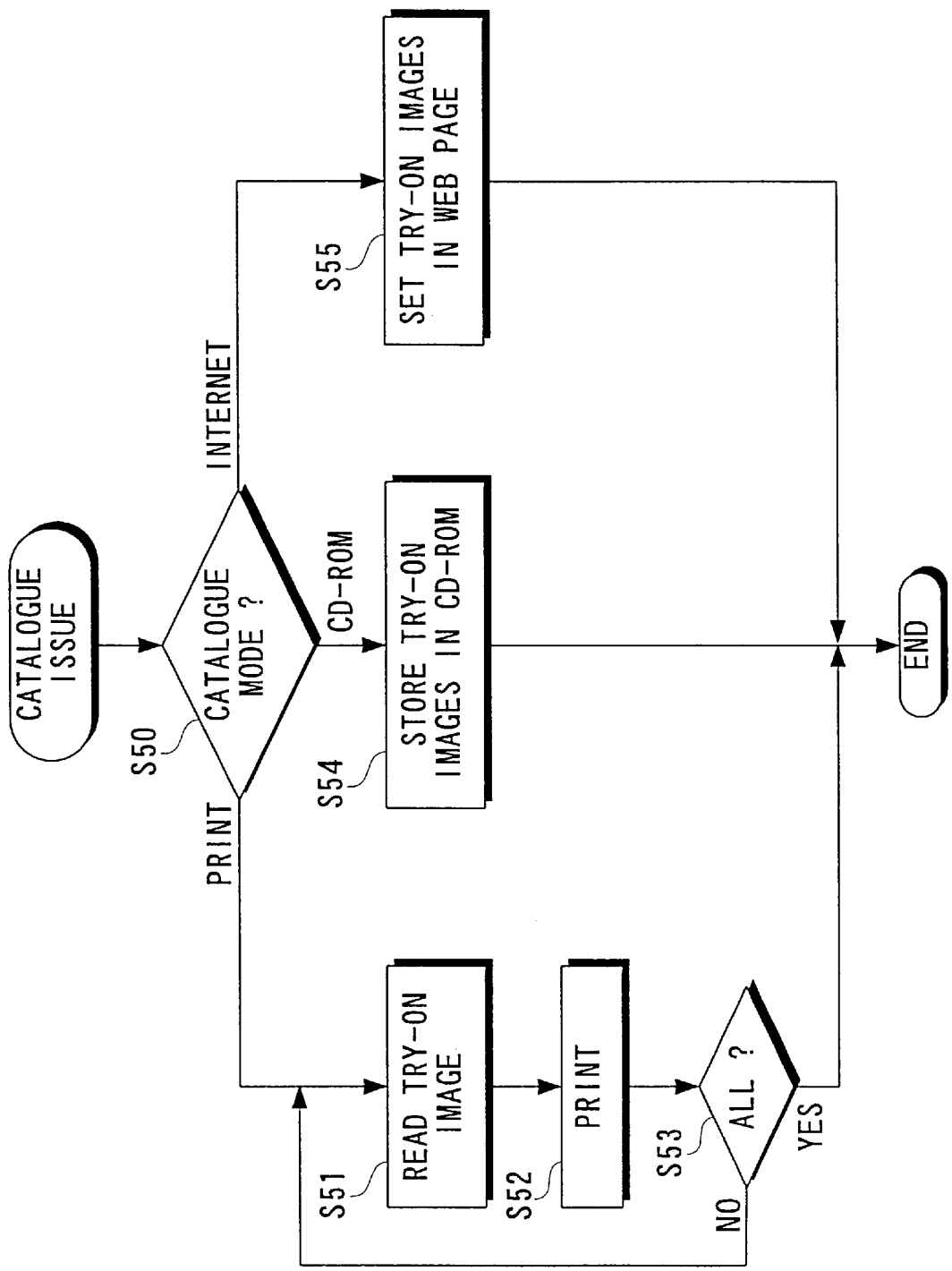
FIG. 18 is a flowchart showing a procedure of preparing a catalogue in accordance with a catalogue issuance mode.

Also in the case that a plurality of try-on images are stored in the external storage device 11 in accordance with the flowchart of FIGS. 14 and 17, the catalogue is produced in accordance with the flowchart of FIG. 18 if the client unit 30 gives the command of producing the catalogue at a suitable timing.

As described above, in the private catalogue production system according to this embodiment, the garment image can be actually generated and the try-on state can be virtually imaged without the trying person trying the garment on only by providing the human image of his, the figure information on his figure, and the garment information on the garment to be tried. Further, since such a virtual try-on processing is performed by calculation, a variety of try-on states can be easily and quickly confirmed by suitably combining the human image, the figure information and the garment information on the garment the trying person wants to try. Accordingly, unlike the conventional practice, the production of the catalogue requires neither large-scale equipment or facilities nor special staff. Therefore, the catalogues can be produced at a reduced cost and within a short period of time.

Further, with the private catalogue production system according to this embodiment, any person can be a model in the catalogue unlike usual catalogues made up of images in which models different from the trying person are wearing the garment he wants. Accordingly, a private catalogue in which the trying person is a model can be easily produced.

Next, a third exemplary application is described. This example is designed to generate a 3D image of a garment suited to the figure of a client by the computer graphics and to generate a pattern image of the garment from this 3D image.

Conventionally, apparel manufacturers have prepared patterns of garments using a CAD (computer aided design) system exclusively used for apparel. In this CAD system, a plurality of reference lines are set in advance on standard patterns, and displacement amounts of the reference lines resulting from a garment size are set in advance. Patterns of a garment of an arbitrary size are prepared by changing the reference lines of the standard patterns in accordance with a specified size.

According to the conventional pattern preparing method, desired patterns are prepared by geometrically deforming the standard patterns of preset standard figures such as sizes S, M, L, LL. This method can only prepare roughly deformed patterns for the respective standard figures, and it is difficult to readily and easily prepare patterns most suited to the figure of the client (i.e., to readily and easily prepare a garment suited to the client's order.

Since the conventional CAD system is of the stand-alone type which is built exclusively for the apparel manufacturers, it is expensive and requires a special operator skilled in this CAD system. Thus, it is also difficult for a person other than a specialist to readily and easily prepare patterns of a garment of a desired size. Needless to say, general users are not in a situation where they can utilize the above CAD system in making their own garment by themselves. Even in the case that they could make their own garment if they had patterns, it would be difficult to obtain precise patterns most suited to their figures. It is an actual situation that they have to rely on tailors or dressmakers.

The third exemplary application concerns a pattern preparing system for a garment which can readily and easily prepare precise patterns suited to a desired figure using a 3D image generated by the computer graphics, and serves as an effective means for solving the above problems.

Figure 19:
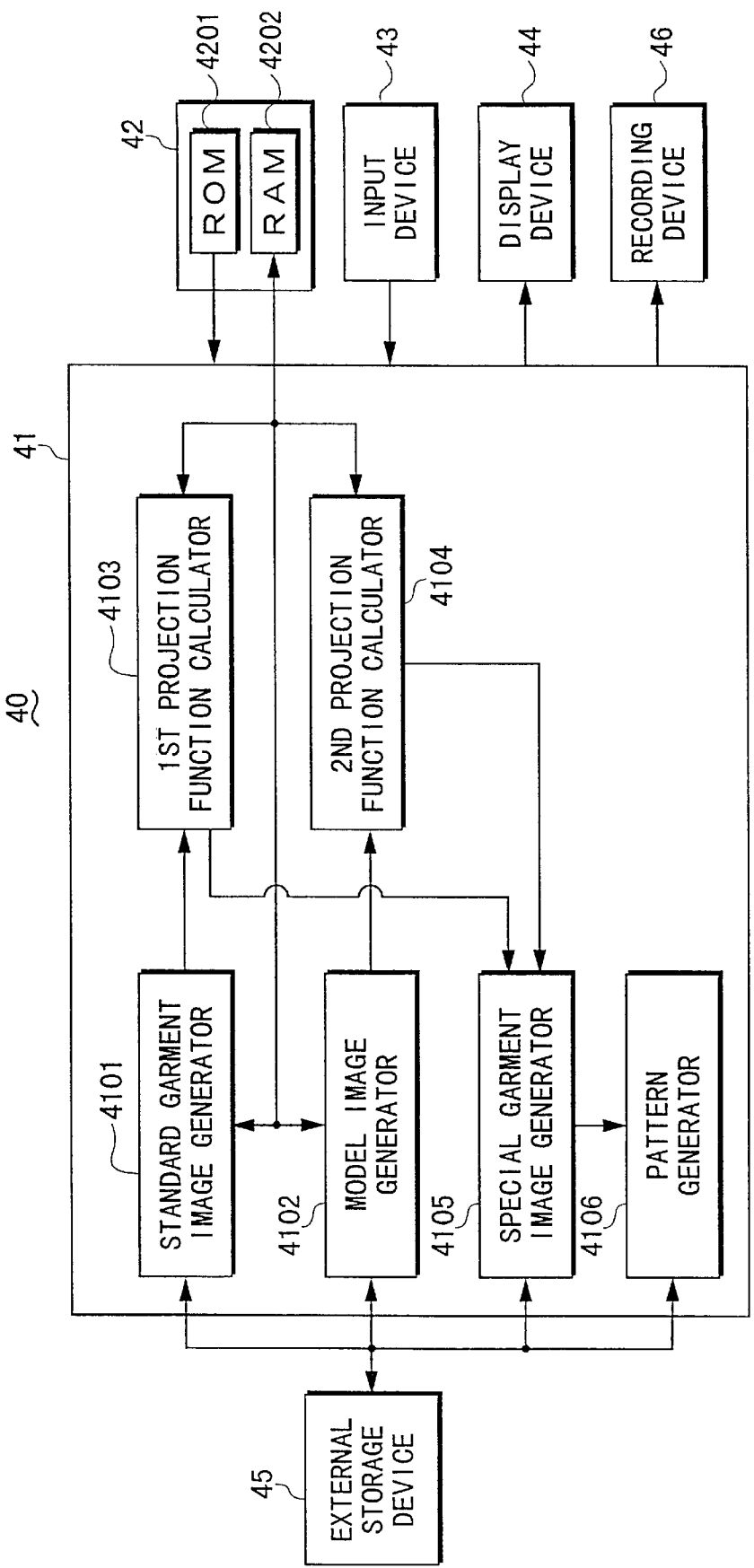
FIG. 19 is a block diagram of one embodiment of a pattern preparing system of stand-alone type.

FIG. 19 is a block construction diagram of one embodiment of the garment pattern preparing system.

The garment pattern preparing system of FIG. 19 is of the stand-alone type, and generates pattern images of a garment suited to the individual figure of a client using a 3D image generated by the computer graphics.

As described later, the pattern preparing system 40 causes an individual figure model suited to the figure of the client to appear in the virtual space of the computer graphics, generates a stereoscopic image of a desired garment for this individual figure model, and prepares a plurality of patterns of this garment from the stereoscopic image of the garment. Accordingly, patterns can be more readily and easily generated by this system than by the conventional CAD system exclusively used for apparel. Thus, this system can be effectively used as a tool for supporting the pattern designing in the apparel industry which designs garments and the pattern designing in an order-made system of garments in department stores, boutiques, and mail-order selling and also as a tool for supporting factory boutiques which are a latest mode.

Here, before describing the pattern preparing system 40, the summary of a pattern preparing method employed by the pattern preparing system 40 is briefly described.

The pattern preparing system 40 has an image data of a standard figure model and 3D image data of a plurality of patterns of a garment suited to the standard figure model (hereinafter, "standard garment"). As described above with reference to FIG. 4, the respective patterns D (planar in the virtual space) of the standard garment image C are pressed against the corresponding portions of the standard figure model M in the virtual space of the computer graphics, thereby being deformed into specified shapes. A stereoscopic image of the standard garment C put on the standard figure model M is generated by connecting these deformed patterns D (deformed into stereoscopic images) under specified sewing conditions. A first projection function T representing a correspondence between the standard figure model M and the standard garment image C is calculated using the two 3D images.

The first projection function T represents, for example, the 3D image of the standard figure model as a surface model formed by triangular patches. On the other hand, if it is assumed that a plurality of lattice points are provided in the image by dividing the 3D image of the standard garment C by standard lattices in which rectangular frames are regularly arranged, the first projection function T represents a mutual positional relationship between the respective lattice points in the image of the standard garment C and the respective triangular patches of the standard figure model M (i.e., a relative distance relationship of the standard garment C with respect to the surface of the standard figure model M). Specific data representing the positional relationship between the lattice points in the image of the standard garment C and the triangular patches of the standard figure model M (correspondence between coordinates of the lattice points in the coordinate systems defined in the virtual space and those of the triangular patches) is calculated in the form of a list.

Figure 20A:
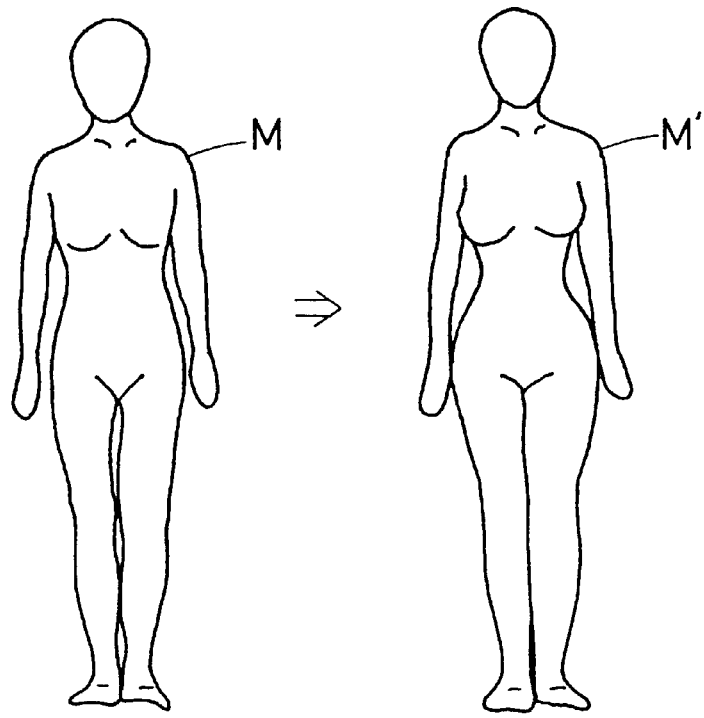
FIGS. 20A and 20B are diagrams showing a standard figure model and an individual figure model obtained by deforming the standard figure model.
Figure 20B:
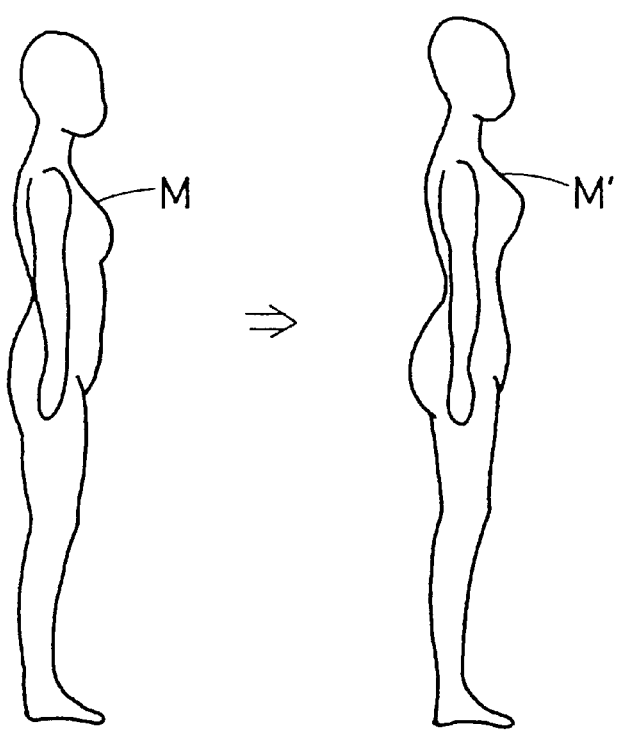

Subsequently, the pattern preparing system 40 deforms the 3D image of the standard figure M based on the externally inputted figure information of the client (e.g., information on the height, shoulder width,. chest size, trunk size, waist size, and the like of the client), thereby generating a 3D image of an individual figure model M' as shown in FIGS. 20A and 20B, and calculates a second projection function F representing a correspondence between the individual figure model M' and the standard figure model M.

The second projection function F represents a mutual positional relationship between the triangular patches forming the surface of the standard figure model M and those forming the surface of the individual figure model M' (i.e., vector displacements of the respective triangular patches forming the surface of the standard figure model M). Specific data representing the positional relationship between the triangular patches of the standard figure model M and those of the individual figure model M' (i.e., correspondence between the coordinates of the pairing triangular patches in the coordinate systems defined in the virtual space) are calculated in the form of a list.

Figure 21A:
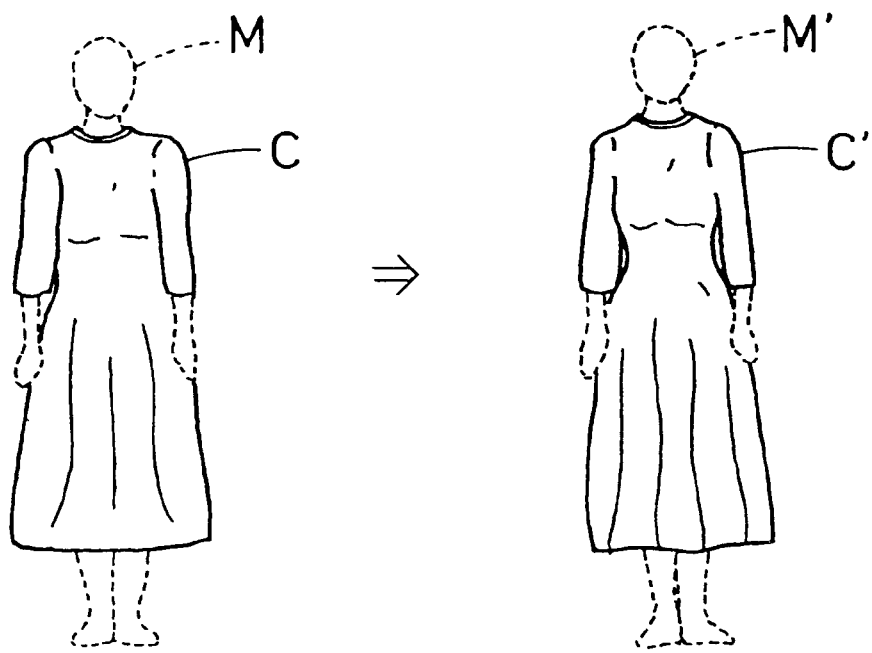
FIGS. 21A and 21B are diagram showing a process for generating a special garment image for the individual figure mode by deforming a standard garment image.
Figure 21B:
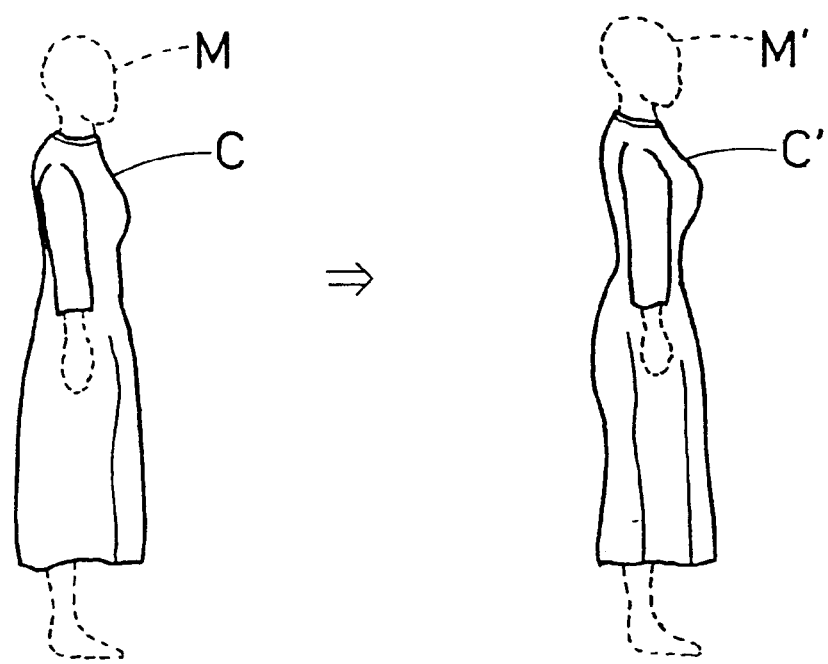

Subsequently, the pattern preparing system 40 deforms the stereoscopic image of the standard garment C using the first and second projection functions T, F, thereby generating a stereoscopic image of a garment C' (hereinafter, "special garment") suited to the size of the individual figure model M' as shown in FIG. 21, and generates two-dimensional (2D) images of patterns D' for the special garment C' using the stereoscopic image of the special garment C'.

FIG. 22 is a diagram representing the pattern generating method described above by mathematical modeling.

In FIG. 22, reference numerals C, C', D, D', M, M', T, F identify the same as those described above. A projection function S is a function for projecting the images of the patterns D on the stereoscopic image of the standard garment C when the image of the standard garment C is generated from the images of the patterns D. A projection function Z is a function for projecting the stereoscopic image of the special garment C' onto the 2D images of the patterns D' when the 2D images of the patterns D' are generated from the stereoscopic image of the special garment C'. Further, a projection function G is a function for projecting the stereoscopic image of the standard garment C onto the stereoscopic image of the special garment C' when the stereoscopic image of the special garment C' is generated from the stereoscopic image of the standard garment C.

If the projection function G is known, the stereoscopic image of the special garment C' can be obtained by generating the 3D image of the standard garment C for the standard figure model M and deforming it using the projection function G. However, the projection function G cannot be known since it involves deformation parameters of the standard garment C based on the figure of the client. That is, the stereoscopic image of the special garment C' cannot be obtained from the stereoscopic image of the standard garment C. Even if the figure information of the client is obtainable for each client, this figure information is not directly related to the special garment C'. Therefore, it is not easy to determine the projection function G based on the figure information of the client.

On the other hand, the stereoscopic image of the standard garment C for the 3D image of the standard figure model M can be generated in the virtual space, and the stereoscopic image of the individual figure model M' can be generated by deforming the 3D image of the standard figure model M based on the figure information of the client. Accordingly, the stereoscopic image of the special garment C' can be obtained if the projection relationship of the standard figure model M and the individual figure model M' is applied to the stereoscopic image of the standard garment C. Therefore, in this pattern preparing system 40, the generation of the stereoscopic image of the special garment C' by the projection function G is equivalently accomplished by following a course of from the standard garment C, to the standard figure model M, to the individual figure model M' and to the special garment C'.

The above projection relationship can be mathematically represented as follows.

$$C=T(M)=S(D, M) \qquad (1)$$

$$M=T^{-1}(C)$$

$$M'=F(M)=F(T^{-1}(C)) \qquad (2)$$

$$C'=T(M')=T(F(M))=T(F(T^{-1}(C))) \qquad (3)$$

$$D'=Z(C', E) \qquad (4).$$

Equation (1) represents that the stereoscopic image of the standard garment C can be obtained by applying the projection function T to the image information of the standard figure Model M and by applying the projection function S to the image information of the standard figure model M and the patterns D. Equation (2) represents that the 3D image of the individual figure model M' can be obtained by applying the projection function F to the image information of the standard figure model M obtained by applying an inverse function $T^{-1}$ of the projection function T to the image information of the standard garment C. Equation (3) represents that the stereoscopic image of the special garment C' can be obtained by applying the projection function T to the image information of the individual figure model M'. Equation (4) represents that the 2D images of the patterns D' can be obtained by applying the projection function S to the image information of the special garment C' given by Equation (3), taking into account restricting conditions of the patterns (conditions including planarity, lateral symmetry, partial linearity, partial curving, matching during the sewing).

Referring back to FIG. 19, the block construction of the pattern preparing system 40 is described.

The pattern preparing system 40 shown in FIG. 19 is provided with a CPU 41, a main storage device 42, an input device 43, a display device 44, an external storage device 45 and a recording device 46.

The main storage device 42 includes a ROM 4201 for storing a processing program for a process of generating pattern images of the garment and initial data, and a RAM 4202 for temporarily storing a variety of data necessary to generate the pattern images in accordance with the processing program and data calculated by operations.

The input device 43 is comprised of a keyboard or mouse for inputting pieces of information necessary to generate the pattern images of the garment suited to the figure of the client (e.g., the figure information of the client used to generate the 3D image of the individual figure model M', the information on the patterns of the garment, the information on the material of the garment, and the information on the sewing of the garment) and a variety of commands.

The display device 44 is comprised of a CRT, liquid crystal display device, plasma display device or like electronic display device for making displays used to input a variety of pieces of information necessary to generate the pattern images of the garment (figure and garment information and commands in the Q&A dialogue form), and for displaying the image of the garment suited to the figure of the client based on those pieces of information and a plurality of pattern images which form this garment image.

The external storage device 45 is a device, in and from which a variety of pieces of information can be written and read. The device 45 is adapted to store a variety of pieces of information (the figure information of the client, the pattern information, the material information, the sewing information and like information as described above) inputted via the input device 43, image information on the generated individual figure model and special garment, and image information on a plurality of patterns for the special garment). In the external storage device 45 is prestored the 3D image data of the standard figure model M (see FIG. 20) in its upright position. The 3D image data of the standard figure model M is generated by using data obtained, for example, by actually measuring a person by a 3D surface shape measuring apparatus or the like. This 3D image data is stored in the external storage device 45 while being divided into a plurality of images of body parts such as hands, legs and a head.

The recording device 46 is comprised of a printer for printing the generated images of the individual figure model M', special garment C' and images of a plurality of patterns D' of the special garment C', etc.

The CPU 41 implements the pattern image generation processing for the garment in accordance with the processing program set in advance. The CPU 41 generates the stereoscopic image of the special garment C' suited to the figure of the client in the virtual space and the 2D images of a plurality of patterns D' of the special garment C.

The PCU 41 is internally provided with a standard garment image generator 4101 for generating the stereoscopic image of the standard garment C', a model image generator 4102 for generating the 3D image of the individual figure model M', a first projection function calculator 4103 for calculating the first projection function T, a second projection function calculator 4104 for calculating the second projection function F, a special garment image generator 4105 for generating the stereoscopic image of the special garment C', and a pattern generator 4106 for generating the images of a plurality of patterns D' of the special garment C' from the stereoscopic image of the special garment C'.

The standard garment image generator 4101 transfers the image data of the patterns D of the corresponding standard garment C (comprised of a plurality of parts) and the image data of the standard figure model M from the external storage device 45 to the RAM 4202 based on the shape of the garment (shape of the garment such as a dress or two-piece suit) inputted via the input device 43. Using the image data of the standard figure model M and the patterns D of the standard garment C, the stereoscopic image of the standard garment C is generated by the aforementioned method for generating the stereoscopic image of the garment (see FIG. 4). The stereoscopic image of the standard garment C is stored in the external storage device 45.

The model image generator 4102 transfers the image of the standard figure model M from the external storage device 45 to the RAM 4202 and generates the 3D image of the individual figure model M' by deforming the read image data in a specified manner based on the figure information of the client inputted via the input device 43. The 3D image of the individual figure model M' is also stored in the external storage device 45. Since the deformation of the standard figure model M into the individual figure model M' is performed substantially by the same method as the one described with reference to FIGS. 9 and 10, no description is given here.

Figure 23:
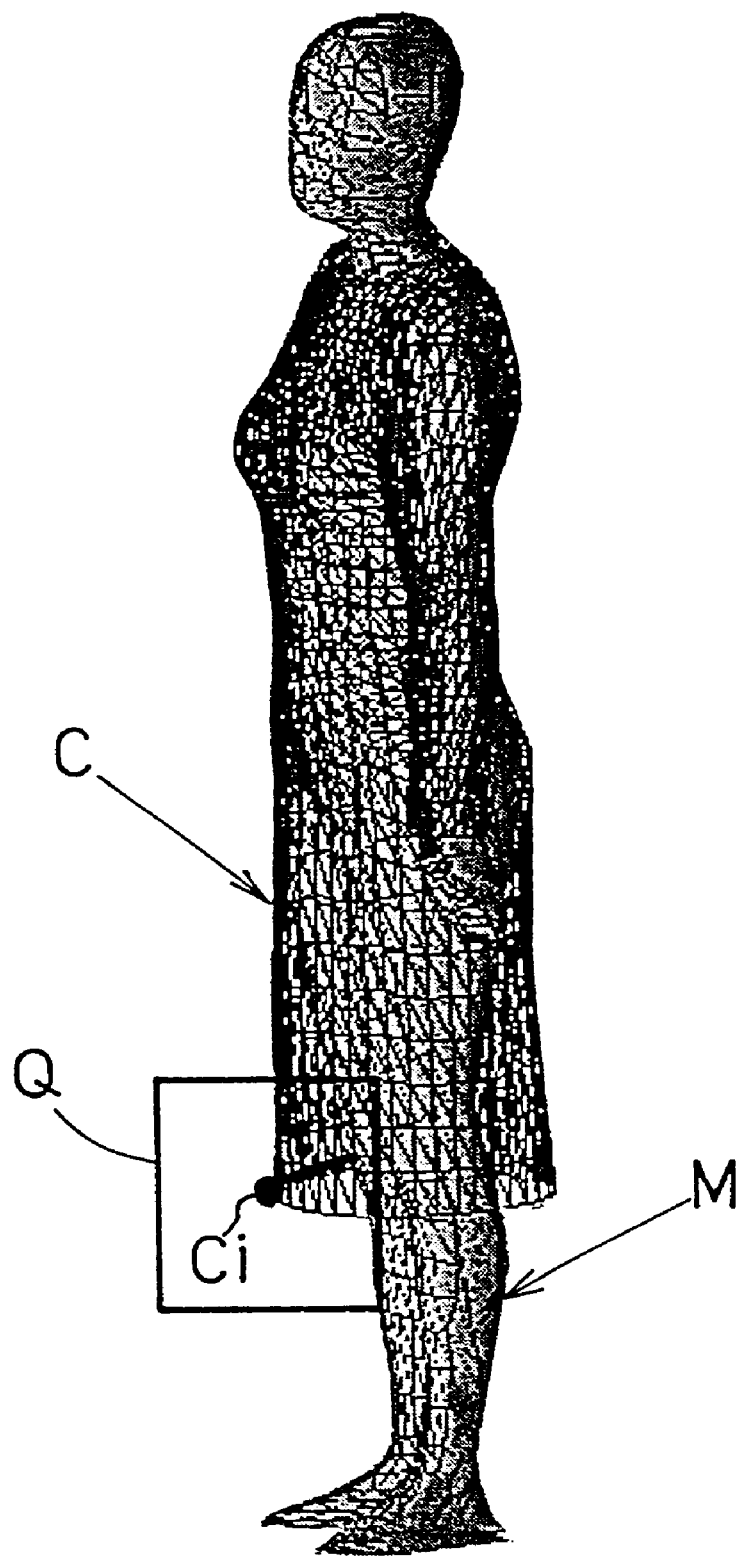
FIG. 23 is a diagram showing a method for calculating a first projection function T.

The first projection function calculator 4103 calculates the first projection function T using the image data of the standard garment C generated by the standard garment image generator 4101 and the image data of the standard figure model M. The 3D image of the standard figure model M is represented by a surface model formed by triangular patches as described above. The stereoscopic image of the standard garment C is divided by the regular lattices, in which rectangular frames are orderly arranged, as described above, and a plurality of lattice points are provided in the planes of the garment. The first projection function calculator 4103 calculates a lattice point $a_i$ ($i=1, 2, \ldots n$) of the standard figure model M closest to an arbitrary lattice point $c_i$ ($i=1, 2, \ldots n$) of the standard garment C and information on the positional relationship between the lattice points $c_i$ and $a_i$. The calculated lattice point $a_i$ corresponding to the lattice point $c_i$ has a normal vector in a direction opposite from a normal direction of the lattice point $c_i$. If no lattice point $a_i$ exists in the normal direction of the lattice point $c_i$, a small frame Q having a cubic shape is set around the lattice point $c_i$ as shown in FIG. 23. The lattice point $a_i$ of the standard figure model M having a normal vector in a direction opposite from the normal direction of the lattice point $c_i$ of the standard garment, which comes to be first included in the small frame during the enlargement of the small frame, becomes a lattice point corresponding to the lattice point $c_i$. Alternatively, distances between the lattice point $c_i$ and the lattice points of the standard figure model M may be calculated and a lattice point of the standard figure model M having a shortest distance from the lattice point $c_i$ may be assumed to be the lattice point $a_i$ corresponding to the lattice $c_i$.

The information on the positional relationship of the lattice points c1 and a1 is, for example, a pair of coordinates of the lattice points c1 and a1. The first projection function calculator 4103 calculates the lattice points ai (i=1, 2, ... n) of the standard figure model M corresponding to all lattice points ci (i=1, 2, ... n), and outputs the correspondence of the coordinates data in the form of a list. The information on the positional relationship between the lattice points ci and ai may be represented by vector distances therebetween. The first projection function T calculated by the first projection function calculator 4103 is stored in the external storage device 45.

Figure 24:
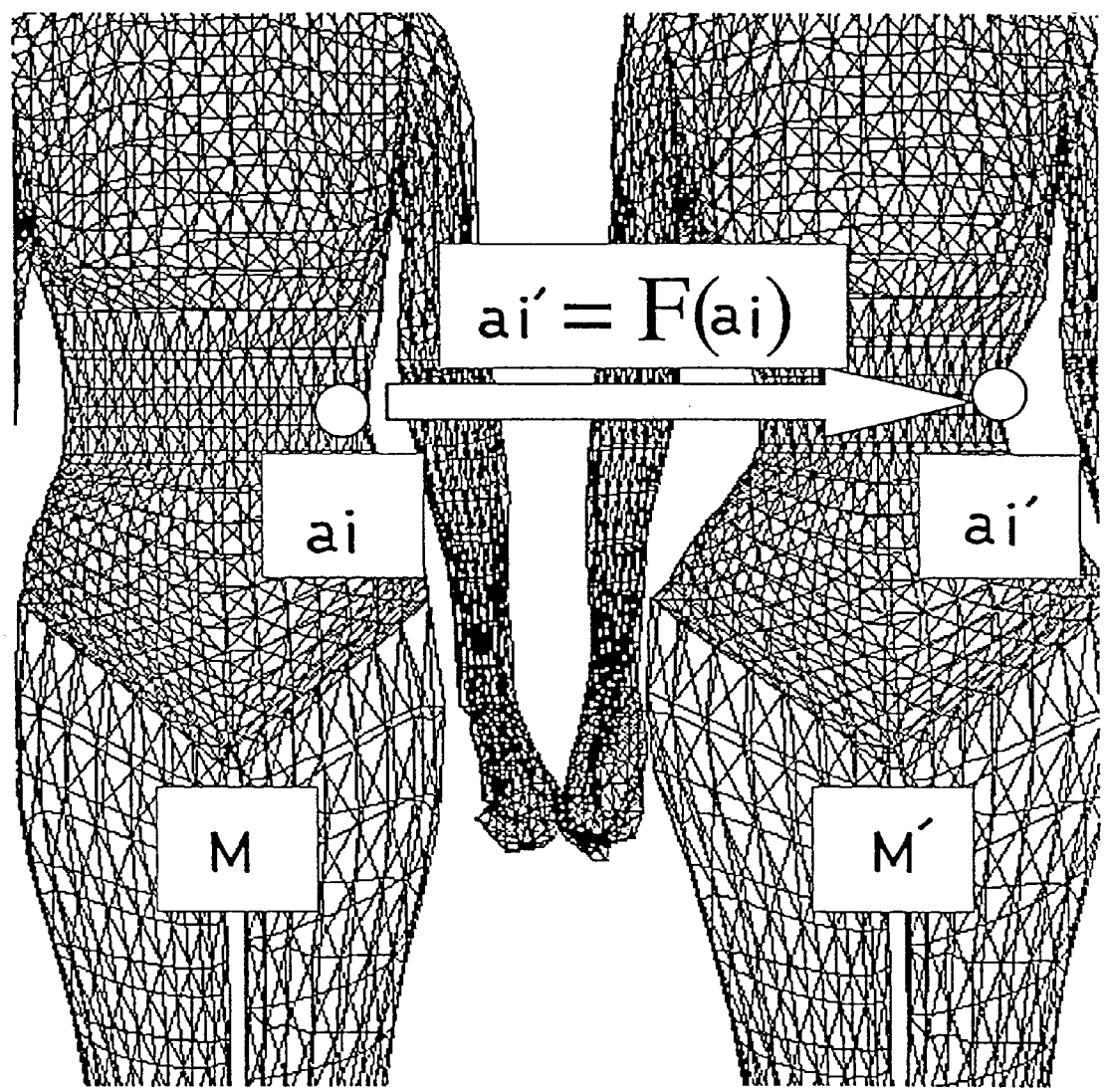
FIG. 24 is a diagram showing a method for calculating a projection function F for FIG. 2.

The second projection function calculator 4104 calculates the second projection function F using the image data of the standard figure model M and the image data of the of the individual figure model M' generated by the model image generator 4102. Since the 3D image of the individual figure model M' is obtained by deforming the 3D image of the standard figure model M based on the figure information of the client, the lattice points ai (i=1, 2, ... n) of a plurality of triangular patches forming the 3D image of the standard figure model M and their corresponding lattice points ai' of a plurality of triangular patches forming the 3D image of the individual figure model M' are known. Accordingly, the second projection function calculator 4104 calculates information on the positional relationship between the lattice points ai (i=1, 2, ... n) forming the 3D image of the standard figure model M and the corresponding lattice points ai' forming the 3D image of the individual figure model M' as the second projection function F as shown in FIG. 24. The information on the positional relationship of the lattice points ai and ai' is, for example, pairs of coordinates of the lattice points ai and ai'. The second projection function calculator 4104 outputs the correspondence of the coordinates data of the lattice points ai, ai' in the form of a list as the first projection function is outputted. The information on the positional relationship between the lattice points ai and ai' may be represented by vector distances therebetween. The second projection function F calculated by the second projection function calculator 4104 is stored in the external storage device 45.

The special garment image generator 4105 generates the stereoscopic image of the special garment C' by deforming the stereoscopic image using the first and second projection functions T, F. In other words, the special garment image generator 4105 applies the above calculation to the respective lattice points ci (i=1, 2, ... n) forming the stereoscopic image of the standard garment C to calculate lattice points ci' forming the stereoscopic image of the special garment C'. The image data of the special garment C' calculated by the special garment image generator 4105 is stored in the external storage device 45.

Figure 25:
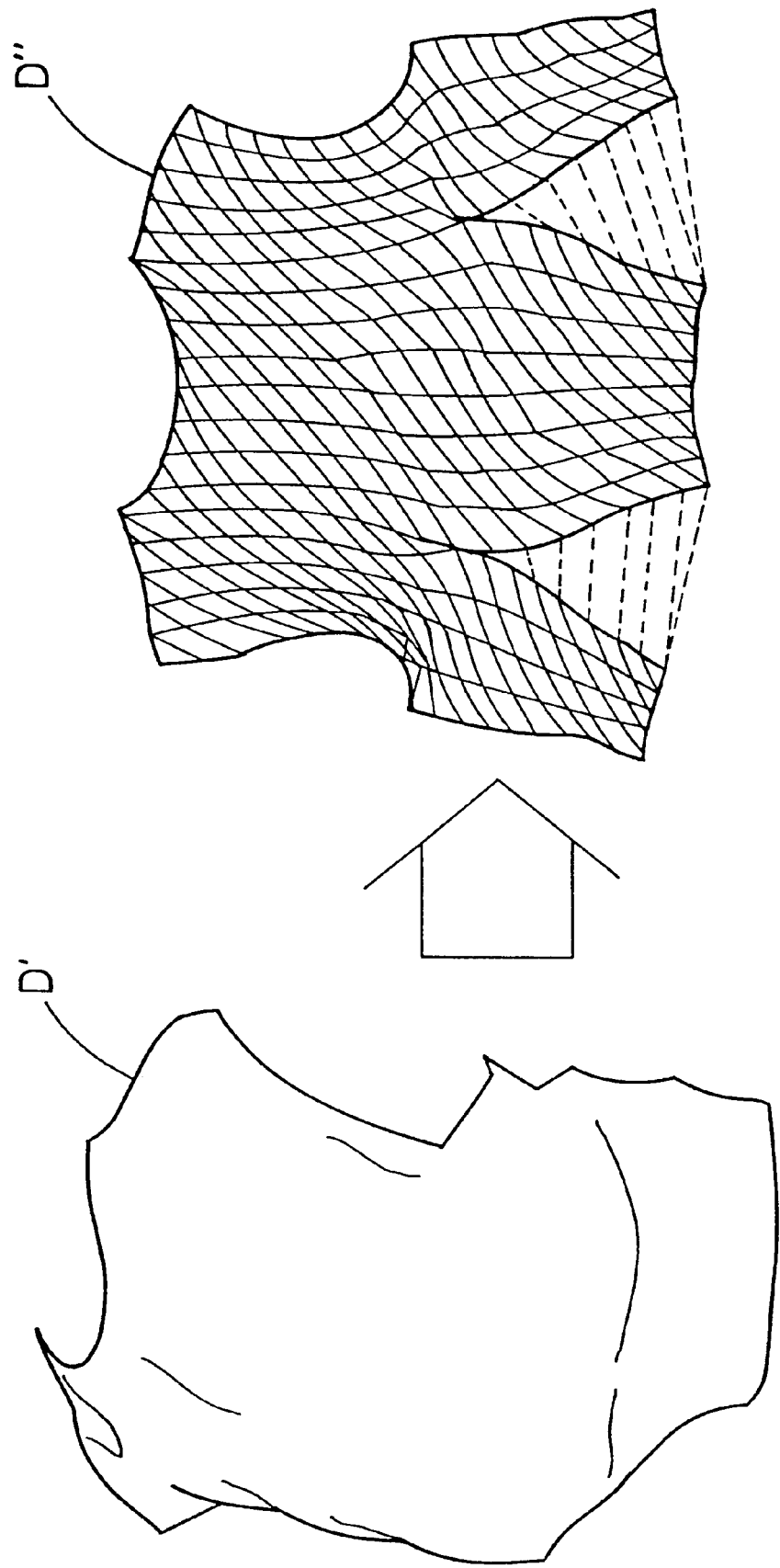
FIG. 25 is a diagram showing a pattern of a front part obtained by developing a stereoscopic image of the front part under a restricting condition of lateral symmetry.

The pattern generator 4106 divides the special garment C' (3D image) generated by the special garment image generator 4105 into a plurality of patterns D' (3D images), and generates planar patterns D" by developing parts of the respective three-dimensional patterns D' into two-dimensional shapes. At this time, for the pattern required to be laterally symmetrical such as the one for the front part of the garment, an average planar shape laterally symmetrical with respect to a reference line is determined, and the patterns D' are developed based on this planar shape. FIG. 25 shows the development of the three-dimensional pattern for the front part into a two-dimensional pattern D" while maintaining distances (lengths) between the respective lattice points ci under the restricting condition of lateral symmetry.

Figure 26:
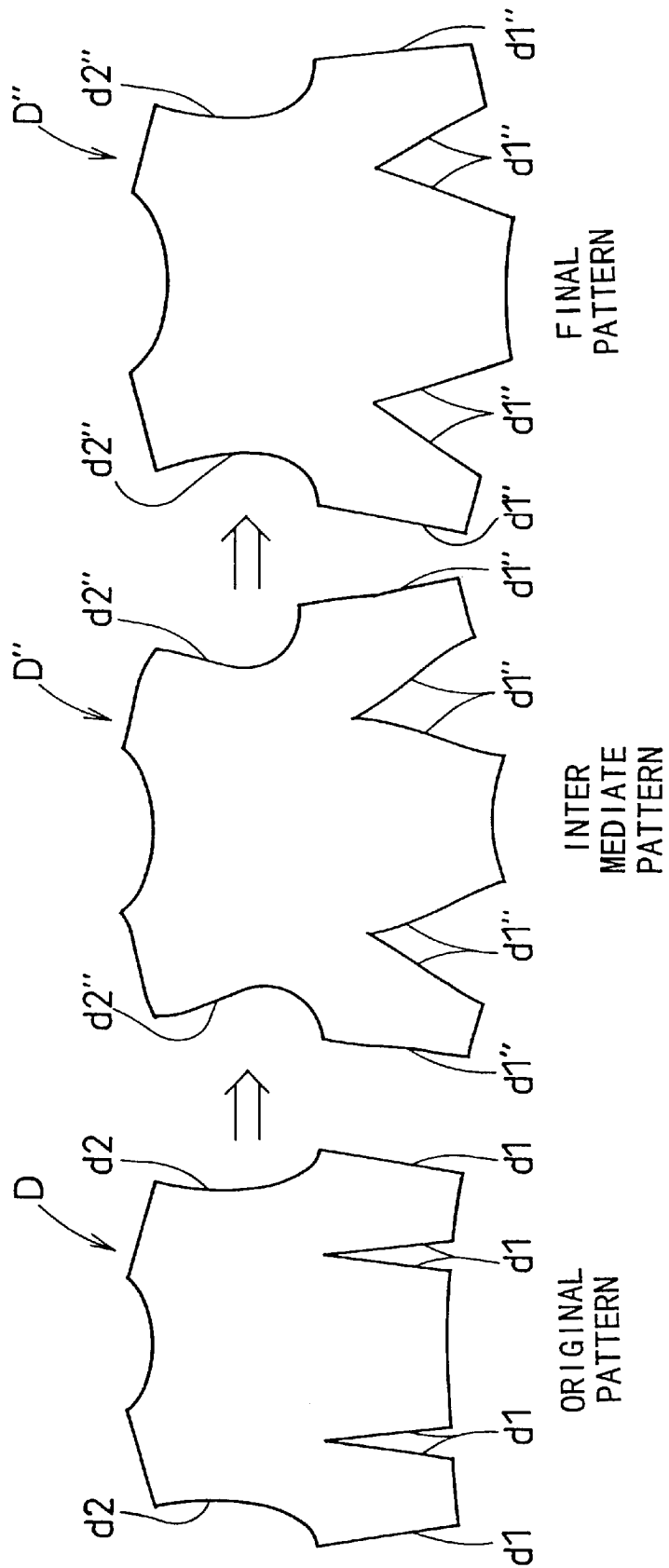
FIG. 26 is a diagram showing a pattern finally obtained by correcting the pattern of the front part under the restricting conditions of partial linearity and partial curving.

Further, as shown in FIG. 26, the final pattern D" is determined by correcting the intermediate pattern D" such that a portion d1" corresponding to a portion d1, which was linear in the original pattern D, turns to be linear and a portion d2" corresponding to a portion d2, which was curved in the original pattern D, turns to be curved.

Figure 27:
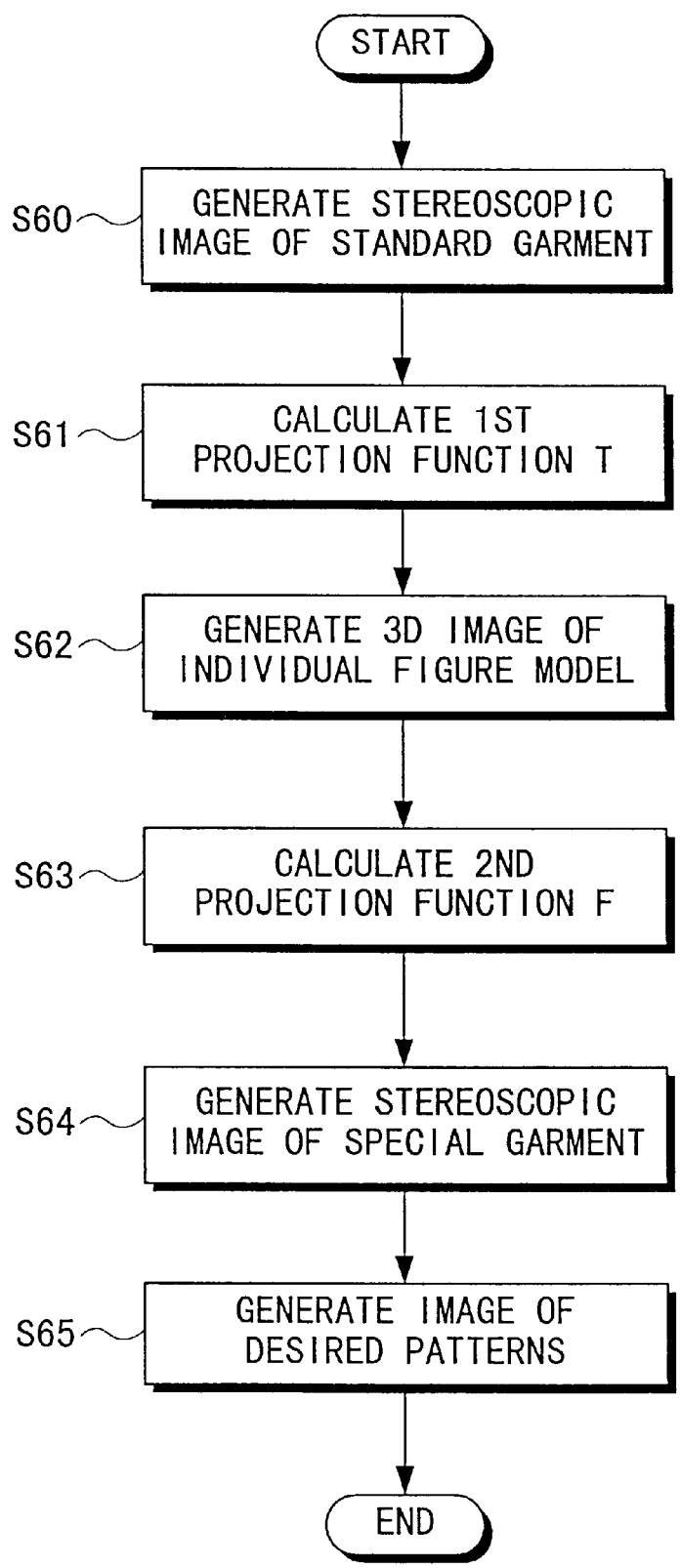
FIG. 27 is a flowchart showing a procedure of preparing patterns in the pattern preparing system of the stand-alone type.

Next, a pattern preparing procedure of the pattern preparing system 40 is described in accordance with a flowchart of FIG. 27.

First, a plurality of patterns D for the standard garment C are deformed in a specific manner based on the material property of the garment by being pressed against the standard figure model M in the virtual space, and sewn based on the sewing conditions of the garment to generate the stereoscopic image of the standard garment C put on the standard figure model M (Step S60). Subsequently, the lattice points ai forming the standard figure model M corresponding to the respective lattice points ci forming the standard garment C are calculated, and the positional relationship of the lattice points ci, ai is calculated as the first projection function T (Step S61). Then, the 3D image of the individual figure model M' is generated by deforming the 3D image of the standard figure model M based on the figure information of the client inputted via the input device 43 (Step S62). The information on the positional relationship between the respective lattice points ai' forming the 3D image of the individual figure model M' and the corresponding lattice points ai forming the 3D image of the standard figure model M is calculated as the second projection function F (Step S63).

Subsequently, the stereoscopic image of the special garment C' put on the individual figure model M' is generated by displacing the respective lattice points ci' forming the stereoscopic image of the standard garment C in accordance with the first and second projection functions T, F (Step S64). Then, the stereoscopic image of the special garment C' is split into 3D images of a plurality of patterns D' for the special garment C', and these 3D images of the patterns D' are developed into 2D images under the restricting conditions including the symmetry, partial linearity and partial curving of the patterns to generate images of desired patterns D" (Step S65).

Figure 28:
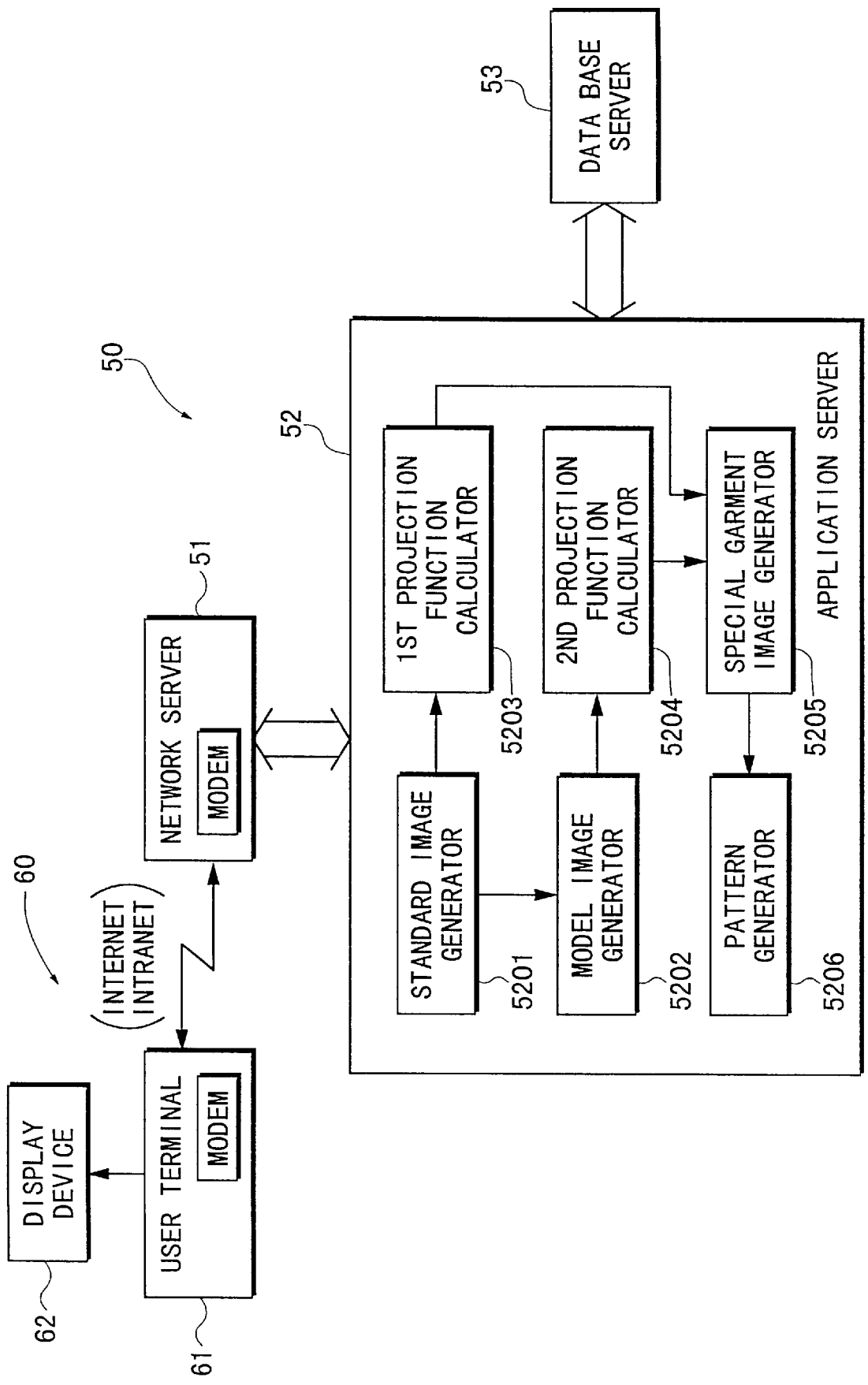
FIG. 28 is a block diagram of one embodiment of a pattern preparing system of the network type.

FIG. 28 is a block construction diagram of one embodiment of a pattern preparing system using a computer network.

The pattern preparing system shown in FIG. 28 is so constructed as to enable a bilateral communication between a server 50 and a client unit 60 via a network such as Internet or Intranet.

In this embodiment, the server 50 is provided with a network server 51, an application server 52 and a database server 53. The network server 51 controls the bilateral communication with the client unit 60, and the database server 53 stores the 3D image data of the standard figure models M and the image data of the patterns for the standard garment C. The application server 52 includes a standard image generator 5201, a model image generator 5202, a first projection function calculator 5203, a second projection function calculator 5203, a special garment image generator 5205 and a pattern generator 5206 corresponding to the aforementioned generators and calculators 4101 to 4106. The application server 52 transmits the information on the basic screen to the client unit 60 via the network server 51 in response to an access from the client unit 60, receives a variety of pieces of information transmitted from the client unit 60 in accordance with the basic screen, and generates a stereoscopic image of a garment demanded by the client unit 60 and 2D images of a plurality of patterns for this garment based on the received information and a variety of pieces of information read from the database server 53.

The basic screen is used to select and input pieces of information on a garment (e.g., information on the figure of the client, material, color, pattern and kind (dress, two-piece suit, etc.) of the garment) which are necessary when the client orders a special garment suited to his/her figure, and is substantially the same as the basic screen 15 shown in FIG. 7. The client can input the information on the garment by selectively clicking input items displayed in the basic screen using an unillustrated mouse. The information on the figure of the client is directly and numerically inputted using an unillustrated keyboard.

The client unit 60 is provided with a user terminal 61 connected with the network and a display device 62 electrically connected with the user terminal 61. When the client accesses the server 50 via the network by using the user terminal 61, the information on the basic screen is transmitted from the server 50 and the basic screen is displayed in the display device 62. Accordingly, the client can receive a pattern preparation service by selectively inputting necessary information using the keyboard, mouse and/or the like in accordance with the basic screen.

Figure 29:
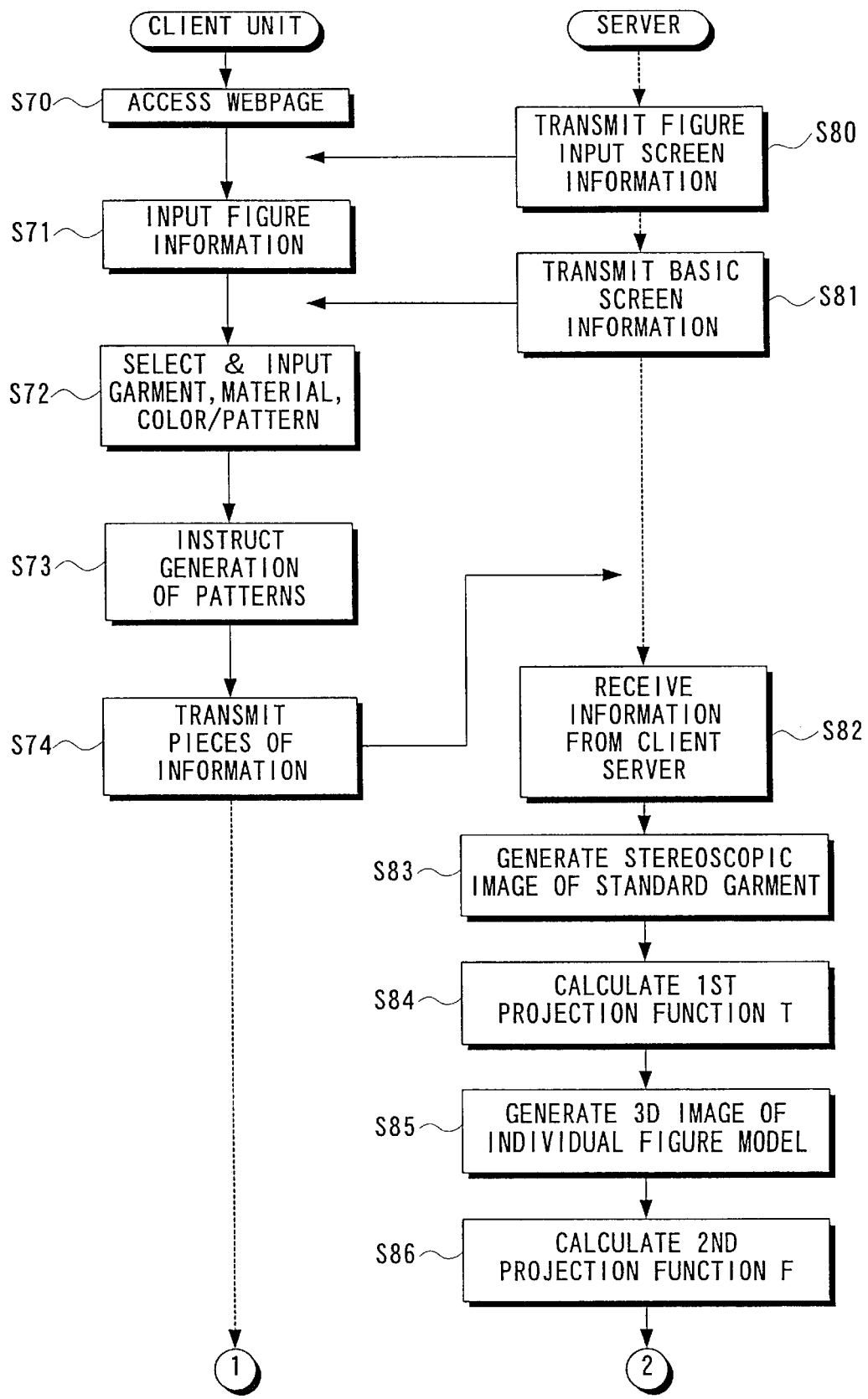
FIGS. 29 and 30 are a flowchart showing a procedure of preparing patterns in the pattern preparing system of the network type.
Figure 30:
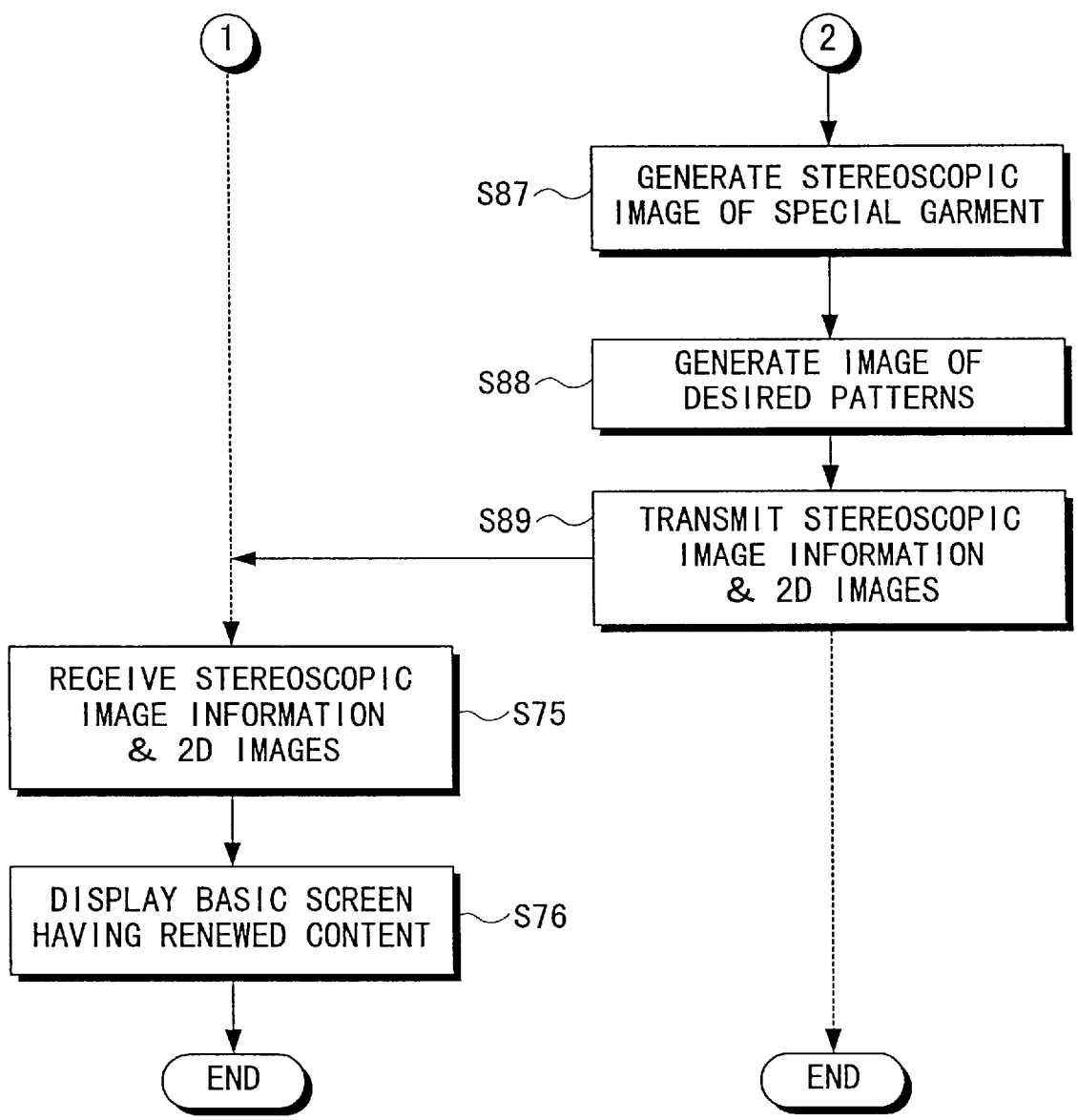

Next, a pattern preparation procedure of the pattern preparing system shown in FIG. 28 is described in accordance with a flowchart of FIGS. 29 and 30.

First, when an operator accesses the web page of the server 50 by operating the input device of the client unit 60 such as a keyboard, the server 50 in turn transmits information on a screen used to input the information on the figure of the client (figure input screen) to the client unit 60 (Steps S70, S80).

In the client unit 60, the figure input screen is displayed in the display device 62 based on the information thereon, and the operator inputs the figure information of the client by means of a keyboard, mouse and the like in accordance with the display contents (Step S71). The inputted figure information of the client is transmitted to the server 50 via the network and temporarily stored in a RAM (not shown) of the application server 52, and the information on the basic screen is transmitted from the server 50 to the client unit 60 (Step S81).

Subsequently, in the client unit 60, the basic screen is displayed in the display device 62 based on the information thereon. When the operator selectively inputs the pieces of information on the shape, material, color, pattern and the like of the desired garment in accordance with the basic screen and instructs the generation of patterns for this garment (Steps S72, S73), a variety of pieces of information including the information on the garment and the command to generate the patterns are transmitted to the server 50 (Step S74).

On the other hand, the server 50 receives a variety of pieces of information transmitted from the client unit 60, and performs operations of Steps S83 to S88 corresponding to Steps S60 to S65 described with reference to the flowchart of FIG. 27 to generate the stereoscopic image of the special garment C' suited to the figure of the client and 2D images of patterns D" for the special garment C'. The information on the stereoscopic image of the special garment C' and the 2D images of the patterns D" is transmitted to the client unit 60 via the network (Step S89). In the client unit 60, upon the receipt of the information on the stereoscopic image of the special garment C' and the 2D images of the patterns D" (Step S75), these images are renewably displayed in the display device 62 (Step S76).

Therefore, the operator can confirm the stereoscopic shape of the garment selected by him/her and suited to his/her own figure and easily obtain the patterns of this garment. If a desired shape of the garment cannot be obtained, a garment having a desired shape and patterns therefor can easily be obtained by correcting the figure information of the operator and instructing the preparation of the patterns again.

Although the individual figure model M' is obtained by deforming the standard figure model M based on the figure information of the client in this embodiment, the 3D image of the individual figure model M' may be directly generated based on an actual measurement data of the client obtained by a 3D surface shape measuring apparatus. Alternatively, not only the 3D image of the standard figure model M, but also 3D images of a plurality of figure models similar to the standard figure model M may be prepared in advance, and the individual figure model M' may be determined by selecting a most similar figure model based on the figure information of the client.

As described above, in the virtual space of the computer graphics, the standard garment C corresponding to the standard figure model M is generated; the individual figure model M' matching the figure of the client is generated; the special garment C' corresponding to the individual figure model M' is generated by reflecting the displacement characteristics of the individual figure model M' in relation to the standard figure model M on the standard garment C; and the patterns D' are generated from the special garment C'. Accordingly, the patterns for the garment suited to the figure of the client can readily and easily prepared.

Thus, for example in the apparel industry, patterns of garments suited to clients particularly targeted by the respective companies can be quickly and easily prepared. Further, in the case of a garment made to order as well, the stereoscopic image of a garment suited to the figure of a client and patterns for this garment can be obtained when the client's measurements are taken, which contributes to the quick and low-cost production of the garment. Furthermore, by registering the individual figure models M' corresponding to the figures of clients, an order of garments having different shapes or the same shape can be quickly responded.

Next, a fourth exemplary application is described. The fourth exemplary application is designed to realistically represent changes in the state of a garment in 3D animation images of a person, animal or like moving body wearing the garment.

In animation images which have been conventionally manually produced, a garment put on a person or the like are drawn together with the body of this person (i.e., integrally with the person), and little consideration is given on the reality of the movement of the garment according to the movement of the person or the like. Accordingly, in conventional animated images, the garments themselves look flat without having a cubic effect. It is quite difficult to realistically represent drapes, wrinkles and the like of the garment even if the images are animated.

On the other hand, in recent years, animation images generated by the computer graphics are frequently used in the animation industry, movie industry, advertisement industry and other industries, and creative images having high reality are available on the market. However, even in the animation images generated by the computer graphics, it is not easy to realistically represent the movement of a garment put on a person or the like according to the movement of the person. An attempt is being made to present the cubic effect of the garment by modeling the garment having, for example, draping ability and wrinkles, but animation images realistically representing the movement of the garment are not yet obtained. In other words, the existing technique for generating animation images by the computer graphics is merely to represent drapes and wrinkles of the garment in its stationary state, but the drapes and wrinkles do not change even if the external configuration of the garment is deformed as the person or the like moves. Therefore, even if such a technique is applied to the animations image of the garment, the obtained animation image lacks reality.

It cannot be said that the conventional technique for generating animation images cannot be used at all in generating highly realistic animation images of garments. However, the conventional methods require skilled technicians to work over several months to generate scenes for several seconds. This is an essential problem in terms of costs and technical skills and, therefore, it is impractical to adopt the conventional technique.

The fourth exemplary application concerns a system for generating CG animation images which can realistically represent changes of the state of a garment such as drapes, wrinkles and shape according to the movement of a character such as a person, and is an effective means for solving the above problems.

Figure 31:
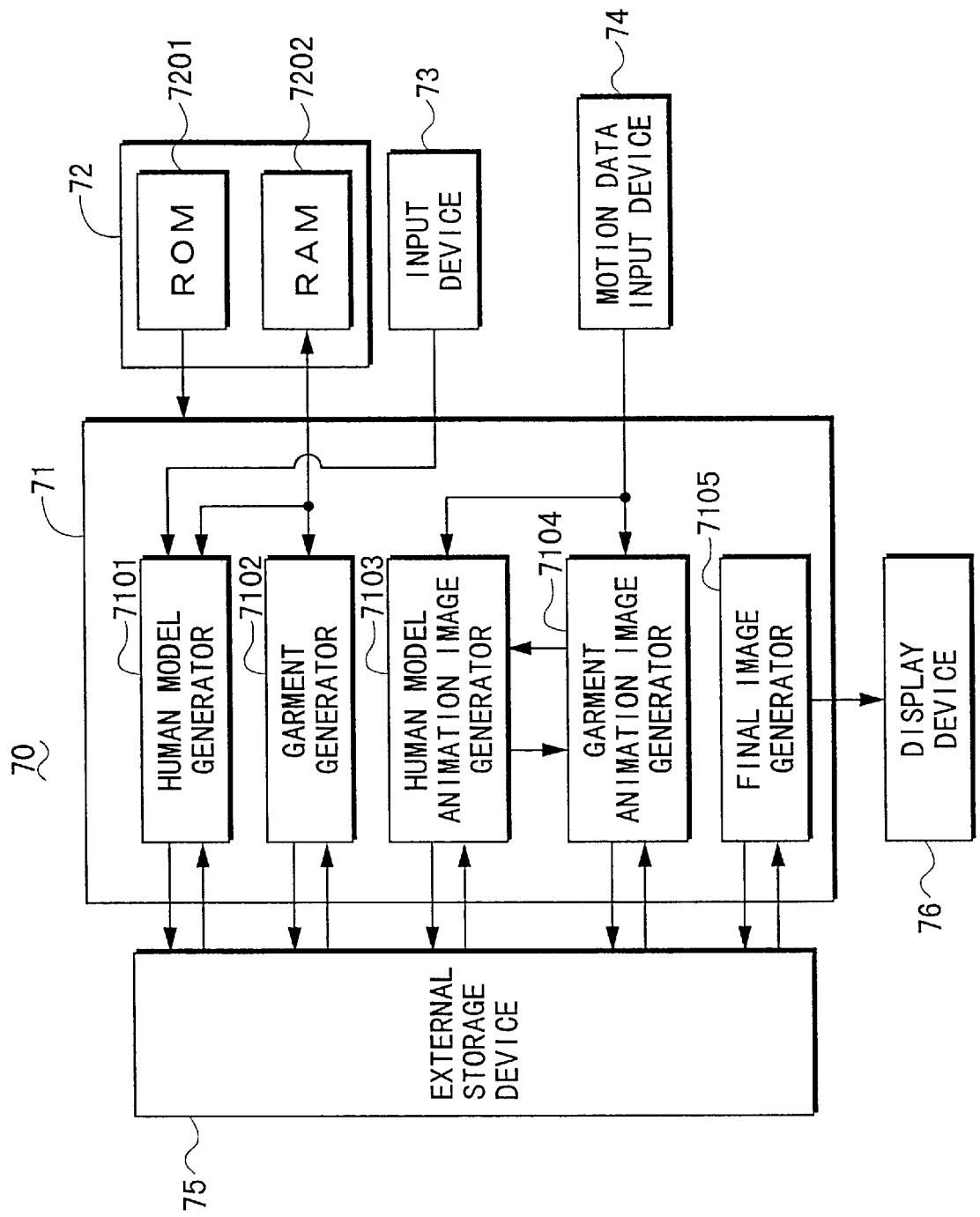
FIG. 31 is a block diagram of one embodiment of a system for generating animation images of a garment.

FIG. 31 is a block construction diagram of one embodiment of the CG animation image generating system.

A CG animation image generating system 70 shown in FIG. 31 generates 3D animation images in which a garment naturally changes its state according to the movement of a character such as a person. It should be noted that the 3D animation images here refer to images in the respective frames obtained by photographing a 3D model in motion along time axis at suitable angles and under suitable lighting. In this 3D animation image, if the 3D model is assumed to be modeling a person, the movements of this person can be stereoscopically viewed from a variety of angles.

As an application of such 3D animation images, it can be considered to monitor, e.g., movement characteristics of a garment (natural movements of a garment resulting from the movement of a person wearing this garment) and display a simulated fashion show of new garments, for example, in the apparel industry which designs garment. The applications are not limited to the apparel industry. There are various applications in the textile industry, which designs textiles, and the texture industry. In the mail-order selling of department stores and boutiques, 3D animation images of garments can be used for catalogues. Further, it can also be applied to the technique for generating 3D animation images by the computer graphics in the animation industry and TV game industry.

As described above, this CG animation image generating system 70 is applicable in various fields. Description below is, for the sake of convenience, given on a monitor image displaying the movement characteristics of the garment (i.e., 3D animation images representing the movements of the garment when a person (human model) wearing the garment makes a specific movement).

The CG animation image generating system 70 shown in FIG. 31 is provided with a CPU 71, a main storage 72, an input device 73, a motion data input device 74, an external storage device 75 and a display device 76.

The main storage device 72 includes a ROM 7201 for storing a processing program for a garment animation image process and initial data and a RAM 7202 for temporarily storing various data necessary to generate animation images in accordance with the above processing program and data calculated.

The input device 73 is comprised of a keyboard and/or mouse for inputting pieces of information necessary to generate 3D animation images of a garment (e.g., information on the figure of a human model (3D image) on which the garment (3D image) is to be put, information on patterns for the garment, information on the material of the garment, and information on the sewing of the garment) and various commands.

The motion data input device 74 is operated to input data necessary to give a specific motion to the human model on which the garment is to be put. For example, a motion capture system can be used as the motion data input device 74. Alternatively, an actual person or the like in motion may be photographed by a video camera, and a motion data extracted from the photographed image may be inputted.

Figure 33A:
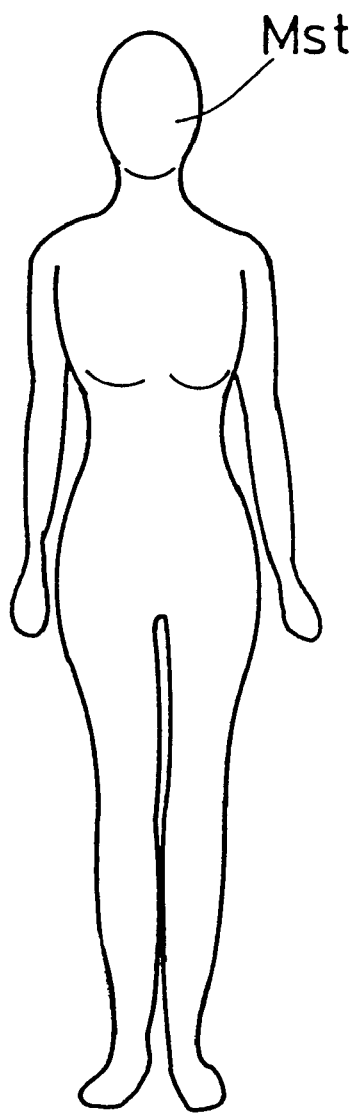
FIGS. 33A and 33B are diagrams showing a method for generating a stereoscopic image of a garment.

Various pieces of information can be written in and read from the external storage device 75. This storage device 75 stores various pieces of information (aforementioned motion data, figure information of the human model, pattern information, material information, sewing information of the garment) inputted via the input device 73 and the motion data input device 74, and generated 3D animation images of the human model and garment. In the storage device 75 is prestored a 3D image of a standard figure model (see FIG. 33A) in its upright state. The 3D image data of this standard figure model is the same as the 3D image data of the standard figure model M stored in the external storage device 45 of the third application.

The display device 76 is comprised of a CRT, liquid crystal display device, plasma display panel or like electronic display device for making displays used to input various pieces of information (figure information, information on the garment, and other commands in Q&A dialogue form) necessary to generate the 3D animation images of the garment and displaying the 3D animation images of the garment generated based on the inputted information.

The CPU 71 generates the 3D image of the human model as a character based on the preset 3D image data of the standard figure model stored in the external storage device 75 and the figure information (size information including height, shoulder width, chest size) inputted via the input device 73, and further generates 3D animation images in which the human model moves in a specific manner (hereinafter, "human animation images") based on the 3D image of the human model and the motion data inputted via the motion data input device 74.

Since the 3D image of the standard figure model is in its upright state, the human model generated by deforming the standard figure model is also in its upright state. The image of the human model in its upright state serves as an image (initial image) at the start of the motion of the human animation image. The image of the desired human model is generated by deforming the image of the standard figure model in order to enhance the degree of freedom in the shape of the garment, thereby enabling the monitoring of the motion characteristics of various kinds of garments.

The CPU 71 generates a stereoscopic image of the garment to be put on the human model at the start of the motion (initial image) and 3D animation images representing a movement (shape change) of the garment according to the movement of the human model (hereinafter, "garment animation image"), and further generates 3D animation images representing the movement characteristics of the garment by combining the garment animation image and the human animation image.

The CPU 71 is internally provided with a human model generator 7101 for generating the 3D image of the human model, a garment generator 7102 for generating the stereoscopic image of the garment to be put on the human model, a human model animation image generator 7103 for generating the human animation images, a garment animation image generator 7104 for generating the garment animation images, and a final animation image generator for generating 3D animation images to be displayed in the display device 76 (hereinafter, "final animation image") by combining the human animation images and the garment animation images.

The human model image generator 7101 transfers the 3D image of the standard figure model from the external storage device 75 to the RAM 7202, and applies a specified deformation processing to this 3D image based on the figure information inputted via the input device 73 to generate the 3D image of the human model. The 3D image of this human model is stored in the external storage device 75.

Since the deformation processing applied to the standard figure model during the generation processing of the 3D image of the human model is substantially the same as the method described with reference to FIGS. 9 and 10, no description is given here.

The garment image generator 7102 transfers the image data of the patterns (comprised of a plurality of parts) for the corresponding garment and the 3D image data of the human model from the external storage device 75 to the RAM 7202 based on the kind of the garment (kind of the shape of the garment such as a dress or a two-piece suit) inputted via the input device 73. The generator 7102 then generates the stereoscopic image of the garment according to the aforementioned method for generating the stereoscopic image of the garment (see the description given with reference to FIG. 4) using the image data of the human model and the patterns for the garment. The stereoscopic image of the garment is also stored in the external storage device 75.

Figure 32:
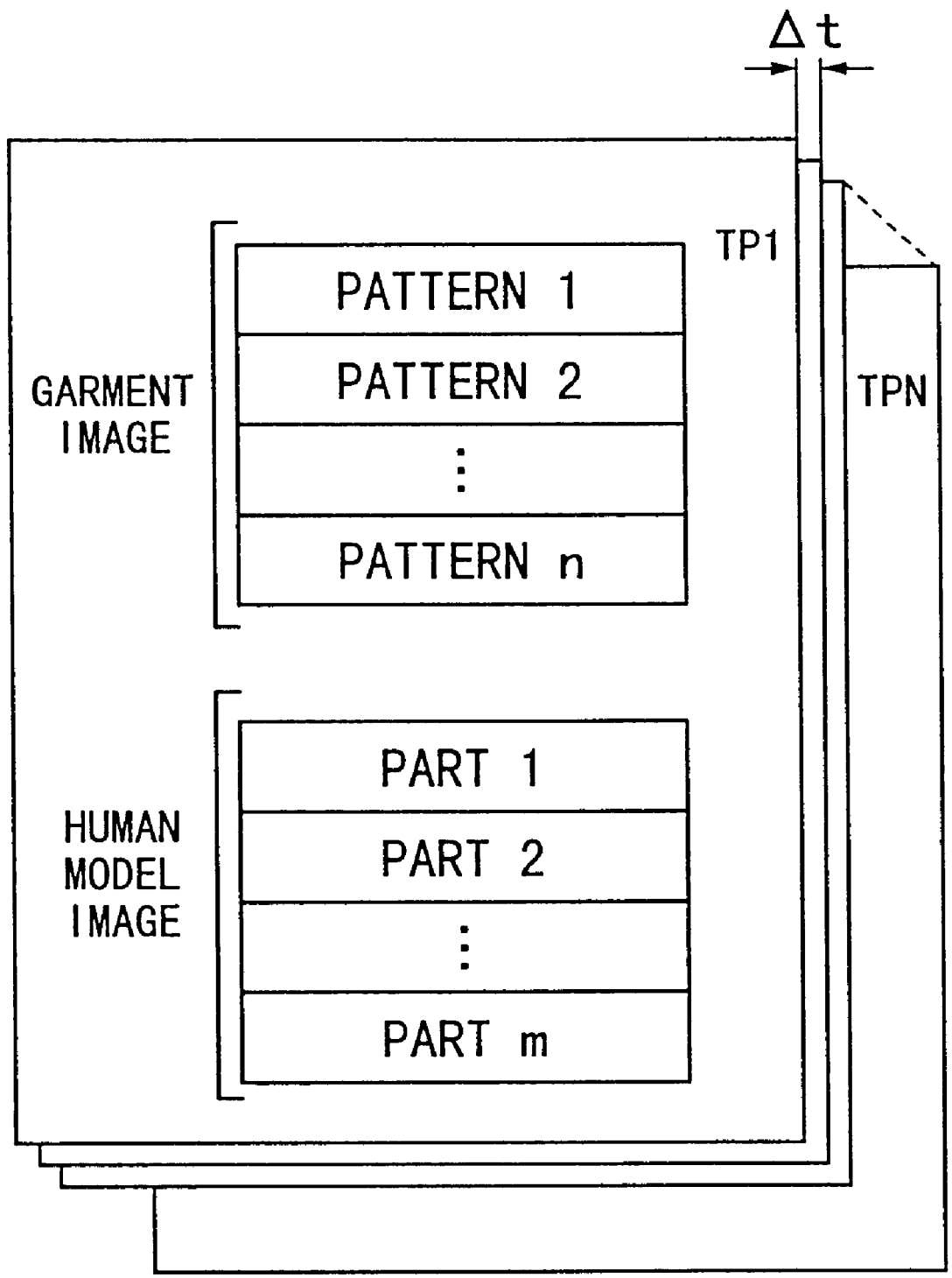
FIG. 32 is a diagram showing the data configuration of human models and animation images of the garment.

The human model animation image generator 7103 transfers the 3D image of the human model from the external storage device 75 to the RAM 7202, generates human animation images of, e.g., 125 frames/sec. by rotating or moving this 3D image based on the motion data inputted via the motion data input device 74 and stores the generated images in the external storage device 75. Since the 3D image of the human model is divided into a plurality of parts, the respective parts are connected by the tree structure. By adjusting the rotation and/or movement amounts of lower parts according to the rotation and/or movement amounts of upper parts, frame images (3D image) in each time phase are generated for the respective parts of the human model as shown in FIG. 32, and these frame images are stored in the external storage device 75.

Figure 33B:
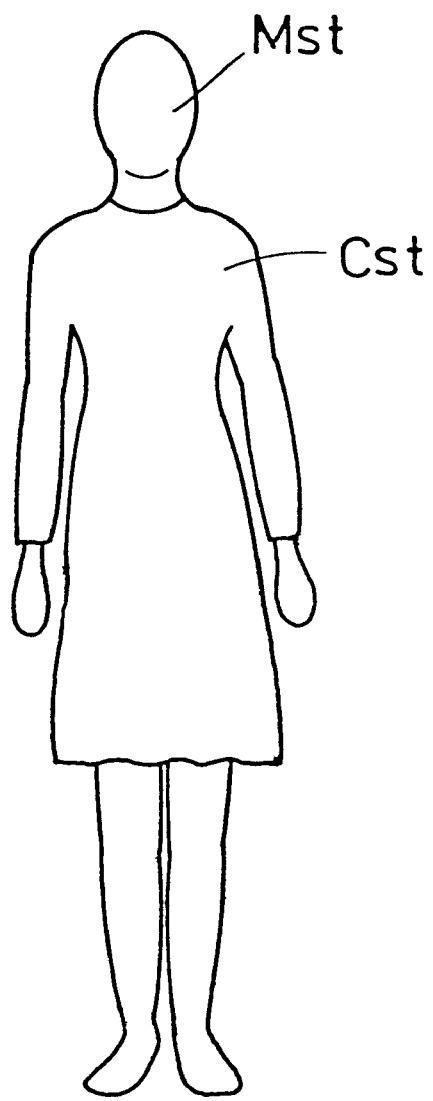

The garment animation image generator 7104 reads the 3D images of the human model and the garment from the external storage device 75, and generates the garment animation images by putting a garment Cst on a human model Mst as shown in FIG. 33B and simulating a deformation in the garment Cst caused by the collision of the garment Cst and the human model Mst when the human model Mst is moved in a specific manner in the state of FIG. 33B.

The 3D image of the garment Cst is put on the 3D image of the human model Mst in the following procedure. Normal lines of the surface of the human model Mst and those of the surface of the garment Cst are compared. Only in the case that the directions of the two corresponding normal lines agree, a specified collision processing or semi-passing collision processing is performed. Further, the deformation processing of the garment Cst caused by the collision with the human model Mst is performed by substantially the same calculation as the aforementioned collision calculation of the human model and the patterns. Thus, no further description is given here.

The final image generator 7105 generates final images in which the human model wearing the garment moves in a specific manner by combining the human animation images generated by the human model animation image generator 7103 and the garment animation images generated by the garment animation image generator 7104 in the respective time phases.

Figure 34:
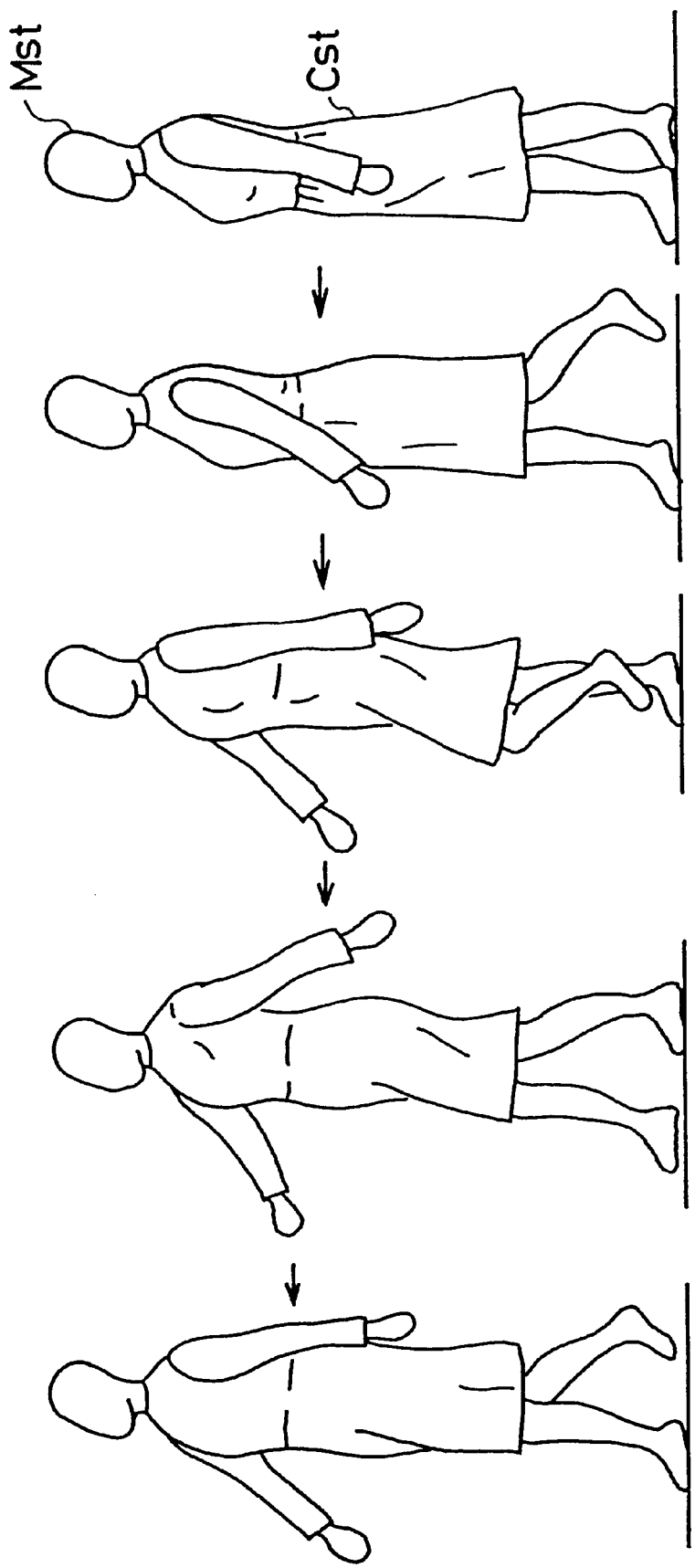
FIG. 34 is a diagram showing exemplary 3D animation images showing a walking state of a human model wearing a dress.

The final images are outputted to the display device 76, and 3D animation images, for example, as shown in FIG. 34 are displayed. FIG. 34 shows animation images in which the human model Mst wearing a dress or garment Cst is walking. The final image generator 7105 generates the 3D images of the human model Mst wearing the garment Cst by combining the 3D images of the human model Mst and the stereoscopic images (3D images) of the garment Cst frame by frame, for example, by the Z buffer method, and successively outputs the image data to the display device 76.

Next, a final image generation procedure of the CG animation image generating system 70 are described with reference to a flowchart of FIG. 35. In the flowchart of FIG. 35, the generation of the 3D image of the human model and the input of the motion data are already finished, and only the generation of the 3D animation images of the human model and the garment is described.

In the process for the generation of the 3D animation images of the human model and the garment, after the initialization (Step S90), a count value n of a frame number counter is set at "1" (Step S91), and a normal line calculation is performed (Step S92). In this normal line calculation, normal vectors of the respective triangular patches of the human model Mst and those in the respective particles of the garment Cst are calculated. Subsequently, after an external force is calculated (Step S93), the motion of the human model Mst is calculation (Step S94).

The motion calculation of the human model Mst is to calculate an change image when the human model Mst moves by one frame from its initial state (upright state). For example, in the animation images of FIG. 34, if the human model Mst is caused to walk for T seconds, an change image of the human model Mst after $\Delta t$ (=T/N) from the upright state (right end state of FIG. 34) is calculated, assuming that N denotes a total frame number of the animation images. In other words, assuming that 1, 2, . . . N denote successive frame numbers of the images changed from the upright state, an change image of the human model Mst of frame number 1 is calculated. In this case, the change image is calculated for the respective parts, i.e., hands, legs, trunk, etc. of the human model Mst.

Subsequently, the collision of the human model Mst and the garment Cst caused by the movement of the human model Mst in the aforementioned geometric modeling is calculated (Step S95). The change image (3D image) of the garment Cst of frame number 1 is calculated based on this calculation result (Step S96). Since the garment Cst is comprised of the 3D images of a plurality of patterns, the change image of the garment Cst is calculated as change images of a plurality of patterns.

For the 3D image of the garment Cst of frame number 1, the collision of the human model Mst and the garment Cst in the aforementioned physically based modeling is calculated to thereby calculate a 3D image in which the state of the garment Cst changes more realistically (Step S97). The data of the 3D image of the human model Mst and garment Cst of frame number 1 is stored in a memory area (see FIG. 32) corresponding to time phase 2 in the external storage device 75 (Step S98).

Subsequently, after the count value n is incremented by 1 (Step S99), it is discriminated whether the count value n exceeds the total frame number N (Step S100). If n≦N (NO in Step S100), this routine returns to Step S92 to generate the 3D image of the human model Mst and garment Cst of the next frame number. Since n=2 this time, this routine returns to Step S92 to generate the 3D image of the human model Mst and garment Cst of frame number 2 in the aforementioned procedure. Hereafter, when the 3D images of the human model Mst and the garment Cst are generated for the total number N of frames by repeating the same procedure (loop of Steps S92 to S100), the final image generating processing is completed.

Although the calculations for the final images are performed by the single CPU 71 in the foregoing embodiment, it may be performed by parallel processing by a plurality of processing units in order to increase the processing speed. For example, in the flowchart of FIG. 35, Step S92 (normal line calculation), Step 93 (external force calculation), Step S95 (geometric collision calculation) to S97 (Physical collision calculation) can be simultaneously performed in a parallel manner. In the case of 4 processing circuits (CPUs), the processing speed can be increased by 2.5 times. In the case of parallel processing, the respective operations in Steps S90, S95 and S97 need to be synchronized so that the operations by the respective processing circuits are simultaneously completed.

Although the generation of the monitor images having the movement characteristics of the garment is described in the foregoing embodiment, the CG animation image generating method according to the invention can be applied to the generation of animation images for an arbitrary character image. In other words, 3D animation images of a garment having high reality can be generated by generating 3D animation images by causing an arbitrary 3D character to move in a specific manner based on a motion data obtained by the motion capture system or the like, putting 3D images (stereoscopic image) of an arbitrary garment on the character images, and calculating the collision between the character and the garment according to the movement of the character.

Further, although the case where the garment moves according to the movement of the human is described in the foregoing embodiment, the CG animation image generating method according to the invention can be applied to animation images in which a garment is put on an arbitrary object other than a human. This method is applicable not only to the generation of images of a garment for covering a person or the like, but also to the generation of images of a scarf, mantle or like loose outer garment which a person wears around.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A garment stereoscopic image generating method for generating a 3D image representing a stereoscopic shape of a garment when the garment is put on an object, comprising:
   (a) a first step of generating a 3D image of an object model corresponding to the object;
   (b) a second step of generating images of patterns for the garment;
   (c) a third step of inputting information on the garment; and
   (d) a fourth step of arranging the images of the respective patterns of the garment in corresponding portions of the 3D image of the object model, three-dimensionally deforming the images of the respective patterns by calculating collisional deformations when the respective patterns are pressed against the corresponding portions based on the information on the garment, and generating a stereoscopic image of the garment by connecting the deformed 3D images of the respective patterns based on the information on the garment.

2. A garment stereoscopic image generating method according to claim 1, wherein the information on the garment comprises at least information on properties of a material of the garment and a sewing method of the garment; the collisional deformations are calculated based on the properties of the material of the garment; and the 3D images of the respective patterns are connected based on the information on the sewing method of the garment.

3. A garment stereoscopic image generating method according to claim 1, wherein the 3D image of the object model is a 3D model image having a figure of the object.

4. A garment stereoscopic image generating method according to claim 3, wherein the 3D image of the object model is generated using a measurement data obtained by actually measuring the surface shape of the object.

5. A garment stereoscopic image generating method according to claim 1, wherein the 3D image of the object model is a 3D model image having a standard figure in a figure class to which the object belongs when figures of objects are classified into a plurality of figure classes.

6. A garment stereoscopic image generating method according to claim 5, wherein:
   the first step (a) comprises:
      (a1) a first subordinate step of storing in advance the 3D image of the standard figure model having a standard figure for each figure class in a storage means;
      (a2) a second subordinate step of inputting information on the figure of the object; and
      (a3) a third subordinate step of reading the 3D image of the standard figure model of the corresponding figure class as the 3D image of the object model from the storage means based on the information on the figure of the object; and
   the fourth step (d) is performed to generate the stereoscopic image of a standard garment having a size suited to the standard figure model.

7. A garment stereoscopic image generating method according to claim 6, further comprising:
   (e) a fifth step of inputting information on dimensions of a main portion of the object;
   (f) a sixth step of generating a 3D image of the object model having the figure of the object by deforming the 3D image of the standard figure model based on the information on the dimensions of the main portion of the object;
   (g) a seventh step of generating a 3D clothes image representing a state where the object model is wearing the standard garment by combining the 3D image of the object model having the figure of the object and the stereoscopic image of the standard garment; and
   (h) an eighth step of displaying the 3D clothed image representing the state where the object model having the figure of the object is wearing the standard garment in a display means.

8. A garment stereoscopic image generating method according to claim 7, further comprising:
   (i) a ninth step of picking up an entire image of the object;
   (j) a tenth step of deforming the 3D image of the object model so that the posture of the object model having the figure of the object substantially agrees with that of the entire image of the object, and deforming the stereoscopic image of the standard garment according to the deformation of the object model;

(k) an eleventh step of generating a simulated try-on image representing a try-on state when the object tries the standard garment on by combining the deformed stereoscopic image of the garment and the entire image of the object; and (l) a twelfth step of displaying the simulated try-on image in the display means.

9. A garment stereoscopic image generating method according to claim 8, wherein the information on the garment comprises information on the color/pattern of the garment and the eleventh step (k) comprises:

(k1) a first subordinate step of calculating a main color component of the image of the standard garment based on the information on the color/pattern of the garment;

(k2) a second subordinate step of setting a color having a complementary relation to the main color component; and (k3) a third subordinate step of combining the image of the standard garment and the entire image of the object by the chroma key combination method using the color having the complementary relation as a key color.

10. A garment stereoscopic image generating method according to the claim 8, wherein the ninth step (i) is performed by picking up the image of the object by means of an image pickup device.

11. A garment stereoscopic image generating method according to claim 8, wherein the ninth step (i) is performed by reading a full-length picture of the object by an image reader.

12. A garment stereoscopic image generating method according to claim 9, wherein the second subordinate step (k2) is performed by calculating a distance of the main color component from blue in a color space, assuming blue as the color having the complementary relation if the distance is larger than a predetermined threshold value while assuming a complementary color of the main color component as the color having the complementary relation if the distance is equal to or shorter than the predetermined threshold value.

13. A garment stereoscopic image generating method according to claim 8, further comprising:

(m) a thirteenth step of generating a private catalogue by collecting a plurality of simulated try-on images.

14. A garment stereoscopic image generating method according to claim 13, wherein the private catalogue is a printed matter obtained by printing the plurality of simulated try-on images on sheets of paper.

15. A garment stereoscopic image generating method according to claim 13, wherein the private catalogue is an external storage medium in which data of the plurality simulated try-on images are stored.

16. A garment stereoscopic image generating method according to claim 7, further comprising:

(n) a fourteenth step of calculating a first projection function representing a correspondence between the 3D image of the standard figure model and the stereoscopic image of the standard garment;

(o) a fifteenth step of calculating a second projection function representing a correspondence between the 3D image of the standard figure model and the 3D image of the object model having the figure of the object;

(p) a sixteenth step of generating a stereoscopic image of the garment having a size suited to the object model having the figure of the object by deforming the stereoscopic image of the standard garment using the first and second projection functions; and (q) a seventeenth step of generating images of patterns constituting the garment having the size suited to the object model having the figure of the object using the stereoscopic image of such a garment.

17. A garment stereoscopic image generating method according to claim 16, wherein the images of the patterns constituting the garment are generated using a two-dimensional image obtained by transforming the stereoscopic image of the garment having the size suited to the object model having the figure of the object under restricting conditions of symmetry, partial linearity and partial curving of the patterns.

18. A garment stereoscopic image generating method according to claim 1, further comprising:

(r) an eighteenth step of inputting a motion data in order to move the 3D image of the object model in a specific manner;

(s) a nineteenth step of generating 3D animation images of the object model by deforming the 3D image of the object model based on the motion data;

(t) a twentieth step of generating 3D animation images of the garment during the movement of the object model by calculating a collisional state of the garment with the object model and a collisional state of the garment with itself based on the movement of the object model; and (u) a twenty-first step of generating 3D animation images representing a state where the object model wearing the garment is moving in the specific manner by combining the 3D animation images of the object model and those of the garment.

19. A garment stereoscopic image generating method according to claim 18, wherein the motion data is generated based on image data obtained by picking up images of a moving body in its specific movement.

20. A garment stereoscopic image generating system for generating a 3D image representing a stereoscopic shape of a garment when the garment is put on an object, comprising:

(A) a model image generating means for generating a 3D image of an object model corresponding to the object;

(B) a pattern image generating means for generating images of patterns of the garment;

(C) a garment information input means for inputting information on the garment; and (D) a garment image generating means for arranging the images of the respective patterns of the garment in corresponding portions of the 3D image of the object model, three-dimensionally deforming the images of the respective patterns by calculating collisional deformations when the respective patterns are pressed against the corresponding portions based on the information on the garment, and generating a stereoscopic image of the garment by connecting the deformed 3D images of the respective patterns based on the information on the garment.

21. A garment stereoscopic image generating system according to claim 20, wherein the information on the garment comprises at least information on properties of a material of the garment and a sewing method of the garment, and the garment image generating means (D) calculates the collisional deformations when the respective patterns are pressed against the corresponding portions of the object model based on the properties of the material of the garment and connects the 3D images of the respective patterns on the information on the sewing method of the garment.

22. A garment stereoscopic image generating system according to claim 20, wherein the 3D image of the object model is a 3D model image having a figure of the object.

23. A garment stereoscopic image generating system according to claim 22, wherein the model image generating means (A) comprises a shape measuring means for actually measuring the surface shape of the object, and an image generating means for generating a 3D image of an object model having the figure of the object using an actual measurement data obtained by the shape measuring means.

24. A garment stereoscopic image generating system according to claim 20, wherein the 3D image of the object model is a 3D model image having a standard figure in a figure class to which the object belongs when figures of objects are classified into a plurality of figure classes.

25. A garment stereoscopic image generating system according to claim 24, wherein:

the model image generating means (A) comprises:
- (A1) a storage means for storing the 3D images of standard figure models having standard figures, which are generated by classifying figures of objects into the plurality of figure classes, for each class;
- (A2) a figure information input means for inputting information on the figure of the object; and
- (A3) an image reading means for reading the 3D image of the standard figure model in the corresponding figure class as the 3D image of the object model from the storage means (A1) based on the information on the figure of the object; and the garment image generating means (D) generates a stereoscopic image of a standard garment having a size suited to the standard figure model.

26. A garment stereoscopic image generating system according to claim 25, further comprising:

(E) a dimension input means for inputting information on the dimensions of a main portion of the object;

(F) a model image generating means for generating a 3D image of the object model having the figure of the object by deforming the 3D image of the standard figure model based on the information on the dimensions of the main portion of the object;

(G) a clothed image generating means for generating a 3D clothed image representing a state where the object model is wearing the standard garment by combining the 3D image of the object model having the figure of the object and the stereoscopic image of the standard garment; and (H) a display means for displaying the 3D clothed image representing the state where the object model having the figure of the object is wearing the standard garment.

27. A garment stereoscopic image generating system according to claim 26, further comprising:

(I) an image pickup means for picking up an entire image of the object;

(J) an image deforming means for deforming the 3D image of the object model so that the posture of the object model having the figure of the object substantially agrees with that of the entire image of the object, and deforming the stereoscopic image of the standard garment according to the deformation of the object model;

(K) a simulated try-on image generating means for generating a simulated try-on image representing a try-on state when the object tries the standard garment on by combining the deformed stereoscopic image of the garment and the entire image of the object; and (L) a display means for displaying the simulated try-on image.

28. A garment stereoscopic image generating system according to claim 27, wherein the information on the garment comprises information on the color/pattern of the garment and the simulated try-on image generating means (K) comprises:.

(K1) a main color component calculating means for calculating a main color component of the image of the standard garment based on the information on the color/pattern of the garment;

(K2) a color setting means for setting a color having a complementary relation to the main color component; and (K3) an image combining means for combining the image of the standard garment and the entire image of the object by the chroma key combination method using the color having the complementary relation as a key color.

29. A garment stereoscopic image generating system according to the claim 27, wherein the image pickup means (I) is an image sensing means.

30. A garment stereoscopic image generating system according to claim 27, wherein the image pickup means (I) is an image reading means for reading a full-size picture of the object.

31. A garment stereoscopic image generating system according to claim 28, wherein the color setting means (K2) comprises:

(K2-1) a calculating means for calculating a distance of the main color component from blue in a color space;

(K2-2) a comparing means for comparing the calculated distance with a predetermined threshold value; and (K2-3) a setting means for setting blue as the color having the complementary relation when the distance is larger than the predetermined threshold value while setting a color complementary to the main color component as the color having the complementary relation when the distance is equal to or smaller than the predetermined threshold value.

32. A garment stereoscopic image generating system according to claim 27, further comprising:

(M) a catalogue producing means for producing a private catalogue by collecting a plurality of simulated try-on images.

33. A garment stereoscopic image generating system according to claim 32, wherein the catalogue producing means (M) comprising:

(M1) a printed matter producing means for producing a printed matter by printing the plurality of simulated try-on images on sheets of paper; and (M2) a binding means for binding the printed matter into a book.

34. A garment stereoscopic image generating system according to claim 32, wherein the catalogue producing means (M) is a storage medium producing means for producing an external storage medium in which data of the plurality of simulated try-on images are so stored as to be readable.

35. A garment stereoscopic image generating system according to claim 25, further comprising:

(N) a first projection function calculating means for calculating a first projection function representing a correspondence between the 3D image of the standard figure model and the stereoscopic image of the standard garment;

(O) a second projection function calculating means for calculating a second projection function representing a correspondence between the 3D image of the standard figure model and the 3D image of the object model having the figure of the object;

(P) a garment image generating means for generating a stereoscopic image of the garment having a size suited to the object model having the figure of the object by deforming the stereoscopic image of the standard garment using the first and second projection functions; and (Q) a pattern image generating means for generating images of patterns constituting the garment having the size suited to the object model having the figure of the object using the stereoscopic image of such a garment.

36. A garment stereoscopic image generating system according to claim 35, wherein the pattern image generating means (Q) generates the images of the patterns for the garment using a two-dimensional image obtained by transforming the stereoscopic image of the garment having the size suited to the object model having the figure of the object under restricting conditions of symmetry, partial linearity and partial curving of the patterns.

37. A garment stereoscopic image generating system according to claim 20, further comprising:

(R) an input means for inputting a motion data in order to move the 3D image of the object model in a specific manner;

(S) a first animation image generating means for generating 3D animation images of the object model by deforming the 3D image of the object model based on the motion data;

(T) a second animation generating means for generating 3D animation images of the garment while the object model is in motion by calculating a collisional state of the garment with the object model and a collisional state of the garment with itself based on the movement of the object model; and (U) a third animation image generating means for generating 3D animation images representing a state where the object model wearing the garment is moving in the specific manner by combining the 3D animation images of the object model and those of the garment.

38. A garment stereoscopic image generating system according to claim 37, wherein the first animation image generating means (S) generates the 3D animation images of the object model based on an image data obtained by picking up images of a moving body in a specified movement.

39. A try-on image generating system for generating a try-on image representing a state where a client tries a garment on, comprising:

(X) a data terminal unit for permitting a client to input information on the garment, information on the figure of the client and an image of the client;

(Y) a server for generating a try-on image representing a state where the client tries the garment on based on the information on the garment, the information on the figure of the client and the image of the client, and providing the client with the generated try-on image;

(Z) a communication network for connecting the server and the data terminal unit so as to enable a communication therebetween.

40. A try-on image generating system according to claim 39, wherein the data terminal unit (X) comprises:

(X3-1) an image pickup means for picking up the image of the client;

(X3-2) information input means for inputting the information on the garment and the information on the figure of the client;

(X3-3) a client side communication means for transmitting the information on the garment, the information on the figure of the client and the image of the client to the server and receiving the try-on image representing the state where the client tries the garment on which are transmitted from the server; and (X3-4) a display means for displaying the try-on image.

41. A try-on image generating system according to claim 39, wherein the server (Y) comprises:

(Y1) a server side communication means for receiving the information on the garment, the information on the figure of the client and the image of the client which are transmitted from the client and transmitting to the client the try-on image representing the state where the client tries the garment on;

(Y2) an image generating means for generating an image of the garment based on the information on the garment and the information on the figure of the client;

(Y3) a try-on image generating means for generating the try-on image representing the state where the client tries the garment on by combining the image of the garment and the image of the client.

42. A try-on image generating system according to claim 41, wherein the image generating means (Y2) comprises:

(Y2-1) a model image storage means for classifying human figures into a plurality of figure classes and storing in advance the 3D image of a standard figure model having a standard figure for each figure class;

(Y2-2) a pattern image storage means for storing images of patterns of garments having standard sizes generated in advance for the respective figure classes;

(Y2-3) an image reading means for reading the 3D image of the standard figure model of the corresponding figure class from the model image storage means (Y2-1) based on the information on the figure of the client and the images of the patterns of the standard garment of the corresponding figure class from the pattern image storage means (Y2-2); and (Y2-4) a garment image generating means for arranging the images of the respective patterns of the standard garment in corresponding portions of the 3D image of the standard figure model, three-dimensionally deforming the images of the respective patterns by calculating collisional deformations when the respective patterns are pressed against the corresponding portions based on the information on the garment, and generating a stereoscopic image of the standard garment by connecting the deformed 3D images of the respective patterns based on the information on the garment.

43. A try-on image generating system according to claim 41, wherein the try-on image generating means (Y3) comprises:

(Y3-1) a model image generating means for generating a 3D image of a client figure model having the figure of the client by deforming the 3D image of the standard figure model based on the information on the figure of the client;

(Y3-2) a clothed image generating means for generating a 3D clothed image representing a state where the client figure model is wearing the standard garment by combining the 3D image of the client figure model and the stereoscopic image of the standard garment;

(Y3-3) an image deforming means for deforming the 3D image of the client figure model having the figure of the client so that the posture of the client figure model substantially agrees with that of the image of the client, and deforming the stereoscopic image of the standard garment according to the deformation of the client figure model; and (Y3-4) an image combining means for generating a try-on image representing a state where the client tries the standard garment on by combining the deformed stereoscopic image of the garment and the image of the client by the chroma key combination method.

44. A system according to claim 41, wherein the server (Y) comprises:

(Y4) a catalogue producing means for producing a private catalogue of the client by collecting a plurality of try-on images generated by the try-on image generating means (Y3); and (Y5) a transmitting means for transmitting the private catalogue to the client.

45. A pattern preparing system for generating a try-on image representing a state where a client tries a garment on, correcting the garment using the try-on image, and preparing patterns of the garment based on an image of the corrected garment, comprising:

(X) a data terminal unit for permitting a client to input information on the garment and information on the figure of the client;

(Y) a server for generating a try-on image representing a state where the client tries the garment on based on the information on the garment, the information on the figure of the client and the image of the client, correcting the garment using the generated try-on image, generating information on the patterns of the garment based on an image of the corrected garment and providing the client with the generated try-on image, and providing the client with the information on the patterns; and (Z) a communication network for connecting the server and the data terminal unit so as to enable a communication therebetween.

46. A pattern preparing system according to claim 45, wherein the data terminal unit (X) comprises:

(X3-1) information input means for inputting the information on the garment and the information on the figure of the client; and (X3-2) a client side communication means for transmitting the information on the garment, the information on the figure of the client to the server and receiving the try-on image representing the state where the client tries the garment on which are transmitted from the server.

47. A pattern preparing system according to claim 45, wherein the server (Y) comprises:

(Y1) a server side communication means for receiving the information on the garment and the information on the figure of the client which are transmitted from the client and transmitting to the client the information of the patterns of the garment generated based on the received pieces of information;

(Y2) a model image storage means for classifying human figures into a plurality of figure classes and storing in advance the 3D image of a standard figure model having a standard figure for each figure class;

(Y3) a pattern image storage means for storing images of patterns of garments having standard sizes generated in advance for the respective figure classes;

(Y4) an image reading means for reading the 3D image of the standard figure model of the corresponding figure class from the model image storage means (Y2) based on the information on the figure of the client and the images of the patterns of the standard garment of the corresponding figure class from the pattern image storage means (Y3);

(Y5) a first garment image generating means for arranging the images of the respective patterns of the standard garment in corresponding portions of the 3D image of the standard figure model, three-dimensionally deforming the images of the respective patterns by calculating collisional deformations when the respective patterns are pressed against the corresponding portions based on the information on the garment, and generating a stereoscopic image of the standard garment by connecting the deformed 3D images of the respective patterns based on the information on the garment;

(Y6) a model image generating means for generating a 3D image of the client figure model having the figure of the client by deforming the 3D image of the standard figure model based on the information on the figure of the client;

(Y7) a first projection function calculating means for calculating a first projection function representing a correspondence between the 3D image of the standard figure model and the stereoscopic image of the standard garment;

(Y8) a second projection function calculating means for calculating a second projection function representing a correspondence between the 3D image of the standard figure model and the 3D image of the object model having the figure of the object;

(Y9) a second garment image generating means for generating a stereoscopic image of the garment having a size suited to the client figure model by deforming the stereoscopic image of the standard garment using the first and second projection functions; and (Y10) a pattern preparing means for preparing patterns of the garment having the size suited to the client figure model using the stereoscopic image of the garment.

* * * * *